(12) United States Patent
Li et al.

(10) Patent No.: US 12,333,655 B2
(45) Date of Patent: Jun. 17, 2025

(54) PRESENTING BUILDING INFORMATION USING VIDEO AND BUILDING MODELS

(71) Applicant: MFTB Holdco, Inc., Seattle, WA (US)

(72) Inventors: Yuguang Li, Seattle, WA (US); Ivaylo Boyadzhiev, Seattle, WA (US); Romualdo Impas, Seattle, WA (US); Michael P. Caputo, Aurora, IL (US); Gregory J. Doerr, Palatine, IL (US); Joshua Weisberg, Anacortes, WA (US)

(73) Assignee: MFTB Holdco, Inc., Seattle, WA (US)

( * ) Notice: Subject to any disclaimer, the term of this patent is extended or adjusted under 35 U.S.C. 154(b) by 311 days.

(21) Appl. No.: 18/112,352

(22) Filed: Feb. 21, 2023

(65) Prior Publication Data

US 2023/0196684 A1    Jun. 22, 2023

Related U.S. Application Data

(63) Continuation-in-part of application No. 17/589,842, filed on Jan. 31, 2022, now Pat. No. 11,676,344,
(Continued)

(51) Int. Cl.
*G06T 19/00*   (2011.01)
*G06F 3/0482*   (2013.01)
(Continued)

(52) U.S. Cl.
CPC .......... *G06T 19/003* (2013.01); *G06F 3/0482* (2013.01); *G06T 15/506* (2013.01); *G06T 17/05* (2013.01); *G06T 19/006* (2013.01)

(58) Field of Classification Search
None
See application file for complete search history.

(56) References Cited

U.S. PATENT DOCUMENTS

| | | |
|---|---|---|
| 5,014,049 A | 5/1991 | Bosley |
| 5,140,352 A | 8/1992 | Moore et al. |
| (Continued) | | |

FOREIGN PATENT DOCUMENTS

| | | |
|---|---|---|
| EP | 2413097 A2 | 2/2012 |
| EP | 2505961 A2 | 10/2012 |
| (Continued) | | |

OTHER PUBLICATIONS

Aguiar et al., "Predicting Online Video Engagement Using Clickstreams,", 2015, IEEE, pp. 1-10.
(Continued)

*Primary Examiner* — Martin Mushambo
(74) *Attorney, Agent, or Firm* — VLP Law Group LLP; James A. D. White

(57) ABSTRACT

Techniques are described for using computing devices to perform automated operations related to providing visual information of multiple types in an integrated manner about a building or other defined area. The techniques may include generating and presenting a GUI (graphical user interface) on a client device that includes a computer model of the building's interior with one or more first types of information (e.g., in a first pane of the GUI), and simultaneously presenting other types of related information about the building interior (e.g., in additional separate GUI pane(s)) that is coordinated with the first type(s) of information being currently displayed. The computer model may be a 3D (three-dimensional) or 2.5D representation generated after the house is built and showing the actual house's interior (e.g., walls, furniture, etc.), and may be displayed to a user of a client computing device in a displayed GUI with various user-selectable controls.

32 Claims, 30 Drawing Sheets

Related U.S. Application Data which is a continuation-in-part of application No. 17/064,608, filed on Oct. 7, 2020, now Pat. No. 11,238,652, which is a continuation of application No. 16/681,787, filed on Nov. 12, 2019, now Pat. No. 10,825,247, application No. 18/112,352, filed on Feb. 21, 2023 is a continuation-in-part of application No. 18/099,892, filed on Jan. 20, 2023, which is a continuation of application No. 16/852,948, filed on Apr. 20, 2020, now Pat. No. 11,574,473.

(51) Int. Cl.
  *G06T 15/50* (2011.01)
  *G06T 17/05* (2011.01)

(56) References Cited

U.S. PATENT DOCUMENTS

| | | |
|---|---|---|
| 5,245,652 A | 9/1993 | Larson et al. |
| 5,280,518 A | 1/1994 | Danler et al. |
| 5,475,375 A | 12/1995 | Barrett et al. |
| 5,612,683 A | 3/1997 | Trempala et al. |
| 5,705,991 A | 1/1998 | Kniffin et al. |
| 5,974,406 A | 10/1999 | Bisdikian et al. |
| 6,031,540 A | 2/2000 | Golin et al. |
| 6,101,480 A | 8/2000 | Conmy et al. |
| 6,141,034 A | 10/2000 | McCutchen |
| 6,157,315 A | 12/2000 | Kokubo et al. |
| 6,300,873 B1 | 10/2001 | Kucharczyk et al. |
| 6,317,166 B1 | 11/2001 | McCutchen |
| 6,320,584 B1 | 11/2001 | Golin et al. |
| 6,323,858 B1 | 11/2001 | Gilbert et al. |
| 6,337,683 B1 | 1/2002 | Gilbert et al. |
| 6,385,541 B1 | 5/2002 | Blumberg |
| 6,496,776 B1 | 12/2002 | Blumberg et al. |
| 6,522,875 B1 | 2/2003 | Dowling et al. |
| 6,580,441 B2 | 6/2003 | Schileru-Key |
| 6,594,633 B1 | 7/2003 | Broerman |
| 6,624,742 B1 | 9/2003 | Romano et al. |
| 6,636,803 B1 | 10/2003 | Hartz, Jr. et al. |
| 6,654,019 B2 | 11/2003 | Gilbert et al. |
| 6,683,608 B2 | 1/2004 | Golin et al. |
| 6,690,374 B2 | 2/2004 | Park et al. |
| 6,727,801 B1 | 4/2004 | Gervasi et al. |
| 6,731,305 B1 | 5/2004 | Park et al. |
| 6,738,073 B2 | 5/2004 | Park et al. |
| 6,842,105 B1 | 1/2005 | Henderson et al. |
| 6,973,432 B1 | 12/2005 | Woodard et al. |
| 7,009,489 B2 | 3/2006 | Fisher |
| 7,050,085 B1 | 5/2006 | Park et al. |
| 7,058,395 B2 | 6/2006 | Dowling et al. |
| 7,127,475 B2 | 10/2006 | Gotz et al. |
| 7,129,971 B2 | 10/2006 | McCutchen |
| 7,191,058 B2 | 3/2007 | Laird et al. |
| 7,193,503 B2 | 3/2007 | Fisher |
| 7,196,722 B2 | 3/2007 | White et al. |
| 7,292,844 B2 | 11/2007 | Dowling et al. |
| 7,518,485 B2 | 4/2009 | Shuster |
| 7,525,567 B2 | 4/2009 | McCutchen |
| 7,606,558 B2 | 10/2009 | Despain et al. |
| 7,620,909 B2 | 11/2009 | Park et al. |
| 7,627,235 B2 | 12/2009 | McCutchen et al. |
| 7,664,801 B2 | 2/2010 | Walker |
| 7,728,711 B2 | 6/2010 | Shoenfeld |
| 7,782,319 B2 | 8/2010 | Ghosh et al. |
| 7,791,638 B2 | 9/2010 | McCutchen |
| 7,853,479 B2 | 12/2010 | Bengson |
| 7,869,941 B2 | 1/2011 | Coughlin et al. |
| 7,880,584 B2 | 2/2011 | Larson et al. |
| 7,909,241 B2 | 3/2011 | Stone et al. |
| 7,973,838 B2 | 7/2011 | McCutchen |
| 7,999,656 B2 | 8/2011 | Fisher |
| 8,035,480 B2 | 10/2011 | Woodard et al. |
| 8,072,455 B2 | 12/2011 | Temesvari et al. |
| RE43,068 E | 1/2012 | Woodard et al. |
| 8,094,182 B2 | 1/2012 | Park et al. |
| 8,145,352 B2 | 3/2012 | Woodard et al. |
| RE43,786 E | 11/2012 | Cooper |
| 8,368,507 B2 | 2/2013 | Conreux et al. |
| 8,385,897 B1 | 2/2013 | Yadav-Ranjan |
| 8,451,088 B2 | 5/2013 | Fisher |
| 8,463,020 B1 | 6/2013 | Schuckmann et al. |
| 8,517,256 B2 | 8/2013 | Stone et al. |
| 8,520,060 B2 | 8/2013 | Zomet et al. |
| 8,523,066 B2 | 9/2013 | Stone et al. |
| 8,523,067 B2 | 9/2013 | Stone et al. |
| 8,528,816 B2 | 9/2013 | Stone et al. |
| 8,540,153 B2 | 9/2013 | Stone et al. |
| 8,594,428 B2 | 11/2013 | Aharoni et al. |
| 8,649,486 B1 | 2/2014 | Kellogg et al. |
| 8,654,180 B2 | 2/2014 | Zomet et al. |
| 8,666,815 B1 | 3/2014 | Chau |
| 8,699,005 B2 | 4/2014 | Likholyot |
| 8,705,892 B2 | 4/2014 | Aguilera et al. |
| RE44,924 E | 6/2014 | Cooper et al. |
| 8,754,744 B2 | 6/2014 | Woodard et al. |
| 8,831,970 B2 | 9/2014 | Weik et al. |
| 8,854,684 B2 | 10/2014 | Zomet |
| 8,861,840 B2 | 10/2014 | Bell et al. |
| 8,861,841 B2 | 10/2014 | Bell et al. |
| 8,879,828 B2 | 11/2014 | Bell et al. |
| 8,947,530 B1 | 2/2015 | Scalisi |
| 8,953,871 B2 | 2/2015 | Zomet |
| 8,971,506 B2 | 3/2015 | Kellogg et al. |
| 8,989,440 B2 | 3/2015 | Klusza et al. |
| 8,996,336 B2 | 3/2015 | Malka et al. |
| 9,021,947 B2 | 5/2015 | Landa |
| 9,026,947 B2 | 5/2015 | Lee et al. |
| 9,035,968 B2 | 5/2015 | Zomet |
| 9,041,796 B2 | 5/2015 | Malka et al. |
| 9,071,714 B2 | 6/2015 | Zomet |
| 9,129,438 B2 | 9/2015 | Aarts et al. |
| 9,151,608 B2 | 10/2015 | Malka et al. |
| 9,165,410 B1 | 10/2015 | Bell et al. |
| 9,171,405 B1 | 10/2015 | Bell et al. |
| 9,194,157 B2 | 11/2015 | Bahar |
| 9,208,466 B2 | 12/2015 | Fisher |
| 9,311,656 B2 | 4/2016 | Barnes |
| 9,324,190 B2 | 4/2016 | Bell et al. |
| 9,361,717 B2 | 6/2016 | Zomet |
| 9,396,586 B2 | 7/2016 | Bell et al. |
| 9,438,759 B2 | 9/2016 | Zomet |
| 9,438,775 B2 | 9/2016 | Powers et al. |
| 9,460,480 B2 | 10/2016 | Woodard et al. |
| 9,478,083 B2 | 10/2016 | Fisher |
| 9,489,775 B1 | 11/2016 | Bell et al. |
| 9,495,783 B1 | 11/2016 | Samarasekera et al. |
| 9,514,586 B2 | 12/2016 | Rogers et al. |
| 9,536,359 B1 | 1/2017 | Gokcebay |
| 9,576,401 B2 | 2/2017 | Zomet |
| 9,619,933 B2 | 4/2017 | Spinella-Marno et al. |
| 9,635,252 B2 | 4/2017 | Accardo et al. |
| 9,641,702 B2 | 5/2017 | Bin-Nun et al. |
| 9,659,334 B2 | 5/2017 | Fenn |
| 9,659,424 B2 | 5/2017 | Huber et al. |
| 9,760,994 B1 | 9/2017 | Bell et al. |
| 9,761,071 B2 | 9/2017 | Woodard et al. |
| 9,786,097 B2 | 10/2017 | Bell et al. |
| 9,787,904 B2 | 10/2017 | Birkler et al. |
| 9,836,885 B1 | 12/2017 | Eraker et al. |
| 9,852,351 B2 | 12/2017 | Aguilera Perez et al. |
| 9,916,742 B2 | 3/2018 | Kuenze |
| 9,953,111 B2 | 4/2018 | Bell et al. |
| 9,953,430 B1 | 4/2018 | Zakhor |
| 9,978,192 B1 | 5/2018 | Nicosia et al. |
| 9,990,760 B2 | 6/2018 | Aguilera Perez et al. |
| 9,990,767 B1 | 6/2018 | Sheffield et al. |
| 9,990,787 B2 | 6/2018 | Capaldi-Tallon |
| 10,026,224 B2 | 7/2018 | Bell et al. |
| 10,026,248 B2 | 7/2018 | Woodard et al. |
| 10,030,979 B2 | 7/2018 | Bjorke et al. |
| 10,044,519 B2 | 8/2018 | Kasmir et al. |
| 10,055,876 B2 | 8/2018 | Ford et al. |

(56) References Cited

U.S. PATENT DOCUMENTS

| | | |
|---|---|---|
| 10,068,344 B2 | 9/2018 | Jovanovic et al. |
| 10,083,522 B2 | 9/2018 | Jovanovic et al. |
| 10,102,639 B2 | 10/2018 | Bell et al. |
| 10,102,673 B2 | 10/2018 | Eraker et al. |
| 10,120,397 B1 | 11/2018 | Zakhor et al. |
| 10,122,997 B1 | 11/2018 | Sheffield et al. |
| 10,127,718 B2 | 11/2018 | Zakhor et al. |
| 10,127,722 B2 | 11/2018 | Shakib et al. |
| 10,139,985 B2 | 11/2018 | Mildrew et al. |
| 10,163,261 B2 | 12/2018 | Bell et al. |
| 10,163,271 B1 | 12/2018 | Powers et al. |
| 10,181,215 B2 | 1/2019 | Sedeffow |
| 10,192,115 B1 | 1/2019 | Sheffield et al. |
| 10,204,185 B2 | 2/2019 | Mrowca et al. |
| 10,210,285 B2 | 2/2019 | Wong et al. |
| 10,235,797 B1 | 3/2019 | Sheffield et al. |
| 10,242,400 B1 | 3/2019 | Eraker et al. |
| 10,339,716 B1 | 7/2019 | Powers et al. |
| 10,366,531 B2 | 7/2019 | Sheffield |
| 10,375,306 B2 | 8/2019 | Shan et al. |
| 10,395,435 B2 | 8/2019 | Powers et al. |
| 10,530,997 B2 | 1/2020 | Shan et al. |
| 10,643,386 B2 | 5/2020 | Li et al. |
| 10,708,507 B1 | 7/2020 | Dawson et al. |
| 10,713,740 B1 | 7/2020 | Caputo |
| 10,809,066 B2 | 10/2020 | Colburn et al. |
| 10,824,996 B1 | 11/2020 | Chu |
| 10,825,247 B1 | 11/2020 | Vincent et al. |
| 10,834,317 B2 | 11/2020 | Shan et al. |
| 11,057,561 B2 | 7/2021 | Shan et al. |
| 11,164,361 B2 | 11/2021 | Moulon et al. |
| 11,164,368 B2 | 11/2021 | Vincent et al. |
| 11,165,959 B2 | 11/2021 | Shan et al. |
| 11,217,019 B2 | 1/2022 | Li et al. |
| 11,238,652 B2 | 2/2022 | Impas et al. |
| 11,243,656 B2 | 2/2022 | Li et al. |
| 11,252,329 B1 | 2/2022 | Cier et al. |
| 11,284,006 B2 | 3/2022 | Dawson et al. |
| 11,405,549 B2 | 8/2022 | Cier et al. |
| 11,405,558 B2 | 8/2022 | Dawson et al. |
| 11,408,738 B2 | 8/2022 | Colburn et al. |
| 2002/0022980 A1 | 2/2002 | Mozayeny et al. |
| 2002/0174090 A1 | 11/2002 | Dexter |
| 2003/0038708 A1 | 2/2003 | Lund |
| 2003/0154573 A1 | 8/2003 | Gould |
| 2003/0179075 A1 | 9/2003 | Greenman |
| 2005/0086612 A1 | 4/2005 | Gettman et al. |
| 2005/0149432 A1 | 7/2005 | Galey |
| 2005/0168320 A1 | 8/2005 | Henderson et al. |
| 2005/0192930 A1 | 9/2005 | Hightower et al. |
| 2005/0288958 A1 | 12/2005 | Eraker et al. |
| 2006/0106628 A1 | 5/2006 | Faherty et al. |
| 2006/0220809 A1 | 10/2006 | Stigall et al. |
| 2006/0256109 A1* | 11/2006 | Acker ............... G06T 15/20 345/419 |
| 2007/0100644 A1 | 5/2007 | Keillor et al. |
| 2007/0143173 A1 | 6/2007 | Walker et al. |
| 2007/0266081 A1 | 11/2007 | Murchison et al. |
| 2007/0290798 A1 | 12/2007 | Larson et al. |
| 2008/0028328 A1 | 1/2008 | Hoizal et al. |
| 2008/0168369 A1 | 7/2008 | Tadman et al. |
| 2008/0169937 A1 | 7/2008 | Lowry |
| 2008/0263465 A1 | 10/2008 | Fox et al. |
| 2010/0005427 A1 | 1/2010 | Zhang et al. |
| 2010/0077320 A1 | 3/2010 | Lepore et al. |
| 2010/0131857 A1 | 5/2010 | Prigge |
| 2010/0232709 A1 | 9/2010 | Zhang et al. |
| 2011/0053557 A1 | 3/2011 | Despain et al. |
| 2012/0075414 A1 | 3/2012 | Park et al. |
| 2012/0290203 A1 | 11/2012 | King |
| 2012/0293613 A1 | 11/2012 | Powers et al. |
| 2013/0005368 A1 | 1/2013 | Hunziker |
| 2013/0050407 A1 | 2/2013 | Brinda et al. |
| 2013/0262186 A1 | 10/2013 | Lazarre et al. |
| 2013/0282524 A1 | 10/2013 | Appolito et al. |
| 2013/0342533 A1 | 12/2013 | Bell et al. |
| 2014/0043436 A1 | 2/2014 | Bell et al. |
| 2014/0044343 A1 | 2/2014 | Bell et al. |
| 2014/0044344 A1 | 2/2014 | Bell et al. |
| 2014/0068445 A1 | 3/2014 | Kempf et al. |
| 2014/0125658 A1 | 5/2014 | Bell et al. |
| 2014/0125767 A1 | 5/2014 | Bell et al. |
| 2014/0125768 A1 | 5/2014 | Bell et al. |
| 2014/0125769 A1 | 5/2014 | Bell et al. |
| 2014/0125770 A1 | 5/2014 | Bell et al. |
| 2014/0236482 A1 | 8/2014 | Dorum et al. |
| 2014/0258042 A1 | 9/2014 | Butler et al. |
| 2014/0267631 A1 | 9/2014 | Powers et al. |
| 2014/0304178 A1 | 10/2014 | Bengson et al. |
| 2014/0307100 A1 | 10/2014 | Myllykoski et al. |
| 2014/0320674 A1 | 10/2014 | Kuang |
| 2015/0077220 A1 | 3/2015 | Davis et al. |
| 2015/0081327 A1 | 3/2015 | Mooker |
| 2015/0116691 A1 | 4/2015 | Likholyot |
| 2015/0153182 A1 | 6/2015 | Tu et al. |
| 2015/0189165 A1 | 7/2015 | Milosevski et al. |
| 2015/0235145 A1 | 8/2015 | Dubuc |
| 2015/0262421 A1 | 9/2015 | Bell et al. |
| 2015/0269785 A1 | 9/2015 | Bell et al. |
| 2015/0302636 A1 | 10/2015 | Arnoldus et al. |
| 2015/0310596 A1 | 10/2015 | Sheridan et al. |
| 2015/0332464 A1 | 11/2015 | O'Keefe et al. |
| 2016/0055268 A1 | 2/2016 | Bell et al. |
| 2016/0134860 A1 | 5/2016 | Jovanovic et al. |
| 2016/0140676 A1 | 5/2016 | Fritze et al. |
| 2016/0180360 A1 | 6/2016 | Tietzen et al. |
| 2016/0180620 A1 | 6/2016 | Eyring et al. |
| 2016/0217225 A1 | 7/2016 | Bell et al. |
| 2016/0241999 A1 | 8/2016 | Chin et al. |
| 2016/0260250 A1 | 9/2016 | Jovanovic et al. |
| 2016/0275762 A1 | 9/2016 | Keunzi |
| 2016/0286119 A1 | 9/2016 | Rondinelli |
| 2016/0300385 A1 | 10/2016 | Bell et al. |
| 2016/0364928 A1 | 12/2016 | Woodard et al. |
| 2016/0373795 A1 | 12/2016 | Stefanoski et al. |
| 2017/0034430 A1 | 2/2017 | Fu et al. |
| 2017/0067739 A1 | 3/2017 | Siercks et al. |
| 2017/0194768 A1 | 7/2017 | Powers et al. |
| 2017/0195654 A1 | 7/2017 | Powers et al. |
| 2017/0263050 A1 | 9/2017 | Ha et al. |
| 2017/0324941 A1 | 11/2017 | Birkler |
| 2017/0330273 A1 | 11/2017 | Holt et al. |
| 2017/0337737 A1 | 11/2017 | Edwards et al. |
| 2018/0007340 A1 | 1/2018 | Stachowski |
| 2018/0025536 A1 | 1/2018 | Bell et al. |
| 2018/0075168 A1 | 3/2018 | Tiwari et al. |
| 2018/0075681 A1 | 3/2018 | Scalisi et al. |
| 2018/0139431 A1 | 5/2018 | Simek et al. |
| 2018/0143023 A1 | 5/2018 | Bjorke et al. |
| 2018/0143756 A1 | 5/2018 | Mildrew et al. |
| 2018/0144487 A1 | 5/2018 | Bell et al. |
| 2018/0144535 A1 | 5/2018 | Ford et al. |
| 2018/0144547 A1 | 5/2018 | Shakib et al. |
| 2018/0144555 A1 | 5/2018 | Ford et al. |
| 2018/0146121 A1 | 5/2018 | Hensler et al. |
| 2018/0146193 A1 | 5/2018 | Safreed et al. |
| 2018/0146212 A1 | 5/2018 | Hensler et al. |
| 2018/0165871 A1 | 6/2018 | Mrowca |
| 2018/0203955 A1 | 7/2018 | Bell et al. |
| 2018/0232978 A1 | 8/2018 | Schmidt-Lackner et al. |
| 2018/0241985 A1 | 8/2018 | O'Keefe et al. |
| 2018/0293793 A1 | 10/2018 | Bell et al. |
| 2018/0300936 A1 | 10/2018 | Ford et al. |
| 2018/0306588 A1 | 10/2018 | Bjorke et al. |
| 2018/0348854 A1 | 12/2018 | Powers et al. |
| 2018/0365496 A1 | 12/2018 | Hovden et al. |
| 2019/0012833 A1 | 1/2019 | Eraker et al. |
| 2019/0026956 A1 | 1/2019 | Gausebeck et al. |
| 2019/0026957 A1 | 1/2019 | Gausebeck |
| 2019/0026958 A1 | 1/2019 | Gausebeck et al. |
| 2019/0035165 A1 | 1/2019 | Gausebeck |
| 2019/0041972 A1 | 2/2019 | Bae |
| 2019/0050137 A1 | 2/2019 | Mildrew et al. |
| 2019/0051050 A1 | 2/2019 | Bell et al. |

(56) References Cited

U.S. PATENT DOCUMENTS

| | | |
|---|---|---|
| 2019/0051054 A1 | 2/2019 | Jovanovic et al. |
| 2019/0087067 A1 | 3/2019 | Hovden et al. |
| 2019/0122422 A1 | 4/2019 | Sheffield et al. |
| 2019/0164335 A1 | 5/2019 | Sheffield et al. |
| 2019/0180104 A1 | 6/2019 | Sheffield et al. |
| 2019/0244455 A1 | 8/2019 | Kim et al. |
| 2019/0251645 A1 | 8/2019 | Winans |
| 2019/0287164 A1 | 9/2019 | Eraker et al. |
| 2019/0327448 A1 | 10/2019 | Fu et al. |
| 2020/0336675 A1 | 10/2020 | Dawson et al. |
| 2020/0389602 A1 | 12/2020 | Dawson et al. |
| 2020/0408532 A1 | 12/2020 | Colburn et al. |
| 2021/0044760 A1 | 2/2021 | Dawson et al. |
| 2021/0377442 A1 | 12/2021 | Boyadzhiev et al. |
| 2021/0385378 A1 | 12/2021 | Cier et al. |
| 2022/0003555 A1 | 1/2022 | Colburn et al. |
| 2022/0028156 A1 | 1/2022 | Boyadzhiev et al. |
| 2022/0028159 A1 | 1/2022 | Vincent et al. |
| 2022/0076019 A1 | 3/2022 | Moulon et al. |
| 2022/0092227 A1 | 3/2022 | Yin et al. |
| 2022/0114291 A1 | 4/2022 | Li et al. |
| 2022/0164493 A1 | 5/2022 | Li et al. |
| 2022/0189122 A1 | 6/2022 | Li et al. |

FOREIGN PATENT DOCUMENTS

| | | |
|---|---|---|
| EP | 2506170 A2 | 10/2012 |
| KR | 101770648 B1 | 8/2017 |
| KR | 101930796 B1 | 12/2018 |
| WO | 2005091894 A2 | 10/2005 |
| WO | 2007033581 A1 | 3/2007 |
| WO | 2007100853 A1 | 9/2007 |
| WO | 2007143202 A1 | 12/2007 |
| WO | 2009088418 A1 | 7/2009 |
| WO | 2016154306 A1 | 9/2016 |
| WO | 2017174526 A1 | 10/2017 |
| WO | 2017038261 A1 | 5/2018 |
| WO | 2018204279 A1 | 11/2018 |
| WO | 2019083832 A1 | 5/2019 |
| WO | 2019104049 A1 | 5/2019 |
| WO | 2019118599 A2 | 6/2019 |

OTHER PUBLICATIONS

Toma et al., "SESA: A Scalable Multi-Channel Communication and Booking Solution for e-commerce in the Tourism Domain," 2013, IEEE 10th International Conference On E-Business Engineering, 6 pages.

Geiser et al., "Objective Measures of Emotion During Virtual Walks through Urban Environments", 2011, Applied Sciences, ISSN 2076-3417, 11 pages.

CubiCasa | From video to floor plan in under 5 minutes, retrieved on Mar. 26, 2019, from https://www.cubi.casa/, 6 pages.

CubiCasa FAQ & Manual, retrieved on Mar. 26, 2019, from https://www.cubi.casa/faq/, 5 pages.

Cupix Home, retrieved on Mar. 26, 2019, from https://www.cupix.com/, 1 page.

Cupix—FAQ, retrieved on Mar. 26, 2019, from https://www.cupix.com/faq.html, 3 pages.

IGUIDE: 3D Virtual Tours, retrieved on Mar. 26, 2019, from https://goiguide.com/, 6 pages.

immoviewer.com | Automated Video Creation & Simple Affordable 3D 360 Tours, retrieved on Mar. 26, 2019, from https://www.immoviewer.com/, 5 pages.

MagicPlan | #1 Floor Plan App, Construction & Surveying Samples, retrieved on Mar. 26, 2019, from https://www.magicplan.app/, 9 pages.

EyeSpy360 Virtual Tours | Virtual Tour with any 360 camera, retrieved on Mar. 27, 2019, from https://www.eyespy360.com/en-us/, 15 pages.

Indoor Reality, retrieved on Mar. 27, 2019, from https://www.indoorreality.com/, 9 pages.

InsideMaps, retrieved on Mar. 27, 2019, from https://www.insidemaps.com/, 7 pages.

IStaging | Augmented & Virtual Reality Platform For Business, retrieved on Mar. 27, 2019, from https://www.istaging.com/en/, 7 pages.

Metareal, retrieved on Mar. 27, 2019, from https://www.metareal.com/, 4 pages.

PLNAR—The AR 3D Measuring / Modeling Platform, retrieved on Mar. 27, 2019, from https://www.plnar.co, 6 pages.

YouVR Global, retrieved on Mar. 27, 2019, from https://global.youvr.io/, 9 pages.

GeoCV, retrieved on Mar. 28, 2019, from https://geocv.com/, 4 pages.

Biersdorfer, J.D., "How To Make A 3-D Model Of Your Home Renovation Vision," in The New York Times, Feb. 13, 2019, retrieved Mar. 28, 2019, 6 pages.

Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.

Immersive 3D for the Real World, retrieved from https://matterport.com/, on Mar. 27, 2017, 5 pages.

Learn About Our Complete 3D System, retrieved from https://matterport.com/how-it-works/, on Mar. 27, 2017, 6 pages.

Surefield FAQ, retrieved from https://surefield.com/faq, on Mar. 27, 2017, 1 page.

Why Surefield, retrieved from https://surefield.com/why-surefield, on Mar. 27, 2017, 7 pages.

Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.

Tango (platform), Wikipedia, retrieved from https://en.wikipedia.org/wiki/Tango_(platform), on Jun. 12, 2018, 5 pages.

Zou et al. "LayoutNet: Reconstructing the 3D Room Layout from a Single RGB Image" in arXiv:1803.08999, submitted Mar. 23, 2018, 9 pages.

Lee et al. "RoomNet: End-to-End Room Layout Estimation" in arXiv:1703.00241v2, submitted Aug. 7, 2017, 10 pages.

Time-of-flight camera, Wikipedia, retrieved from https://en.wikipedia.org/wiki/Time-of-flight_camera, on Aug. 30, 2018, 8 pages.

Magicplan—Android Apps on Go . . . , retrieved from https://play.google.com/store/apps/details?id=com.sensopia.magicplan, on Feb. 21, 2018, 5 pages.

Pintore et al., "AtlantaNet: Inferring the 3D Indoor Layout from a Single 360 Image beyond the Manhattan World Assumption", ECCV 2020, 16 pages.

Cowles, Jeremy, "Differentiable Rendering", Aug. 19, 2018, accessed Dec. 7, 2020 at https://towardsdatascience.com/differentiable-rendering-d00a4b0f14be, 3 pages.

Yang et al., "DuLa-Net: A Dual-Projection Network for Estimating Room Layouts from a Single RGB Panorama", in arXiv:1811.11977[cs.v2], submitted Apr. 2, 2019, 14 pages.

Sun et al., "HoHoNet: 360 Indoor Holistic Understanding with Latent Horizontal Features", in arXiv:2011.11498[cs.v2], submitted Nov. 24, 2020, 15 pages.

Nguyen-Phuoc et al., "RenderNet: A deep convolutional network for differentiable rendering from 3D shapes", in arXiv:1806.06575[cs.v3], submitted Apr. 1, 2019, 17 pages.

Convolutional neural network, Wikipedia, retrieved from https://en.wikipedia.org/wiki/Convolutional_neural_network, on Dec. 7, 2020, 25 pages.

Hamilton et al., "Inductive Representation Learning on Large Graphs", in 31st Conference on Neural Information Processing Systems (NIPS 2017), 2017, 19 pages.

Kipf et al., "Variational Graph Auto-Encoders", in arXiv:1611.07308v1 [stat.ML], submitted Nov. 21, 2016, 3 pages.

Cao et al., "MolGAN: An Implicit Generative Model For Small Molecular Graphs", in arXiv:1805.11973v1 [stat.ML], submitted May 30, 2018, 11 pages.

(56) References Cited

OTHER PUBLICATIONS

Chen et al., "Intelligent Home 3D: Automatic 3D-House Design from Linguistic Descriptions Only", in arXiv:2003.00397v1 [cs.CV], submitted Mar. 1, 2020, 14 pages.
Cucurull et al., "Context-Aware Visual Compatibility Prediction", in arXiv:1902.03646v2 [cs.CV], submitted Feb. 12, 2019, 10 pages.
Fan et al., "Labeled Graph Generative Adversarial Networks", in arXiv:1906.03220v1 [cs.LG], submitted Jun. 7, 2019, 14 pages.
Gong et al., "Exploiting Edge Features in Graph Neural Networks", in arXiv:1809.02709v2 [cs.LG], submitted Jan. 28, 2019, 10 pages.
Genghis Goodman, "A Machine Learning Approach to Artificial Floorplan Generation", University of Kentucky Theses and Dissertations—Computer Science, 2019, accessible at https://uknowledge.uky.edu/cs_etds/89, 40 pages.
Grover et al., "node2vec: Scalable Feature Learning for Networks", in arXiv:1607.00653v1 [cs.SI], submitted Jul. 3, 2016, 10 pages.
Nauata et al., "House-GAN: Relational Generative Adversarial Networks for Graph-constrained House Layout Generation", in arXiv:2003.06988v1 [cs.CV], submitted Mar. 16, 2020, 17 pages.
Kang et al., "A Review of Techniques for 3D Reconstruction of Indoor Environments", in ISPRS International Journal Of Geo-Information 2020, May 19, 2020, 31 pages.
Kipf et al., "Semi-Supervised Classification With Graph Convolutional Networks", in arXiv:1609.02907v4 [cs.LG], submitted Feb. 22, 2017, 14 pages.
Li et al., "Graph Matching Networks for Learning the Similarity of Graph Structured Objects", in Proceedings of the 36th International Conference on Machine Learning (PMLR 97), 2019, 18 pages.
Liu et al., "Hyperbolic Graph Neural Networks", in 33rd Conference on Neural Information Processing Systems (NeurIPS 2019), 2019, 12 pages.
Merrell et al., "Computer-Generated Residential Building Layouts", in ACM Transactions on Graphics, Dec. 2010, 13 pages.

\* cited by examiner

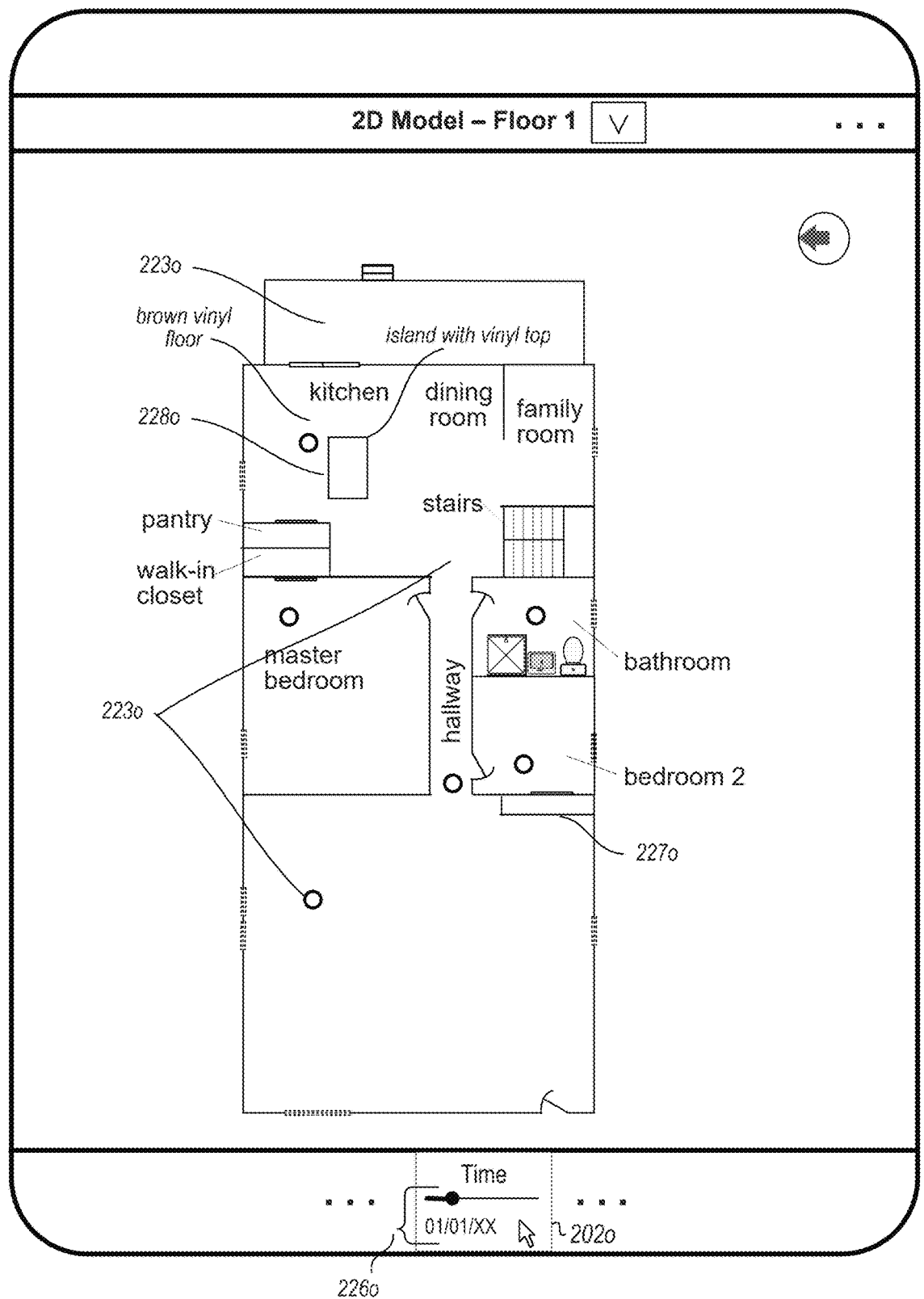
Fig. 2-O

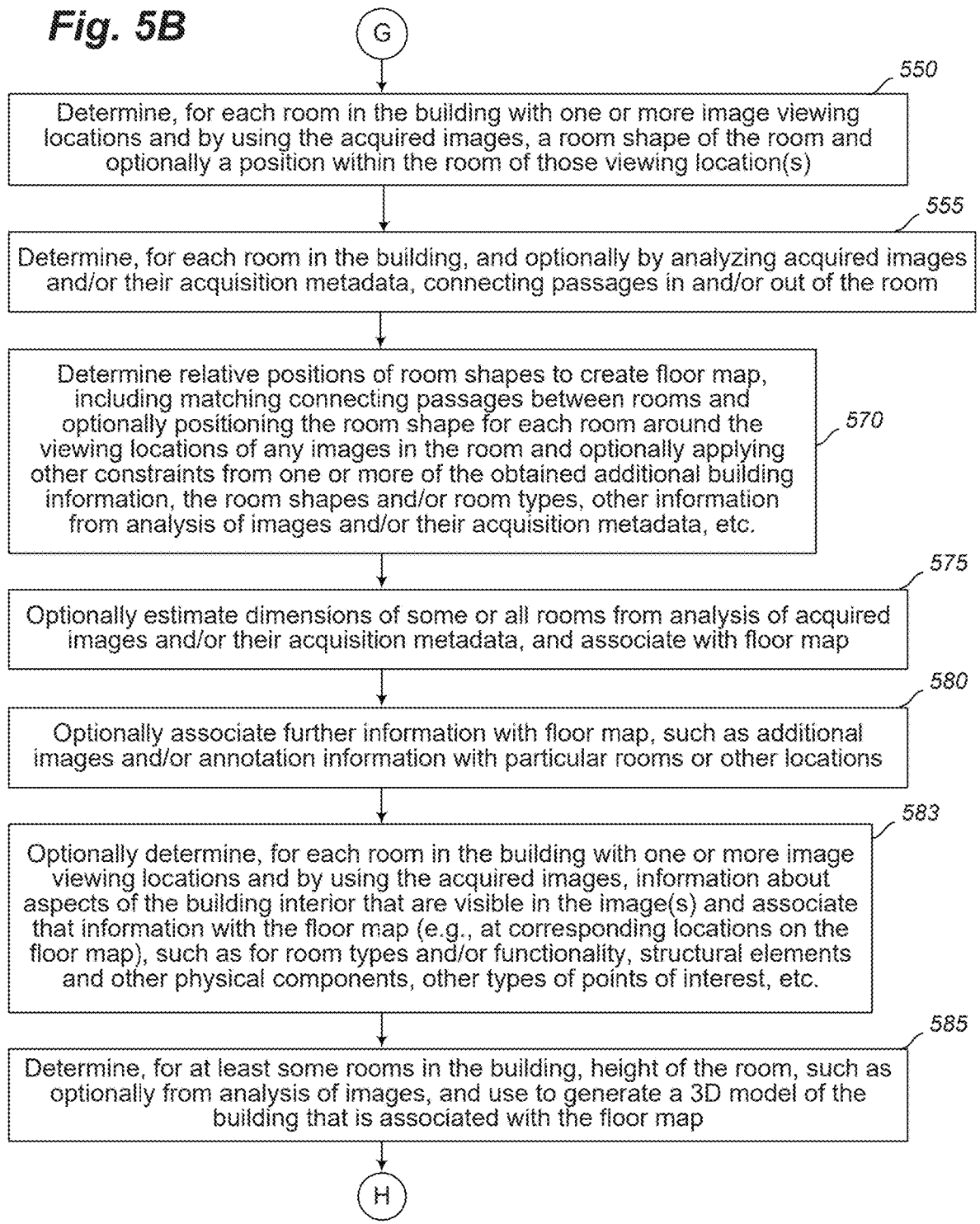

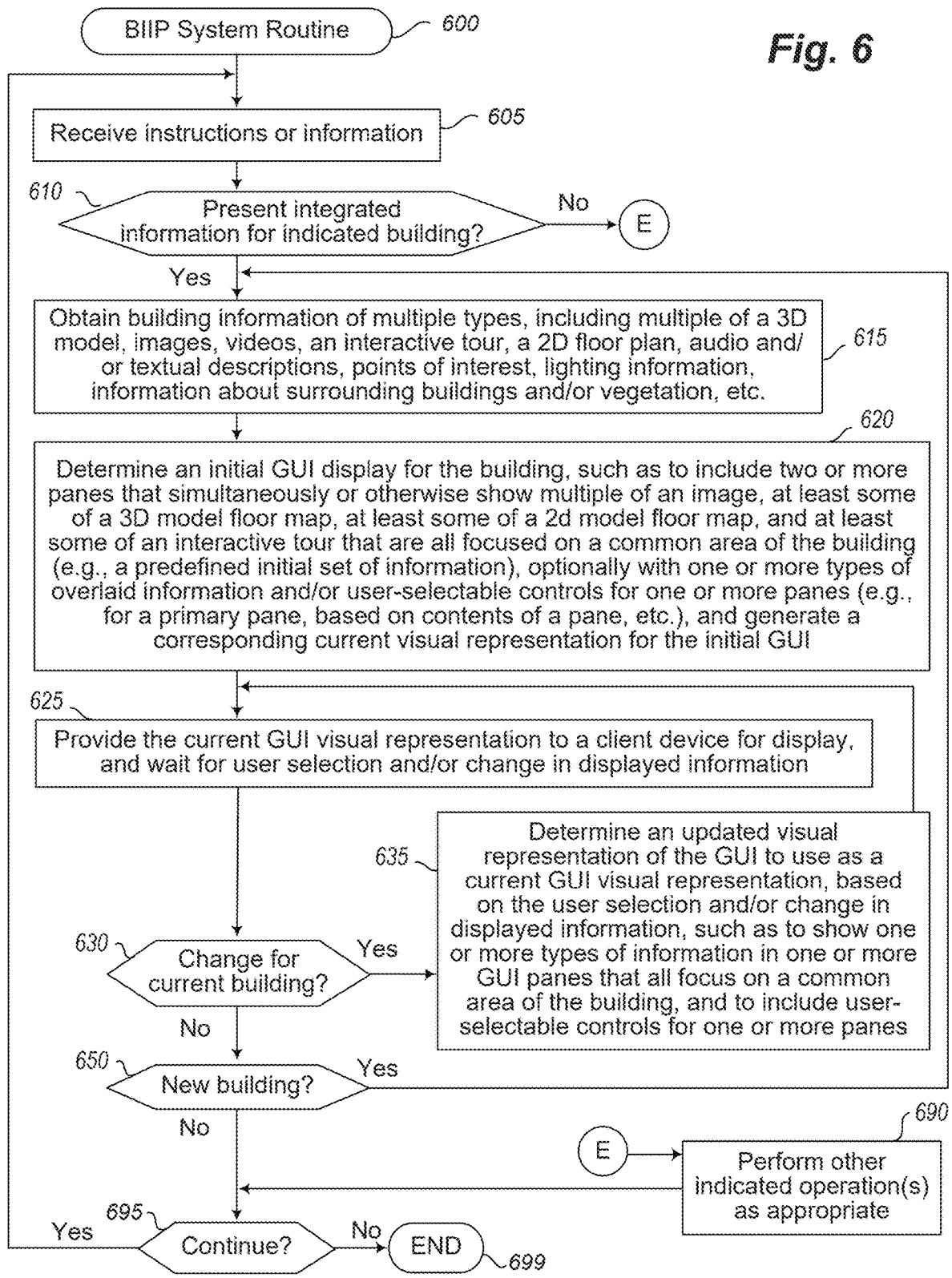

PRESENTING BUILDING INFORMATION USING VIDEO AND BUILDING MODELS

CROSS-REFERENCE TO RELATED APPLICATIONS

This application is a continuation-in-part of co-pending U.S. Non-Provisional patent application Ser. No. 17/589,842, filed Jan. 31, 2022 and entitled "Presenting Building Information Using Building Models", which is a continuation-in-part of U.S. Non-Provisional patent application Ser. No. 17/064,608, filed Oct. 7, 2020 and entitled "Presenting Integrated Building Information Using Building Models" (now U.S. Pat. No. 11,238,652), which is a continuation of U.S. Non-Provisional patent application Ser. No. 16/681,787, filed Nov. 12, 2019 and entitled "Presenting Integrated Building Information Using Three-Dimensional Building Models" (now U.S. Pat. No. 10,825,247), each of which is hereby incorporated by reference in their entirety. This application is also a continuation-in-part of co-pending U.S. Non-Provisional patent application Ser. No. 18/099,892, filed Jan. 20, 2023 and entitled "Multi-Party Virtual Showing System With Configurable Independent Communication Channels And Data", which is a continuation of U.S. Non-Provisional patent application Ser. No. 16/852,948, filed Apr. 20, 2020 and entitled "Multi-Party Virtual Showing System With Configurable Independent Communication Channels And Data" (now U.S. Pat. No. 11,574,373), which is hereby incorporated by reference in its entirety.

TECHNICAL FIELD

The following disclosure relates generally to techniques for providing visual information of multiple types about a defined area, such as to present a video of an interior of an as-built building along with a computer model of the building interior and/or multiple other types of information about the building interior in an integrated manner (e.g., in a simultaneous and coordinated manner).

BACKGROUND

In various fields and circumstances, such as architectural analysis, property inspection, real estate acquisition and development, remodeling and improvement services, general contracting and other circumstances, it may be desirable to view information about the interior of a house, office, or other building without having to physically travel to and enter the building, including to determine actual as-built information about the building rather than design information from before the building is constructed. However, it can be difficult or impossible to effectively display visual information about building interiors to users at remote locations, such as to enable a user to fully understand the layout and other details of the interior, including under varying conditions.

BRIEF DESCRIPTION OF THE DRAWINGS

FIGS. 5A-5B illustrate an example embodiment of a flow diagram for a Floor Map Generation Manager (FMGM) system routine in accordance with an embodiment of the present disclosure.

FIG. 6 illustrates an example embodiment of a flow diagram for a Building Information Integrated Presentation (BIIP) system routine in accordance with an embodiment of the present disclosure.

DETAILED DESCRIPTION

Figure 1:
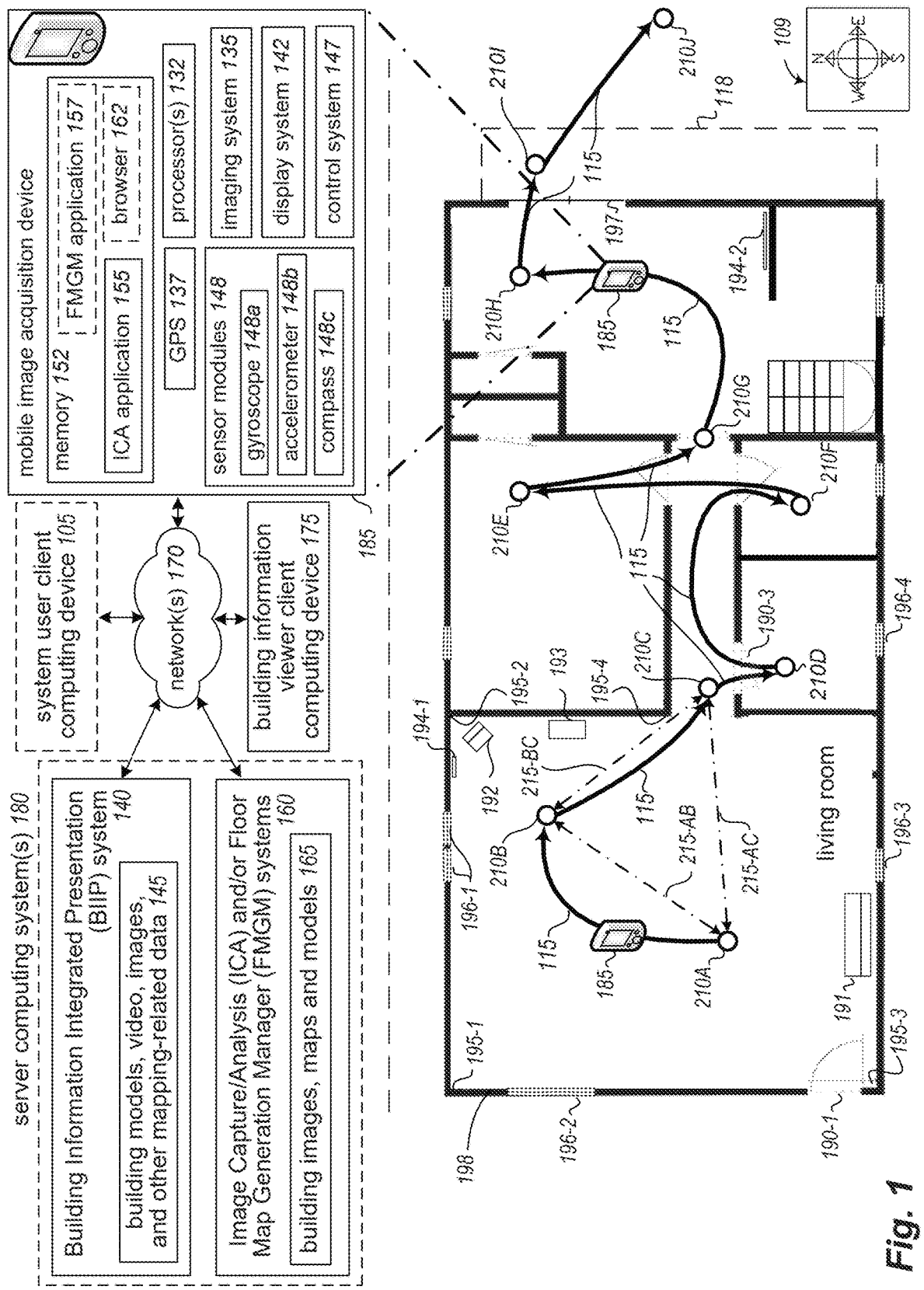
FIG. 1 is a diagram depicting an exemplary building interior environment and computing system(s) for use in embodiments of the present disclosure, including to generate and present information representing the building interior.

The present disclosure describes techniques for using one or more computing devices to perform automated operations related to providing visual information of multiple types about a defined area, such as information about a building that is presented in an integrated manner and by using a computer model of the building's interior. In at least some embodiments, the techniques include generating and presenting a GUI (graphical user interface) on a client device that includes a visual representation of a computer model of the building's interior with one or more first types of information (e.g., in a first pane of the GUI), and to simultaneously present other types of related information about the building interior (e.g., in one or more additional separate panes of the GUI) that is coordinated with the first type(s) of information being currently displayed. The building may, for example, be a house, the computer model of the building's interior may be a 3D (three-dimensional) or 2.5D (two and a half dimensional) or 2D (two-dimensional) floor plan representation that is generated after the house is built and that shows the house's actual interior (e.g., types of building information such as walls; windows; doors; stairs; fireplaces; kitchen islands; cabinets; counters; lighting and/or plumbing fixtures and associated built-in elements such as sinks and showers/baths; built-in and/or moveable appliances, such as ovens, stoves, trash compactors, water heaters, HVAC equipment, refrigerators, washers, dryers, etc.; types of infrastructure, such as using wiring and/or piping, including electrical outlets, cable outlets, telephone outlets, air vents, sprinklers, speaker locations, security cameras, etc.; curtains and other furnishings; materials used for surfaces such as kitchen countertops, wallpaper, paint, floor coverings, etc.; furniture; fire extinguishers; etc.), and the types of presented information about the building interior may include visualizations of the computer model (e.g., 3D and/or 2D and/or 2.5D), panorama images (e.g., 360° panorama images with 360° of coverage around a vertical axis), 2D (two-dimensional) perspective photos and other images, videos, an interactive tour of inter-connected viewing/capture locations, and various other types of information. Additional details are included below regarding the automated operations of the computing device(s) involved in the generating and presenting of the various types of coordinated information about a building's interior, and some or all of the techniques described herein may, in at least some embodiments, be performed at least in part via automated operations of a Building Information Integrated Presentation ("BIIP") system, as discussed further below.

The types of information that are presented about a building's interior (and in some cases surroundings) may have various forms in various embodiments, and may be acquired in various manners. In addition, at least some of those types of information may be associated with corresponding positions in a computer model of the building (e.g., a 3D model with full height information represented; a 2.5D model with partial representations of height represented; a 2D floor map model without height represented, such as using an orthographic top view or other overhead schematic view; etc.). As one example, types of additional information about a building may include pieces of data such as one or more of the following, and may be associated with locations from which the information was captured and/or locations that are shown or otherwise represented in the captured information: photos or other images (e.g., 2D perspective images, 360 panorama images and/or other panorama images, etc.), such as to be associated with viewing locations (also referred to at times as 'capture locations' or 'recording locations' or 'viewing/capture locations') within the rooms of the building where they were taken; videos, such as to each include a sequence of multiple images and optionally associated audio and to optionally be associated with viewing locations within the rooms of the building where it is taken (e.g., as part of a 'virtual showing' tour video of the building in which a device at the building, sometimes referred to as a 'presenter device', records video of some or all of the inside and/or outside of the building, such as to provide a tour of the building, and transmits or otherwise provides that video over one or more computer networks to one or more other remote client devices, whether in a near-real-time or real-time manner, such as within milliseconds or seconds or minutes of the recording, or at a later time as part of playback of the video—when the video is transmitted in a near-real-time or real-time manner, it may further be part of an interactive communication session in which additional communications take place between the one or more client devices and optionally the presenter device, such as textual and/or audio communications, and such an interactive communication session may similarly take place during a playback of a prerecorded video between multiple devices receiving the playback); textual and/or audio annotations or other descriptions of particular points of interest (POIs) in the building's rooms or other locations, including types of building information automatically identified via analysis of visual data from acquired images for the building; other audio information, such as recordings of ambient noise that are associated with recording locations within the rooms of the building where they were taken; a time-lapse or other accelerated video and/or animation of an area in or around a home, such as from a front door and/or front window of a house to show traffic or other information over a first period of time (e.g., 1 hour, 4 hours, 8 hours, 12 hours, 24 hours, etc.) that is presented over a shorter period of time (e.g., 10 seconds, 30 seconds, 1 minute, 5 minutes, 10 minutes, etc.); other external information from an environment surrounding the building, such as about nearby buildings and/or vegetation (e.g., as identified from satellite or other external images of the building, such as taken from the building and/or from a nearby street or yard; as identified from data in one or more external databases or other information sources, such as street maps or other government records; etc.), whether by displaying the actual images or by generating and displaying visual representations of particular external elements that are identified and modeled from images or other external information sources; lighting information for an interior of a building and/or its surroundings, such as simulated lighting for one or more rooms of a building (e.g., to simulate daylight entering the one or more rooms at one or more defined times, to show actual lighting from interior lights in the one or more rooms at one or more defined times; etc.); in-room images for a room that are projected on the walls of the room shown in the model; user-generated and/or 'crowd-sourced' information provided by one or more end users about the building, such as interior and/or exterior images, descriptions, questions, answers, etc. that are associated with particular rooms or locations within rooms; estimated scale information such as room width, length and/or height dimensions; geographical location and/or orientation information for the building; a 2D (two-dimensional) floor map of the building interior, such as using an overhead schematic view (e.g., an orthographic top view); etc. Additional details are included elsewhere herein regarding types of information that may be presented about a building for a house or other building in a displayed GUI, such as in a coordinated and simultaneous manner and/or based at least in part on a generated computer model of the building.

In addition, the automated operations may include controlling how multiple types of information are presented in various embodiments about a building's interior (and in some cases, the building's surroundings), such as in a simultaneous and coordinated manner, a sequential manner (e.g., as selected by a user), etc. In at least some embodiments, such automated operations include presenting a GUI with multiple panes that are simultaneously displayed, and with each pane including information of a different type that are all related to a common location or area in the building interior or other common aspect/feature of the building interior. As one non-exclusive example, a first pane may be displaying a photo taken in a room of the building to show at least some of that room, a second pane may be displaying a portion of a 3D computer model of the building that includes the room, and a third pane may be displaying a video taken within the room or a part of an interactive tour of the building that includes one or more viewing locations situated within the room—in addition, in at least some embodiments, one of the panes may be a primary pane (e.g., that is larger than other secondary panes, and/or that has user-selectable controls via which the user may interact with the content shown in that pane in various manners), and the GUI may further enable the user to easily switch content between the primary pane and one of the secondary panes, or to otherwise change information shown in one or more of the panes. In other embodiments and/or situations, only a single pane may be displayed, in which multiple types of information about a building may be sequentially displayed, such as in response to selections by a user.

Various user-selectable controls may also be displayed in or otherwise associated with one or more of the displayed panes (e.g., with the primary pane, and optionally in a contextual manner based on the type of content displayed in the primary pane) and provide functionality to make various types of modifications to the displayed information, such as one or more of the following: to change the contents of a secondary pane to a primary pane; to change the contents of the primary pane or a secondary pane to another type of information that is not currently displayed, with the new information of the other type similarly being coordinated with the content currently displayed in the other panes; to change the contents of a single displayed pane with at least one type of information about a building, such as to another type of information for the building that is not currently displayed, to information about another building, etc.; to toggle on and off one or more additional types of information that are overlaid on the contents of a pane, such as textual and/or audio descriptions, information about points of interest (including types of building information automatically identified via analysis of visual data from acquired images for the building), questions and/or answers, lighting information, etc.; to add user-specified content (e.g., a photo, a description, a question, etc.) to the content of a particular pane and/or to a location of the building shown in that pane; etc. Additional details are included elsewhere herein regarding the presentation of one or more types of information about a building, including about types of user-selectable controls and other user selections in a displayed GUI, such as for multiple types of information about a building that are displayed in a simultaneous and coordinated manner.

The described techniques provide various benefits in various embodiments, including to use 3D models and/or 2.5D models and/or 2D floor map models of multi-room buildings and other structures (e.g., that are generated from images acquired in the buildings or other structures) to display various types of information about building interiors, such as in a coordinated and simultaneous manner with other types of related information, including to use information about the actual as-built buildings (e.g., internal structural components and/or other interior elements, nearby external buildings and/or vegetation, actual building geographical location and/or orientation, actual typical weather patterns, etc.) rather than using information from plans on how the building is designed and should theoretically be constructed. Such described techniques may further provide benefits in at least some embodiments for allowing improved automated navigation of a building by mobile devices (e.g., semi-autonomous or fully-autonomous vehicles) via use of information of various types, including to significantly reduce their computing power used and time used to attempt to otherwise learn a building's layout. In addition, in some embodiments the described techniques may be used to provide an improved GUI in which an end user may more accurately and quickly obtain information about a building's interior (e.g., for use in navigating that interior, such as via a virtual interactive tour), including in response to search requests, as part of providing personalized information to the end user, as part of providing value estimates and/or other information about a building to an end user, etc. Various other benefits are also provided by the described techniques, some of which are further described elsewhere herein.

For illustrative purposes, some embodiments are described below in which specific types of information are acquired, generated, used and/or presented in specific ways for specific types of structures and by using specific types of devices—however, it will be understood that the described techniques may be used in other manners in other embodiments, and that the invention is thus not limited to the exemplary details provided. As one non-exclusive example, while various types of information related to house interiors may be used in some situations, it will be appreciated that one or more of such information types may be similarly used in other embodiments for other types of buildings (or other structures or layouts) separate from houses and/or for other parts of a house or other building (e.g., for external walls; surrounding yards; surrounding supplemental structures, such as a garage, shed, barn, etc.; roofs; etc.). As another example, while various types of information for models of houses or other buildings may be used for display to assist viewers in navigating the buildings or otherwise understanding the buildings' interiors, at least some such types of information may be used in other manners in other embodiments. In addition, the term "building" refers herein to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls, department stores, warehouses, etc.), etc. The term "acquire" or "capture" as used herein with reference to a building interior, viewing location, or other location (unless context clearly indicates otherwise) may refer to any recording, storage, or logging of media, sensor data, and/or other information related to spatial and/or visual characteristics of the building interior or subsets thereof, such as by a recording device or by another device that receives information from the recording device. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

Figure 2A:
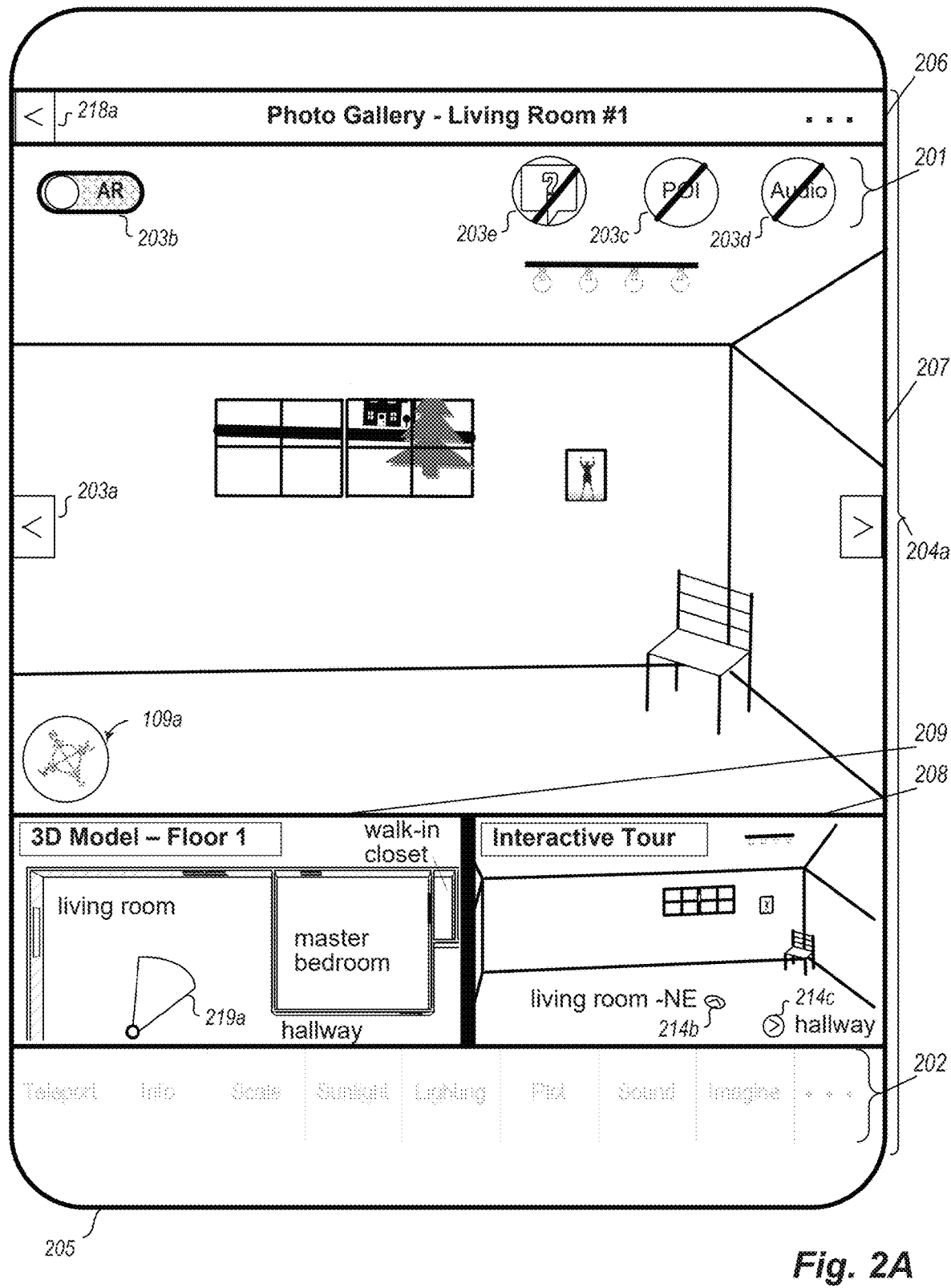
FIGS. 2A-2X illustrate examples of automated operations for presenting visual information that includes a 3D (three-dimensional) computer model of a building's interior along with multiple additional types of information about the building interior in a simultaneous and coordinated manner.

FIG. 1 is an example block diagram of various computing devices and systems that may participate in the described techniques in some embodiments. In particular, an Interior Capture and Analysis ("ICA") system (e.g., a system 160 that is executing on one or more server computing systems 180, and/or a system provided by application 155 executing on one or more mobile image acquisition devices 185) has acquired images 165 (e.g., 360° spherical panorama images in equirectangular format), such as with respect to one or more buildings or other structures (not shown in FIG. 1), and a Floor Map Generation Manager ("FMGM") system (e.g., a system 160 that is executing on one or more server computing systems 180, and/or a system provided by application 157 executing on one or more mobile image acquisition devices 185) has used the acquired images 165 and optionally other information to generate one or more 2D floor maps 165 and/or computer models 165 (e.g., 3D and/or 2.5D models) for the one or more buildings or other structures. FIG. 1 shows one example of acquisition of panorama images for a particular house at multiple capture/viewing locations 210 (e.g., 210A-210J) within the house interior and exterior (e.g., with location 210I on an external area 118, such as a deck or patio, and location 210J in another external area, such as a patio or backyard or garden), and FIGS. 2A-2X illustrate additional details about using a computer model generated from such panorama images to control how multiple types of information are presented about the house, such as in a simultaneous and coordinated manner, and as discussed further below.

A BIIP (Building Information Integrated Presentation) system 140 is further executing on one or more server computing systems to use building models, maps and images 145 (e.g., acquired from information 165) and/or other mapping-related information or associated information (not shown) in order to control the presentation of multiple types of information (including such building models 145) about the house or other building, such as in a simultaneous and coordinated manner. As part of doing so, the BIIP system may receive requests or instructions or other information via computer network(s) 170 from end users of building information viewer client computing devices 175 about types of information to include, before generating and providing such information for display on the client computing devices 175, and may further optionally obtain and use supporting information in some embodiments supplied by BIIP system operator users via computing devices 105 and intervening computer network(s) 170 to configure or modify operations of the BIIP system. Additional details related to the automated operation of the BIIP system are included elsewhere herein, including with respect to FIGS. 2A-2X and FIG. 6. In some embodiments, the ICA system(s) 160 and/or FMGM system(s) 160 and/or BIIP system 140 may execute on the same server computing system(s), such as if two or more of the systems are operated by a single entity or are otherwise executed in coordination with each other (e.g., with some or all functionality of such systems integrated together into a larger system), while in other embodiments the BIIP system may instead operate separately from such an ICA system (e.g., without an ICA system by instead obtaining panorama images or other images from one or more external sources) and/or may instead operate separately from such an FMGM system (e.g., without an FMGM system by instead obtaining 2D floor maps or other computer models of buildings from one or more external sources).

Various components of the mobile image acquisition device 185 are illustrated in FIG. 1, including a browser 162 and/or an ICA system application 155 and/or an FMGM system application 157 that are executed in memory 152 of the device 185 by one or more hardware processors 132, and including one or more imaging systems 135 to acquire visual data. The illustrated embodiment of mobile device 185 further includes one or more sensor modules 148 that include a gyroscope 148a, accelerometer 148b and compass 148c in this example (e.g., as part of one or more IMU units, not shown separately, on the mobile device), optionally a GPS (or Global Positioning System) sensor 137 or other position determination sensor (not shown in this example), a display system 142, a control system 147 to control acquisition of images (e.g., to rotate the mobile device), etc.—while not illustrated in this example, in some embodiments the device 185 may further have or be associated with one or more depth sensors or other distance-sensing devices that provide depth data to surrounding objects, while in other embodiments the device 185 does not have any such associated depth sensors or other distance-sensing devices. Other computing devices/systems 105, 175 and 180 may include various hardware components and stored information in a manner analogous to mobile device 185, but are not shown in this example for the sake of brevity, although some related further details are discussed below with respect to FIG. 3.

In the example of FIG. 1, the ICA system may perform automated operations involved in acquiring multiple images at multiple associated viewing locations (e.g., in multiple rooms or other locations within a building or other structure and optionally around some or all of the exterior of the building or other structure), such as using visual data acquired via the mobile device(s) 185, and for subsequent use in generating and providing a representation of an interior of the building or other structure. For example, in at least some such embodiments, such techniques may include using one or more mobile devices (e.g., a camera having one or more fisheye lenses or other lenses that simultaneously capture 360° horizontally around a vertical axis, such as to produce a 360° spherical panorama image without rotation; a camera having one or more fisheye lenses or other lenses that capture less than 360° horizontally at a given time, and that is mounted on a rotatable tripod or otherwise having an automated rotation mechanism to enable 360° image capture over a period of time corresponding to the rotation; a smart phone held and moved by a user, such as to rotate the user's body and held smart phone in a 360° circle around a vertical axis; a camera held by or mounted on a user or the user's clothing; a camera mounted on an aerial and/or ground-based drone or robotic device; etc.) to capture data from a sequence of multiple viewing locations within multiple rooms of a house (or other building), and to optionally further capture data involved in movement or travel between some or all of the viewing locations for use in linking the multiple viewing locations together, but without having distances between the viewing locations being measured or having other measured depth information to objects in an environment around the viewing locations (e.g., without using any depth-sensing sensors). After a viewing location's information is captured, the techniques may include producing a panorama image from that viewing location (e.g., a 360° panorama image that includes 360° of horizontal coverage around a vertical axis, a 360° spherical panorama image that further shows the surrounding room in an equirectangular format, another type of panorama image in another format, etc.), and then providing the panorama images for subsequent use by an FMGM system and/or BIIP system. Additional details related to embodiments of a system providing at least some such functionality of an ICA system are included in U.S. Non-Provisional patent application Ser. No. 16/236,187, filed Dec. 28, 2018 and entitled "Automated Control Of Image Acquisition Via Use Of Acquisition Device Sensors"; in U.S. Non-Provisional patent application Ser. No. 16/190,162, filed Nov. 14, 2018 and entitled "Automated Mapping Information Generation From Inter-Connected Images"; and in U.S. Non-Provisional patent application Ser. No. 15/649,434, filed Jul. 13, 2017 and entitled "Connecting And Using Building Interior Data Acquired From Mobile Devices" (which includes disclosure of a BICA system that is one example embodiment of an ICA system generally directed to obtaining and using panorama images from within one or more buildings or other structures); each of which is incorporated herein by reference in its entirety.

In the example of FIG. 1, the FMGM system may perform automated operations involved in using images acquired at multiple associated viewing locations (e.g., in multiple rooms or other locations within a building or other structure and optionally around some or all of the exterior of the building or other structure) to generate a 2D floor map for the building or other structure and/or to otherwise generate a computer model for the building or other structure (e.g., a 3D model and/or a 2.5D model), such as by analyzing visual information available in the images, and for providing a representation of an interior of the building or other structure (e.g., for subsequent use in controlling the simultaneous and coordinated presentation of multiple types of information about the interior of the building or other structure). For example, in at least some such embodiments, such techniques may include analyzing one or more images taken in a room to determine a shape of the room and/or to identify inter-room passages (e.g., doorways and other openings in walls) into and/or out of the room. After the shapes of some or all of the rooms are determined, the techniques may further include positioning the room shapes relative to each other to form a 2D floor map (e.g., based at least in part on connecting inter-room passages between rooms, and optionally using travel or other movement information captured between the viewing locations to determine relative locations of the viewing locations with respect to each other), optionally combined with height and/or other size information to generate a 3D and/or 2.5D model of the building or other structure, and then providing the generated computer model(s) and optionally 2D floor map for subsequent use by the BIIP system. Additional details related to embodiments of a system providing at least some such functionality of an FMGM system are included in U.S. Non-Provisional patent application Ser. No. 16/190,162, filed Nov. 14, 2018 and entitled "Automated Mapping Information Generation From Inter-Connected Images"; and in U.S. Provisional Patent Application No. 62/893,108, filed Aug. 28, 2019 and entitled "Automated Tools For Generating Mapping Information For Buildings" (which includes disclosure of an MIGM system that is one example embodiment of a FMGM system generally directed to generating floor maps and other computer models for one or more buildings or other structures based in part of input from one or more system operator users); each of which is incorporated herein by reference in its entirety.

One or more end users (not shown) of one or more building information viewer client computing devices 175 may each further interact over computer networks 170 with the BIIP system 140 (and optionally the ICA system 160 and/or FMGM system 160), such as to obtain, display and interact with a generated 3D computer model and/or other model (e.g., a 2D floor map) that are part of multiple types of information about the house or other building being presented in a GUI displayed on a device 175 (e.g., based at least in part on user-specified conditions), such as in a simultaneous and coordinated manner. In addition, while not illustrated in FIG. 1, a 3D computer model (or portion of it) and/or other model (e.g., 2D floor map) may be linked to or otherwise associated with one or more additional types of information, such as one or more associated and linked images or other associated and linked information, including for a two-dimensional ("2D") floor map of a building to be inter-linked with or otherwise associated with a separate 2.5D model rendering of the building and/or a 3D floor plan model rendering of the building, etc., and including for a computer model and/or floor map of a multi-story or otherwise multi-level building to have multiple associated sub-floor models or maps for different stories or levels that are interlinked (e.g., via connecting stairway passages). Accordingly, non-exclusive examples of an end user's interactions with a displayed or otherwise generated computer model (e.g., a 2.5D or 3D model view that optionally includes images texture-mapped to walls of the displayed model) and/or 2D floor map of a building may include one or more of the following: to change between a computer model view and a floor map view (collectively referred to herein as one or more mapping views); to change between a mapping view and a view of a particular image at a viewing location within or near the building's interior; to change the horizontal and/or vertical viewing direction from which a corresponding subset view of (or portal into) a panorama image is displayed, such as to determine a portion of a panorama image in a 3D spherical coordinate system to which a current user viewing direction is directed, and to render a corresponding planar image that illustrates that portion of the panorama image without the curvature or other distortions present in the original panorama image; etc. Additional details regarding embodiments of a system providing at least some such functionality of a BIIP system (such as to provide or otherwise support at least some functionality to an end user using a building information viewer system and routine as discussed herein) are included in U.S. Non-Provisional patent application Ser. No. 15/950,881, filed Apr. 11, 2018 and entitled "Presenting Image Transition Sequences Between Viewing Locations" (which includes disclosure of an ILTM system that is one example embodiment of a BIIP system generally directed to generating and displaying transitions between images captured at different viewing locations); and in U.S. Provisional Patent Application No. 62/911,959, filed Oct. 7, 2019 and entitled "Providing Simulated Lighting Information For Three-Dimensional Building Models" (which includes disclosure of a BMLSM system that is one example embodiment of a BIIP system generally directed to generating and displaying simulated lighting information in a three-dimensional model of a building's interior); each of which is incorporated herein by reference in its entirety. For example, a computer model of an interior of a house or other building may be a 3D (three-dimensional) or 2.5D (two and a half dimensional) representation that is generated after the house is built and that shows physical components of the house's actual interior (e.g., walls, windows, doors, stairs, fireplaces, kitchen islands, cabinets, counters, lighting and/or plumbing fixtures and associated built-in elements such as sinks and showers/baths, curtains, wallpaper or paint, floor coverings, etc.), such as from analysis of images acquired in the house's interior to reflect a current structure of the house (and optionally non-fixed or temporary elements in the house, such as furniture and/or furnishings). In some embodiments, automated operations may be performed that are involved in using images acquired at multiple associated viewing locations (e.g., in multiple rooms or other locations within a building or other structure and optionally around some or all of the exterior of the building or other structure) to generate a 2D floor map for the building or other structure and/or to generate a computer model for the building or other structure (e.g., a 3D model and/or a 2.5D model), such as by analyzing visual information available in the images, and for providing a representation of an interior of the building or other structure (e.g., for subsequent use in generating and presenting conditions for the interior of the building or other structure)—for example, in at least some such embodiments, such techniques may include analyzing one or more images taken in a room to determine a shape of the room and/or to identify inter-room passages (e.g., doorways and other openings in walls) into and/or out of the room. In at least some embodiments, an automated analysis of some or all images may further be performed to determine corresponding information about the building interior, such as types of rooms, points of interest in particular locations, etc. In addition, a model of a building interior may be displayed in at least some embodiments to a user in a displayed GUI on a client computing device, and the user may be able to specify via the GUI (or in another manner) at least some of the conditions for how the display is generated, such as one or more of the following: one or more target times; an amount of the house or other building interior to display (e.g., one or more specific rooms, the entire interior, etc.); effects of changes to the building interior (e.g., adding or removing a window; adding or removing part or all of a wall; changing furnishings or moveable elements; changing the color and/or texture of a surface, such as a wall or a floor or a ceiling or a countertop; adding or removing lighting sources at specified locations; etc.); effects of changes outside the building interior (e.g., adding or removing or changing a tree or other vegetation in an environment surrounding the building, such as in a yard of a house; adding or removing or changing an exterior building or other external structure, whether on a same property as the building or a nearby property; etc.); a speed or rate at which an animation is displayed or other displayed information is changed; etc. In some embodiments, one or more types of additional information may be associated with and optionally displayed with a computer 3D model (e.g., with full height information represented) or computer 2.5D model (e.g., with partial representations of height shown) of a building's interior. As one example, one or more types of additional information about a building may be received, associated and displayed with such a model (e.g., with particular locations in particular rooms) or otherwise accessible from the displayed model (e.g., upon selection by a user), such as one or more of the following: images; textual and/or audio annotations or other descriptions of particular rooms or other locations; other audio information, such as recordings of ambient noise; estimated room width, length and/or height dimensions; external information from an environment surrounding the building, such as about nearby buildings and/or vegetation (e.g., as identified from satellite or other external images of the building, such as taken from the building and/or from a nearby street or yard; as identified from data in one or more external databases or other information sources, such as street maps or other government records; etc.), whether by displaying the actual images or by generating and displaying visual representations of particular external elements that are identified and modeled from images or other external information sources; in-room images for a room that are projected on the walls of the room shown in the model; geographical location and/or orientation information for the building; user-generated and/or 'crowd-sourced' information provided by one or more end users about the building, such as interior and/or exterior images, descriptions, etc.; a 2D (two-dimensional) floor map of the building interior, such as using an overhead schematic view (e.g., an orthographic top view); etc. A floor map for a house may, for example, be presented to an end user in a GUI, such as with room labels added to some or all rooms (e.g., "living room"), room dimensions for some or all rooms, visual indications of fixtures or appliances or other built-in features for some or all rooms (e.g., for the bathroom), visual indications of positions of additional types of associated and linked information may be added (e.g., of panorama images and/or perspective images that an end user may select for further display, of audio annotations and/or sound recordings that an end user may select for further presentation, etc., as shown in the living room and master bedroom and kitchen/dining room), visual indications of doors and windows may be shown, etc. In addition, a user-selectable control 228 may be used to indicate a current floor that is displayed for the floor map, and to allow the end user to select a different floor to be displayed—in some embodiments, a change in floors or other levels may also be made directly from the floor map, such as via selection of a connecting passage, such as the stairs to floor 2 in the illustrated floor map. In addition, while not illustrated in FIG. 1, in some embodiments the client computing devices 175 (or other devices, not shown) may receive and use generated computer models and/or other generated mapping-related information in additional manners, such as to control or assist automated navigation activities by those devices (e.g., by autonomous vehicles or other devices), whether instead of or in addition to display of the generated information.

In the depicted computing environment of FIG. 1, the network 170 may be one or more publicly accessible linked networks, possibly operated by various distinct parties, such as the Internet. In other implementations, the network 170 may have other forms, such as to instead be a private network (such as a corporate or university network) that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks and connections in various situations.

FIG. 1 depicts a block diagram of an exemplary building interior environment in which images are acquired and for which one or more computer models and/or 2D floor maps are generated, such as for further use by the BIIP system to control the simultaneous and coordinated presentation of multiple types of information about the interior of the house, as discussed in greater detail with respect to FIGS. 2A-2X, as well as for use in some embodiments in otherwise presenting the computer models and/or floor maps and/or images to users. In particular, FIG. 1 illustrates a first story of a multi-story building 198 (e.g., with a partial or full basement and/or a second story, not shown) with an interior that was captured at least in part via multiple panorama images, such as by a mobile image acquisition device 185 with image acquisition capabilities as it is moved through the building interior to a sequence of multiple viewing locations 210 (e.g., starting at viewing location 210A, moving to viewing location 210B along travel path 115, etc.). An embodiment of the ICA system (e.g., ICA system 160 on server computing system(s) 180, a copy 155 of some or all of the ICA system executing on the mobile image acquisition device 185, etc.) may automatically perform or assist in the capturing of the data representing the building interior, as well as to further analyze the captured data to generate panorama images to provide a visual representation of the building interior, and an embodiment of the FMGM system (e.g., FMGM system 160 on server computing system(s) 180, a copy 157 of some or all of the FMGM system executing on the mobile image acquisition device 185, etc.) may automatically perform or assist in the generation of one or more computer models and/or a 2D floor map representing the building interior. While such a mobile image acquisition device may include various hardware components, such as a camera, one or more sensors (e.g., a gyroscope, an accelerometer, a compass, etc., such as part of one or more IMUs, or inertial measurement units, of the mobile device; an altimeter; light detector; etc.), a GPS receiver, one or more hardware processors, memory, a display, a microphone, etc., the mobile device may not in at least some embodiments have access to or use equipment to measure the depth of objects in the building relative to a location of the mobile device, such that relationships between different panorama images and their viewing locations may be determined in part or in whole based on features in different images, but without using any data from any such depth sensors, while in other embodiments one or more such depth sensors or other distance-sensing devices may provide depth data that is used in combination with other information from analysis of visual data of captured images. In addition, while geographical orientation/directional indicator 109 is provided in FIG. 1 for reference of the viewer, the mobile device and/or ICA system and/or FMGM system may not use such absolute directional information in at least some embodiments, such as to instead determine relative directions and distances between viewing locations 210 without regard to actual geographical positions or directions in such embodiments.

In operation, the mobile image acquisition device 185 arrives at a first viewing location 210A within a first room of the building interior (in this example, in a living room accessible via an external door 190-1), and captures a view of a portion of the building interior that is visible from that viewing location 210A (e.g., some or all of the first room, and optionally small portions of one or more other adjacent or nearby rooms, such as through doors, halls, stairs or other connecting passages from the first room). The view capture may be performed in various manners as discussed herein, and may capture information about a number of objects or other features (e.g., structural details) that are visible in images captured from the viewing location—in the example of FIG. 1, such objects or other features throughout the house include the doorways 190 (including 190-1 and 190-3) and 197 (e.g., with swinging and/or sliding doors), windows 196 (including 196-1, 196-2, 196-3 and 196-4), corners or edges 195 (including corner 195-1 in the northwest corner of the building 198, corner 195-2 in the northeast corner of the first room, corner 195-3 in the southwest corner of the first room, corner 195-4 at the northern edge of the inter-room passage between the first room and a hallway, etc.), furniture 191-193 (e.g., a couch 191; chair 192; table 193; etc.), pictures or paintings or televisions or other hanging objects 194 (such as 194-1 and 194-2) hung on walls, light fixtures, various built-in appliances or fixtures (not shown), other types of building information, etc. The user may also optionally provide a textual or auditory identifier (or 'label' or 'tag') to be associated with a viewing location, such as "living room" for the room including viewing locations 210A and/or 210B and/or identifiers "entry" and "living room-NE" for the viewing locations 210A and 210B, respectively, while in other embodiments the ICA system and/or FMGM may automatically generate some or all such identifiers (e.g., by automatically analyzing video and/or other recorded information for a building to perform a corresponding automated determination, such as by using machine learning) or the BIIP system may determine such identifiers (e.g., based at least in part on input from BIIP system operator users and/or end users) or the identifiers may not be used. For example, the BIIP, FMGM and/or ICA system may use machine learning or other techniques (e.g., visual analysis techniques) to analyze video (e.g., in a near-real-time or real-time manner with respect to its recording and/or presentation) to determine a textual tag/label or other identifier to be associated with each of one or more rooms or other areas shown in the video (or each of one or more positions from which one or more image frames of the video are captured), such as by using one or more neural networks or other machine learning models that have been trained to associate such tags/labels or other identifiers with visual data of video or other image sequences-such video may, for example, be part of a virtual showing tour, whether for video being transmitted in a real-time or near-real-time manner relative to its recording, or for a later playback of such a prerecorded video. Additional details related to such automated determination of textual tags/labels or other identifiers for visual data of one or more images (e.g., a video or other sequence of images) are included in U.S. Non-Provisional patent application Ser. No. 17/080,604 (now U.S. Pat. No. 11,164,361), filed Oct. 26, 2020 and entitled "Generating Floor Maps For Buildings From Automated Analysis Of Visual Data Of The Buildings' Interiors"; U.S. Non-Provisional patent application Ser. No. 17/013,323 (now U.S. Pat. No. 11,514,674), filed Sep. 4, 2020 and entitled "Automated Analysis Of Image Contents To Determine The Acquisition Location Of The Image"; U.S. Non-Provisional patent application Ser. No. 17/069,800, filed Oct. 13, 2020 and entitled "Automated Tools For Generating Building Mapping Information"; U.S. Non-Provisional patent application Ser. No. 17/472,527, filed Sep. 10, 2021 and entitled "Automated Identification And Use Of Building Floor Plan Information"; U.S. Non-Provisional patent application Ser. No. 17/150,958 (now U.S. Pat. No. 11,252,329), filed Jan. 15, 2021 and entitled "Automated Determination Of Image Acquisition Locations In Building Interiors Using Multiple Data Capture Device"; U.S. Non-Provisional patent application Ser. No. 17/201,996 (now U.S. Pat. No. 11,481,925), filed Mar. 15, 2021 and entitled "Automated Determination Of Image Acquisition Locations In Building Interiors Using Determined Room Shapes"; U.S. Non-Provisional patent application Ser. No. 17/185,793, filed Feb. 25, 2021 and entitled "Automated Usability Assessment Of Buildings Using Visual Data Of Captured In-Room Images"; and U.S. Non-Provisional patent application Ser. No. 17/459,820, filed Aug. 27, 2021 and entitled "Automated Mapping Information Generation From Analysis Of Building Photos"; each of which is hereby incorporated by reference in its entirety.

After the first viewing location 210A has been adequately captured, the mobile device 185 may move or be moved to a next viewing location (such as viewing location 210B), optionally recording movement data such as video and/or other data from the hardware components (e.g., from one or more IMUs, from the camera, etc.) during movement between the viewing locations. At the next viewing location, the mobile device may similarly capture a panorama image from that viewing location. This process may repeat for some or all rooms of the building and optionally external to the building, as illustrated for viewing locations 210C-210J in this example. The acquired panorama images for each viewing location may be further analyzed, including in some embodiments to render or otherwise place each panorama image in an equirectangular format, whether at the time of image capture or later.

Various details are provided with respect to FIG. 1, but it will be appreciated that the provided details are non-exclusive examples included for illustrative purposes, and other embodiments may be performed in other manners without some or all such details.

FIGS. 2A-2X illustrate examples of presenting a GUI that simultaneously displays multiple types of information about an interior of a building in an integrated and coordinated manner, such as for the building 198 and using images and their viewing/capture locations 210 discussed in FIG. 1.

In particular, FIG. 2A illustrates an example embodiment of a GUI with various information 204a, which is displayed in this example on a mobile client device 205 (e.g., a smart phone or tablet), and which shows multiple types of information about a common area of example building 198. The GUI in this example includes a primary pane 207 and two secondary panes 208 and 209, with each of the panes showing information of a different type about the same area of the example house 198 shown in FIG. 1. The primary pane 207 is showing an image taken from viewing location 210A in the living room in this example, with the direction of the image being in the northeast direction (as shown by visual indicator 109a overlaid on the primary pane, as well as the visual indicator 219a shown in secondary pane 209). In this example, the primary pane 207 also includes a header 206 that provides a description of the type of content shown (here, an image, as illustrated by the "photo gallery" label), as well as optionally having an additional label specific to the photo or other image being displayed (here, "Living Room #1").

The primary pane 207 may also have one or more user-selectable controls that enable the end user (not shown) to modify information being displayed in the GUI, such as control 218a in the header area 206 to change the type of information being shown in the primary pane to a different type of content (e.g., by cycling through each of the available types of content). In addition, other possible user-selectable controls 201 are overlaid on the primary pane, such as a toggle control 203c to show or hide information about points of interest that are present in the current image (e.g., types of building information determined in part or in whole from automated analysis of visual data of captured images), a toggle control 203d to show or hide a description of the area of the house shown by the image, a toggle control 203e to show or hide information about questions and answers corresponding to the area of the house shown in the image and to optionally allow the end user to supply one or more additional questions or answers, a toggle control 203b to switch to a so-called "AR" (or augmented reality) mode in which tilting and rotating the body of the mobile device causes the displayed image to move accordingly (e.g., if the image shown in the primary pane is a 360° panorama image with only a subset of it currently shown, such that tilting to the left causes an additional portion of the panorama image to the left of the visible area to be shown, and with the control 203b not being shown if the content is not a panorama image), a selection control 203a to switch to another image in the photo gallery (e.g., to cycle through all available images), etc.—as discussed in greater detail elsewhere herein, in at least some embodiments and situations, some or all of the displayed user-selectable controls may be contextual based on a type of content currently shown in the primary pane (in this example, associated with image content).

In addition to the image shown in the primary pane of the northeast corner of the living room of the example house, the secondary panes 208 and 209 show other types of content about the same location or area of the example house. In particular, the secondary pane 209 in this example shows a portion of a 3D computer model of the house, and in particular shows a portion of the computer model that includes the northeast corner of the living room, as well as optionally including some or all of other parts of the same floor—as previously noted, the computer model is overlaid in this example with the visual indicator 219a to illustrate where the image shown in the primary pane was captured, and the orientation of the camera that captured the image. In addition, the secondary pane 208 in this example shows a portion of an interface to an interactive virtual tour of the house, with the interactive tour having a plurality of interconnected viewing/capture locations at which images and/or other information that are available for viewing or other presentation were captured. In this example, the interface includes an image that was also captured from viewing location 210A (e.g., a panorama image captured from that viewing location), with the interface further including visual indicators 214b and 214c that each correspond to other viewing locations different from viewing location 210A (in particular, to viewing locations 210B and 210C of FIG. 1, respectively)—as discussed in greater detail with respect to FIG. 2C, such visual indicators 214 may be user-selectable controls in at least some situations (e.g., when the interface to the interactive tour is shown in the primary pane) such that selection of one of the controls changes the image displayed to change to one from the viewing location associated with the selected control.

It will be appreciated that a variety of types of user interactions may occur with example embodiments of the GUI, such as to enable an end user (not shown) to select a secondary pane and cause its content to be moved to the primary pane, with new contents of that secondary pane being selected to correspond to the new primary pane contents (e.g., to move the contents that were in the primary pane to that secondary pane, to select a new content type to display in the secondary pane, etc.). Other optional user-selectable controls 202 are further shown in this example for reference purposes, although they may not be visible in some embodiments when three GUI panes are displayed as shown, such as if the controls 202 are associated with a different part of the GUI as discussed in greater detail with respect to FIG. 2F.

Figure 2B:
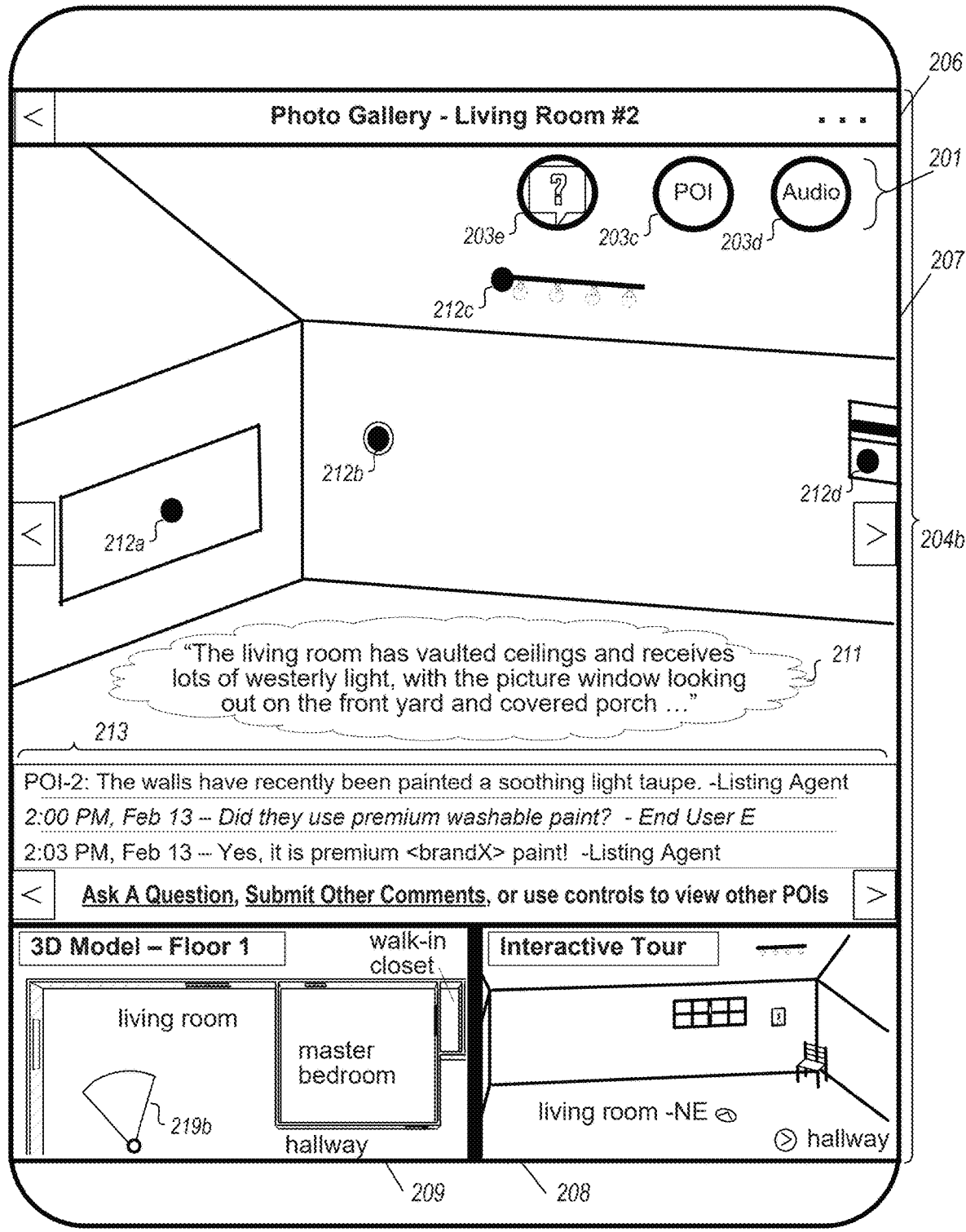

FIG. 2B continues the example of FIG. 2A, and in particular corresponds to the end user having selected the control 203a in FIG. 2A to change the image that is displayed in the primary pane to another image from the photo gallery. In this example, the new image displayed in the primary pane 207 as part of the updated information 204b in the updated GUI is also taken from the same viewing location 210A, but in a northwesterly direction (as illustrated by the updated visual indicator 219b shown in the 3D computer model of the secondary pane 209). In this example, the contents of the secondary pane 209 continue to be the same portion of the 3D computer model as in FIG. 2A (with the updated visual indicator 219b), which continues to correspond to the area of the house shown in the primary pane of FIG. 2B, and the contents of the secondary pane 208 continue to be the same portion of the interactive tour interface that correspond to the content of FIG. 2B as well (e.g., since the image in FIG. 2B continues to be taken from the same viewing/capture location as in FIG. 2A). It will be appreciated that the header portion 206 of the primary pane 207 is also updated in FIG. 2B to reflect the new image being shown in the primary pane, although in some embodiments such image-specific labels may not be used. It is also noted that the user-selectable controls 202 mentioned in FIG. 2A are not shown in FIG. 2B.

In addition, FIG. 2B further illustrates additional information that has been overlaid on the primary pane 207, based on selection by the end user of the user-selectable controls 203c, 203d and 203e in this example, although it will be appreciated that the end user may instead select only zero, one, or two of those three controls in other situations. In this example, selection of the user-selectable control 203c has caused several visual indicators 212 for points of interest in the room to be illustrated, with visual indicator 212b being currently selected and having a corresponding textual comment in the area 213 of the primary pane (to comment about paint on the walls of the room). Other visual POI indicators in this example include 212a on the west-facing picture window, 212d on the north-facing window, and 212c on the overhead track lighting on the ceiling. While the selected visual indicator 212b has associated text that is displayed in this example, other visual indicators for POIs may have other types of information associated, such as if the window visual indicators 212a and/or 212d have images and/or video associated with them, such as to show images or videos looking out the window (e.g., a time-lapse video over a 24-hour period of the exterior of the house from a window or door, such as to show road traffic or people traffic outside over that time period). FIG. 2P provides additional details about an example of automated analysis of visual data in an image captured in the building to identify types of building information to use for such POIs and/or to determine information to be displayed for such POIs, with additional details about such analysis included elsewhere herein. In addition to the activation of the control 203c, the user-selectable control 203d has also been activated to provide an audio description of the area shown in the image, with the visual information 211 shown in this example representing audio information that may be audibly presented in response to the selection of that control (e.g., instead of having a textual representation of the information as shown in this example, or instead in addition to the textual information, such as if a closed captioning option is selected). Furthermore, the user-selectable control 203b corresponding to questions and answers is also selected, causing additional information in the area 213 to be shown, such as a question from another end user and a corresponding answer from a real estate listing agent for the house, as well as further user-selectable controls to allow the end user to ask a question to be answered, submit a comment for display to others, or to cycle through other existing questions and comments. It will be appreciated that illustrated types of information may be presented in other manners in other embodiments, or may not be shown.

Figure 2C:
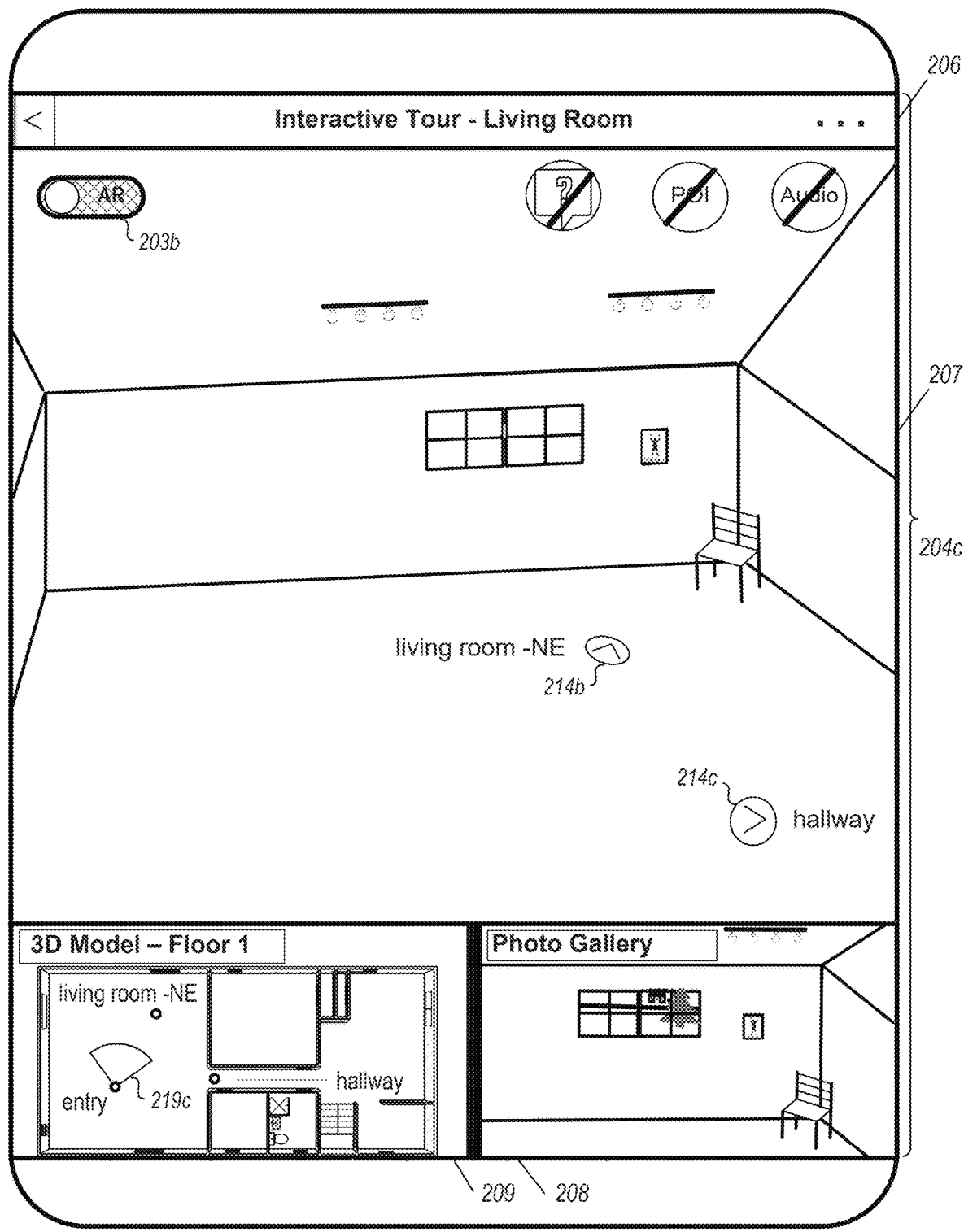
Figure 2D:
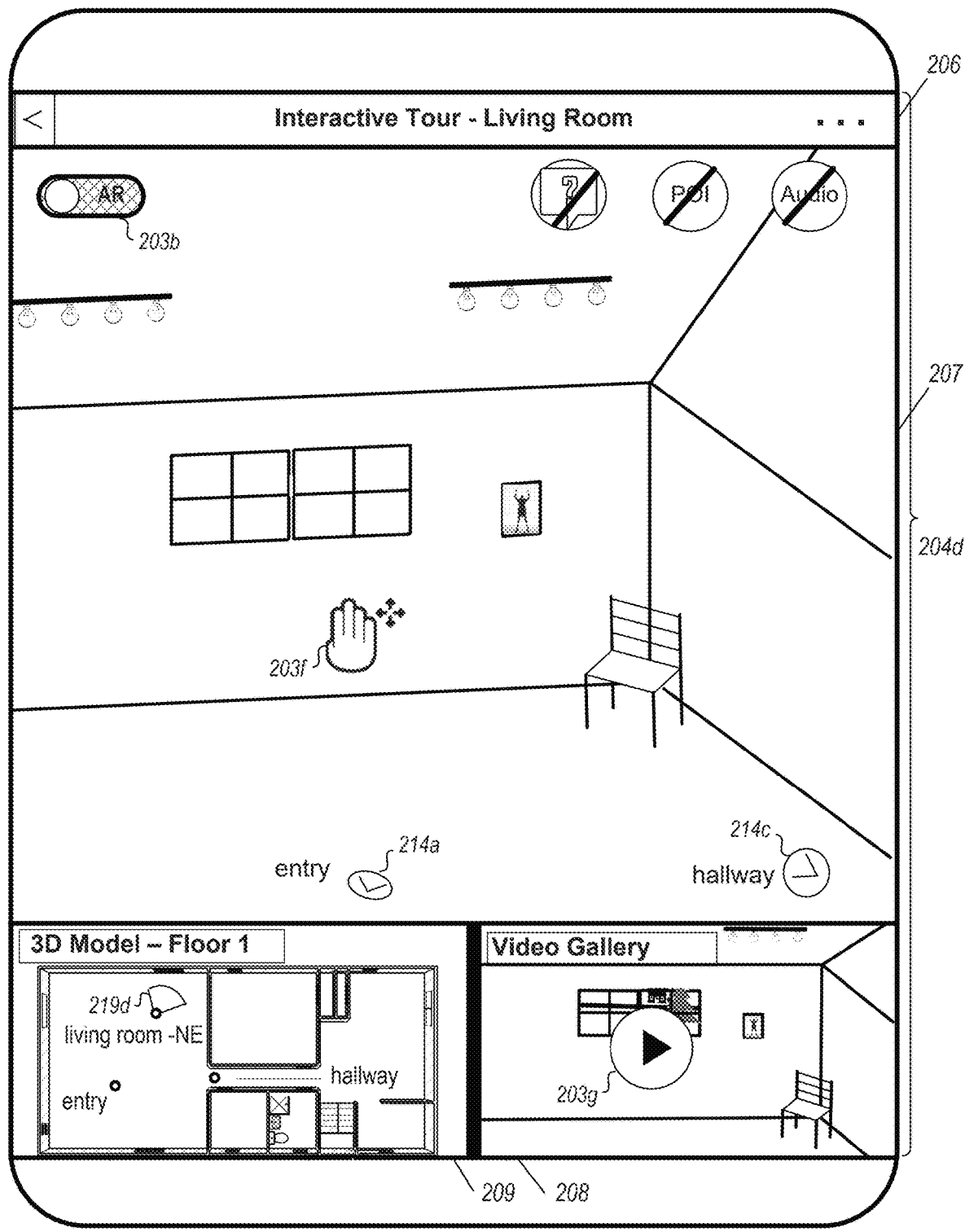

FIG. 2C continues the examples of FIGS. 2A-2B, and illustrates an example of the end user interacting with the GUI displayed in FIG. 2A to initiate a switch of the content between the primary pane 207 and the secondary pane 208, such that the primary pane 207 in the updated information 204c of the updated GUI of FIG. 2C is the interface to the interactive tour of the house, with the visual indicators 214b and 214c in FIG. 2C now being selectable by the user to change the current viewing location, as further illustrated with respect to FIG. 2D. In at least some embodiments and situations, the information displayed in the secondary pane 209 would not change in FIG. 2C (other than updating the visual indicator 219c), such as due to the content of the primary pane continuing to correspond to the same portion of the 3D computer model that was shown in FIGS. 2A and 2B—in this example, however, the information in the secondary pane 209 has been updated for the purposes of illustration to show the entire 3D computer model for the current floor of the house. In addition, contents of the secondary pane 208 have been updated in this example to show the image that was previously present in the primary pane in FIG. 2A. It will be appreciated that the header portion 206 of the primary pane 207 is also updated in FIG. 2C to reflect the new type of content being shown in the primary pane.

FIG. 2D continues the examples of FIGS. 2A-2C, and in this example corresponds to the end user having selected the user-selectable visual indicator 214b in FIG. 2C to change the current viewing location for the interactive tour. In response to that selection, the background image used for the interactive tour interface in the primary pane 207 of FIG. 2D has changed to the updated information 204d shown in the primary pane for the updated GUI, corresponding to an image taken from the viewing location 210B in the northeast part of the living room, and the user-selectable visual indicators in the primary pane have similarly been updated, with the direction of the previous indicator 214c changing to point to the direction of the hallway from the new background image that is shown, and with the previous visual indicator 214b for the northeast living room viewing location 210B (which is now the current viewing location) being changed to the new user-selectable visual indicator 214a for the entry viewing location 210A in the living room (which was the previous viewing location). In addition, a new visual indicator 203f has been added to reflect an alternative manner for the end user to adjust the panorama image shown as the background of the primary pane, such as to manually drag the image up, down, left and/or right to display other parts of the panorama image that are not currently visible in the subset shown in the primary pane, as discussed further in FIG. 2E. As in the previous examples, the visual indicator 219d in the 3D computer model of the secondary pane 209 has been updated to correspond to the location and orientation at which the new background image shown in the primary pane was captured. In addition, while the content previously shown in the secondary pane 208 of FIG. 2C may in some embodiments and situations continue to be shown in the secondary pane 208 in FIG. 2D, in this example the content has been changed for illustrative purposes to provide content of another type that corresponds to the same area of the house, which in this example is a video of at least that portion of the house. In this example, the video in the secondary pane 208 includes a visual indicator 203g of a play button for the video, although the visual indicator may not be user-selectable in at least some embodiments until the video content is moved to the primary pane.

Figure 2E:
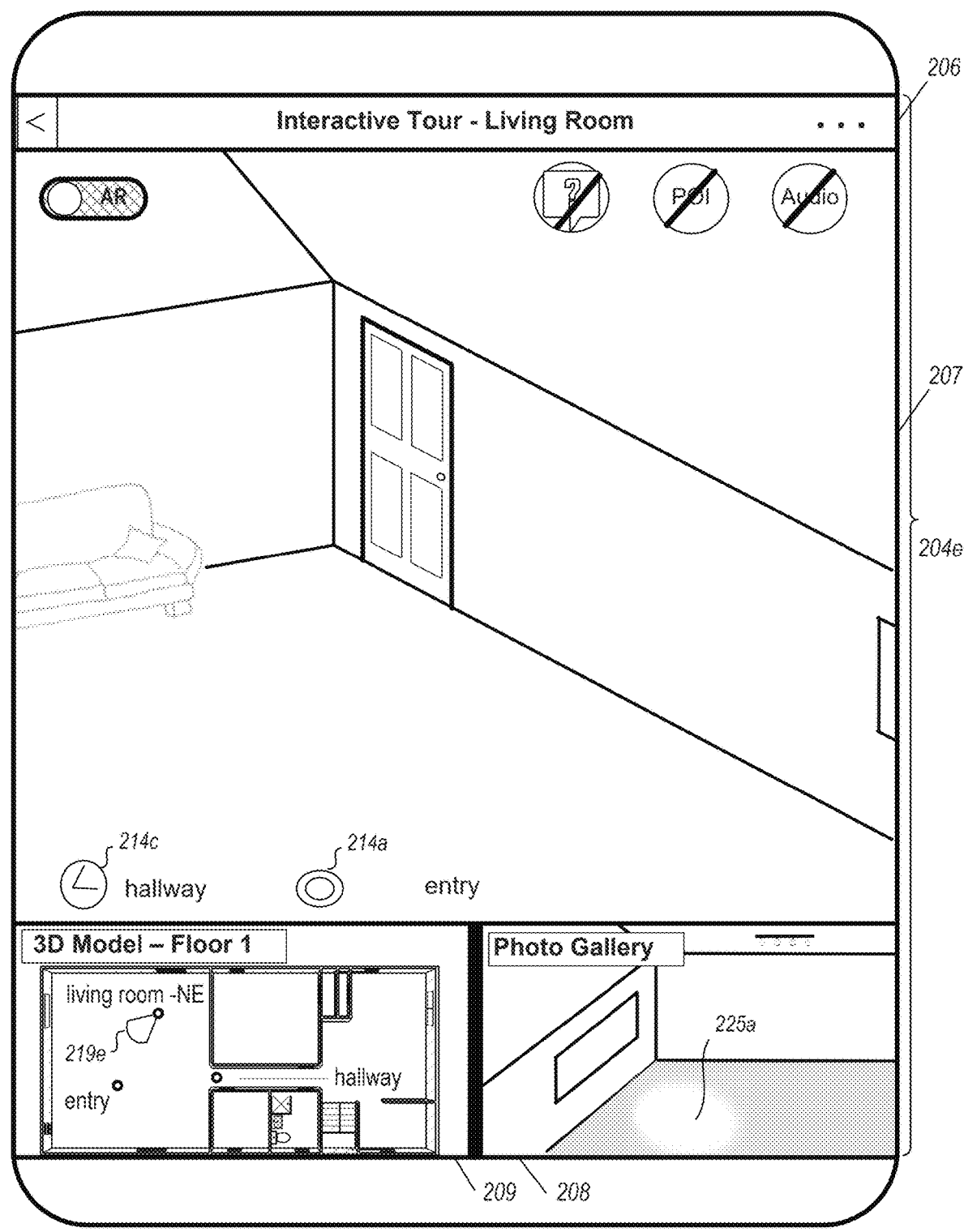

FIG. 2E continues the examples of FIG. 2A-2D, and in this example illustrates the effects of the end user having used the control 203f of FIG. 2D to change the subset of the background panorama image (e.g., a 360° panorama image) that is shown by rotating approximately 180°, so as to now point toward the southwest corner of the living room from the viewing location 210B in the northeast corner of the living room, as shown in the updated information 204e of the updated GUI. In this example, the user-selectable visual indicators 214c and 214a (for viewing locations 210C and 210A, respectively) have been updated to correspond to the positions of those viewing locations relative to the content shown in the background image, and the visual indicator 219e in the 3D computer model of the secondary pane 209 has been similarly updated. While the contents of the secondary pane 208 may be unchanged in this situation, the image in the photo gallery of secondary pane 208 has been changed in this example to an image that is closest to that of the current background image in the primary pane (so as to maintain a coordinated display of information that is integrated with the primary pane), which in this example is of the window of the west wall of the living room. In addition, this example further illustrates that additional types of information may be overlaid on images in at least some situations, such as in this example to overlay simulated lighting information 225a on that image (although a corresponding user-selectable control to initiate that display is not shown in this example). It will be appreciated that additional overlay information, such as that of the simulated lighting, may be controlled by the end user in various manners, including as is discussed in greater detail with respect to FIG. 2F.

Figure 2F:
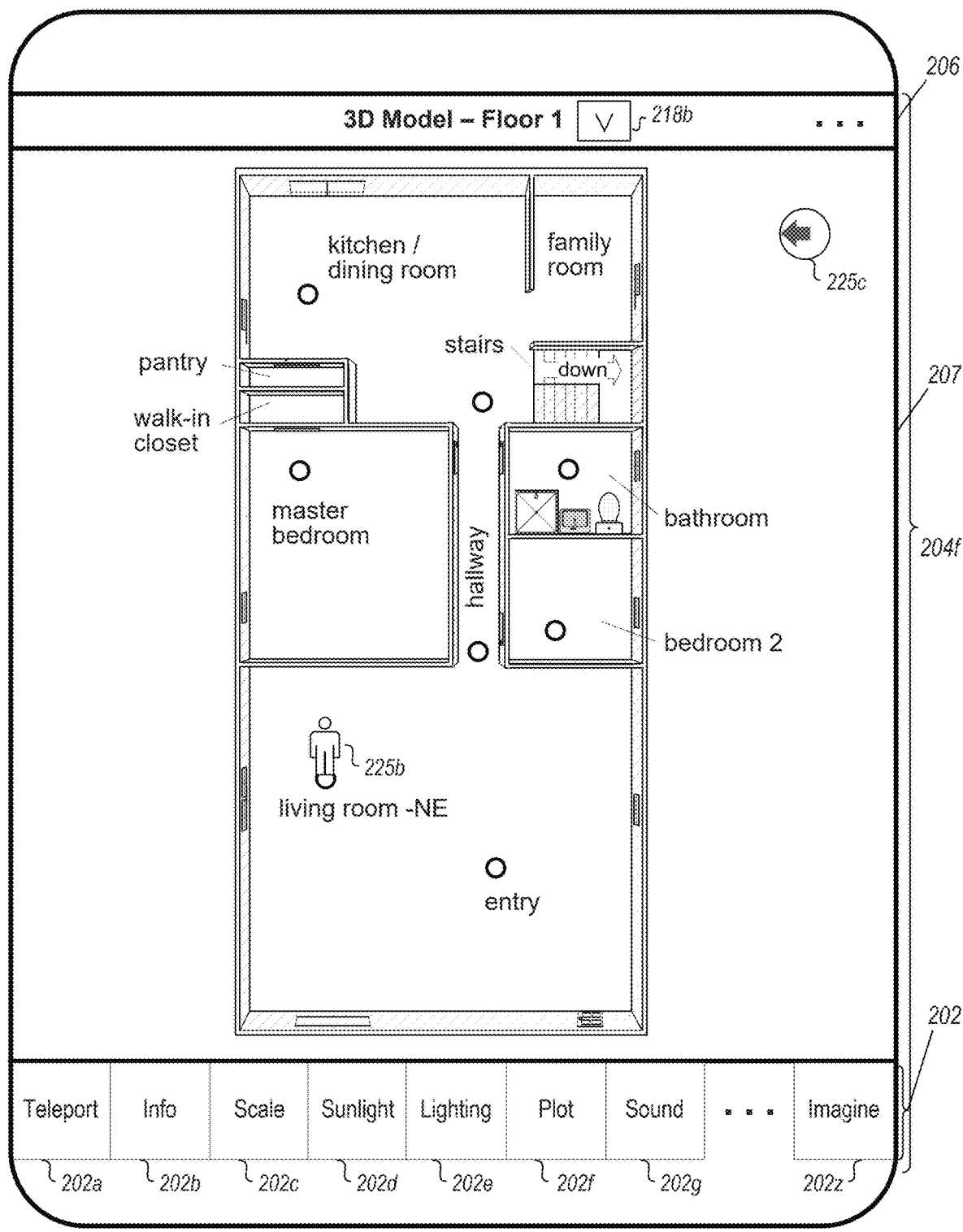

FIG. 2F continues the examples of FIGS. 2A-2E, and illustrates updated information 204f in the updated GUI in which the secondary panes 208 and 209 are not shown, but additional user-selectable controls 202 are included (e.g., based on the primary pane 207 being changed to show the 3D computer model of the house). In this example, the header information 206 is updated to include an additional user-selectable control 218b that allows the end user to select which floor of the house is shown, with the house in this example having an additional basement floor accessible via the stairs (as illustrated further with respect to FIG. 2G). In this example, the 3D computer model includes illustrations of the positions of the viewing/capture locations for the interactive tour, with the visual indicator 225b being added to correspond to the current viewing location that was last selected. This example further includes a user-selectable control 225c that allows an end user to orient the computer model of the house in different manners according to different specified criteria, such as to have a top of the primary pane correspond to magnetic or geographic north, have the top or bottom of the primary pane correspond to the main entry of the house, to provide a best fit of the 3D computer model to the current size and shape of the primary pane, etc. In addition, the user-selectable controls 202 may enable various types of additional information to be overlaid on the floor map or to otherwise invoke additional functionality to be provided, such as one or more of the following: control 202a activates a default mode that allows the end user to move to a detailed view of a particular room or viewing location by selecting that room or viewing location on the 3D computer model; control 202b shows additional descriptive information of one or more types on the computer model, such as one or more types of POIs to show one or more types of building information (e.g., as selected by the user, based on available types of building information, etc.); control 202c shows measurements or other scale information on the 3D computer model; control 202d shows simulated sunlight on the 3D computer model for specified conditions (e.g., one or more times of day and/or times of year); control 202e shows actual interior lighting, optionally under specified conditions; control 202f shows information about a surrounding environment of the building (with FIG. 2G providing one example); control 202g provides sound recordings from one or more locations of the building (e.g., of ambient sound at specified times); control 202z allows virtual objects to be added to the 3D computer model and/or surfaces in the 3D computer model to have virtual changes (e.g., to change color, texture etc. of walls, floors, object surfaces, etc.); etc.—it will appreciated that various other types of controls 202 may be provided in other embodiments, and/or that some of the illustrated types of controls 202 may not be used.

Figure 2G:
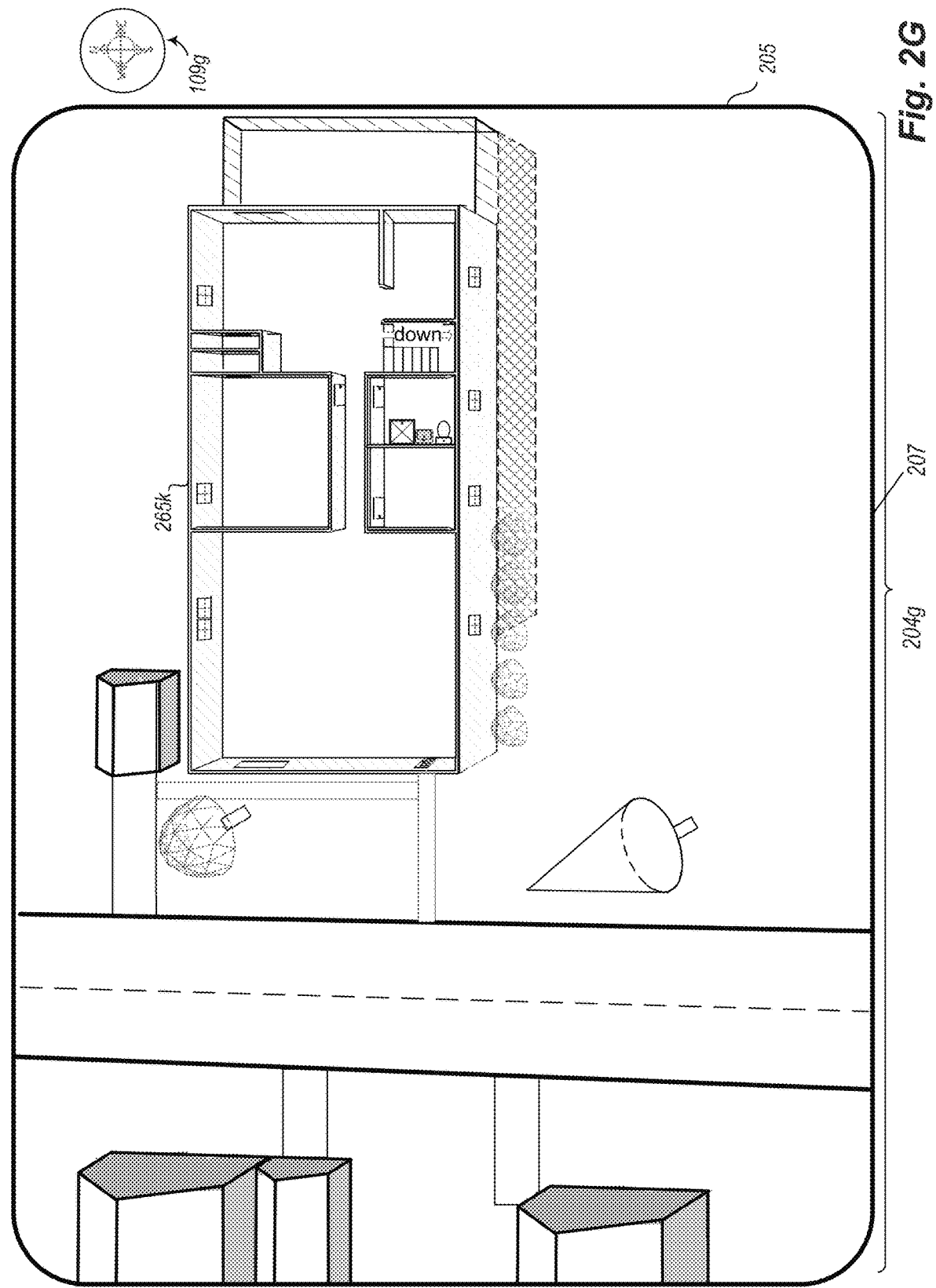

FIG. 2G continues the examples of FIGS. 2A-2F, and illustrates an example of the GUI being updated with information 204g to again include only a single primary pane 207, which in this example has no header or separate area for user-selectable controls—in addition, the information being displayed has been adjusted to reflect that the device 205 has been rotated to a landscape orientation. In this example, the end user has selected to display information about the surroundings of the building, which in this example includes a street to the west of the house, with two additional houses across the street being shown, as well as additional information on the house's property that includes two trees, sidewalks, a driveway and garage, and bushes or other shrubs on the south side of the house (as indicated by the visual indicator 109g). This example further illustrates a deck to the east of the house, and includes visual information about a basement existing below ground level, although details of the interior of the basement are not shown in this example. The vegetation and surrounding buildings are shown in this example using simplified geometrical shapes, such as to enable the use of such shapes to simulate shading (not shown) if a simulated lighting information option is selected for the display, although actual images of surroundings may instead be used in other embodiments and situations. It will be appreciated that a variety of other types of information may be shown about the surroundings of the building, including images and/or video from ground level and/or an aerial view, as well as additional points of interest in descriptive information about the surrounding neighborhood.

Figure 2H:
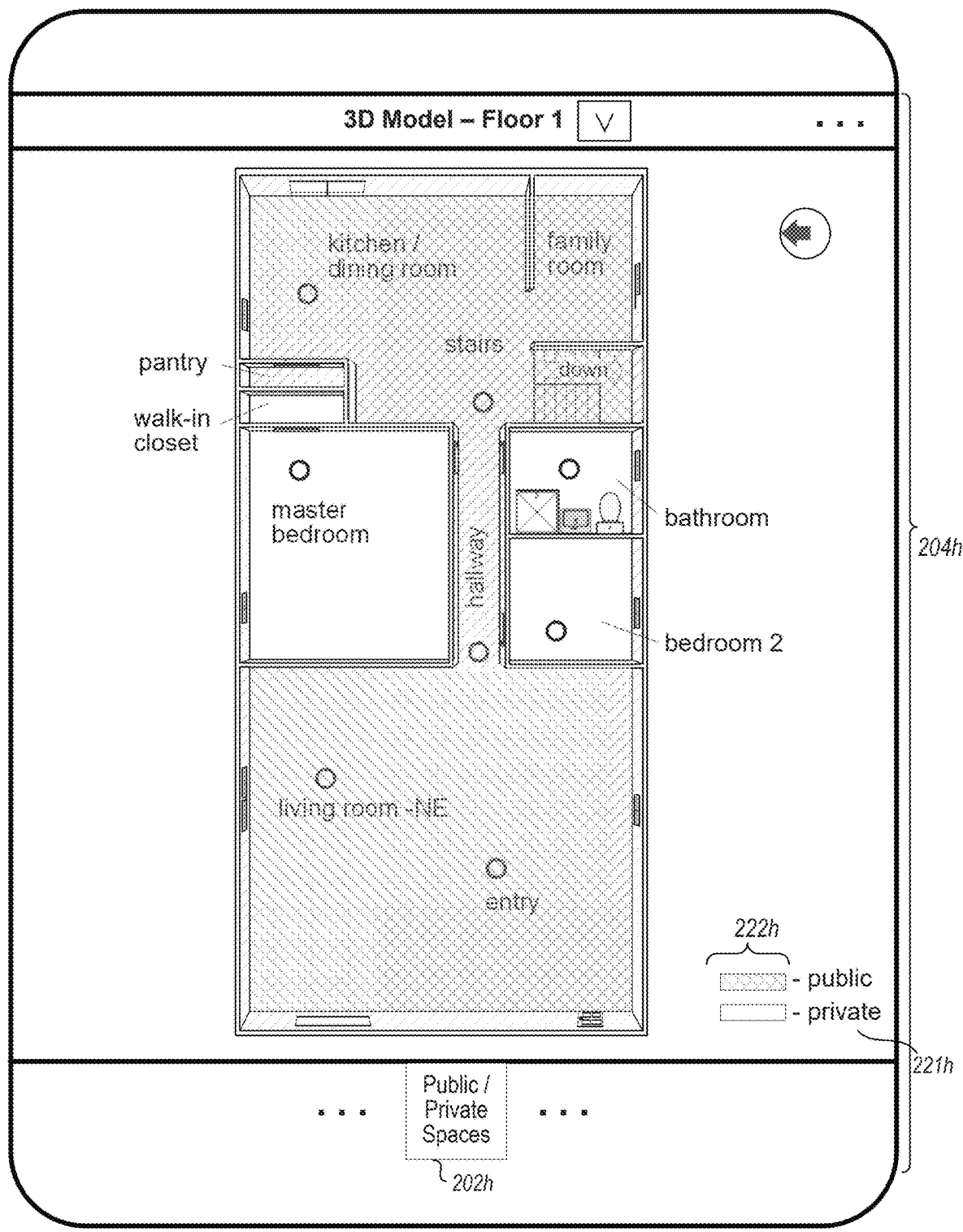

FIG. 2H continues the examples of FIGS. 2A-2G, and illustrates an example of the GUI similar to that of FIG. 2F, but updated with information 204h corresponding to selection of control 202h by the end user. In this example, the control 202h corresponds to updating the displayed floor plan of the house to visually show information about spaces of the house that are public (e.g., living room, kitchen, dining room, hallways, stairs, etc.) and that are private (e.g., bathrooms, bedrooms, etc.), such as displaying one or both types of spaces with specified colors and/or patterns. In this example, a legend 221h is displayed to show options 222h for patterns to use, with the displayed floor plan having corresponding displayed information (e.g., via a public/private visual layer that is overlaid on the floor plan). The public and private spaces of the house may be determined in various manners in various embodiments, such as automatically (e.g., based on previously determined room types, based on analysis of images) and/or based on user annotations or other input (e.g., from one or more system operator users of the BIIP and/or ICA systems, from end users, etc.).

Figure 2I:
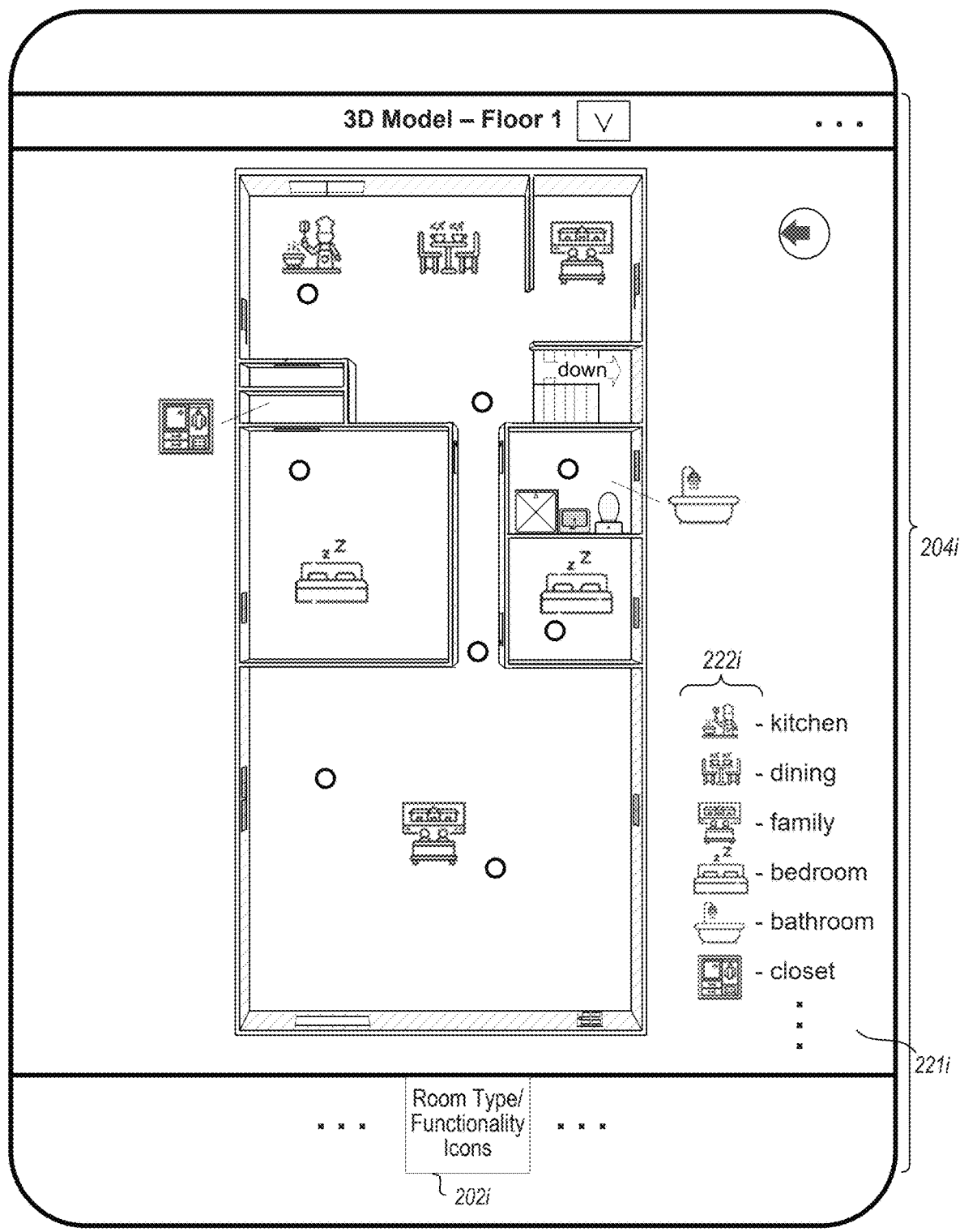

FIG. 2I continues the examples of FIGS. 2A-2H, and illustrates an example of the GUI similar to that of FIG. 2H, but instead being updated with information 204i (instead of information 204h) corresponding to selection of control 202i by the end user. In this example, the control 202i corresponds to updating the displayed floor plan of the house to visually show icon information about types of rooms of the house and/or associated types of room functionality (e.g., instead of the room type textual labels shown in FIG. 2H). In this example, a legend 221i is displayed to show icons 222i to use for different types of rooms, with the displayed floor plan having corresponding displayed icons (e.g., via a room type icon visual layer that is overlaid on the floor plan, such as instead of or in addition to a room type textual label visual layer). As previously discussed, types of rooms may be determined in various manners in various embodiments, such as automatically (e.g., based on analysis of images and/or use of machine learning techniques) and/or based on user annotations or other input (e.g., from one or more system operator users of the BIIP and/or ICA systems, from end users, etc.).

Figure 2J:
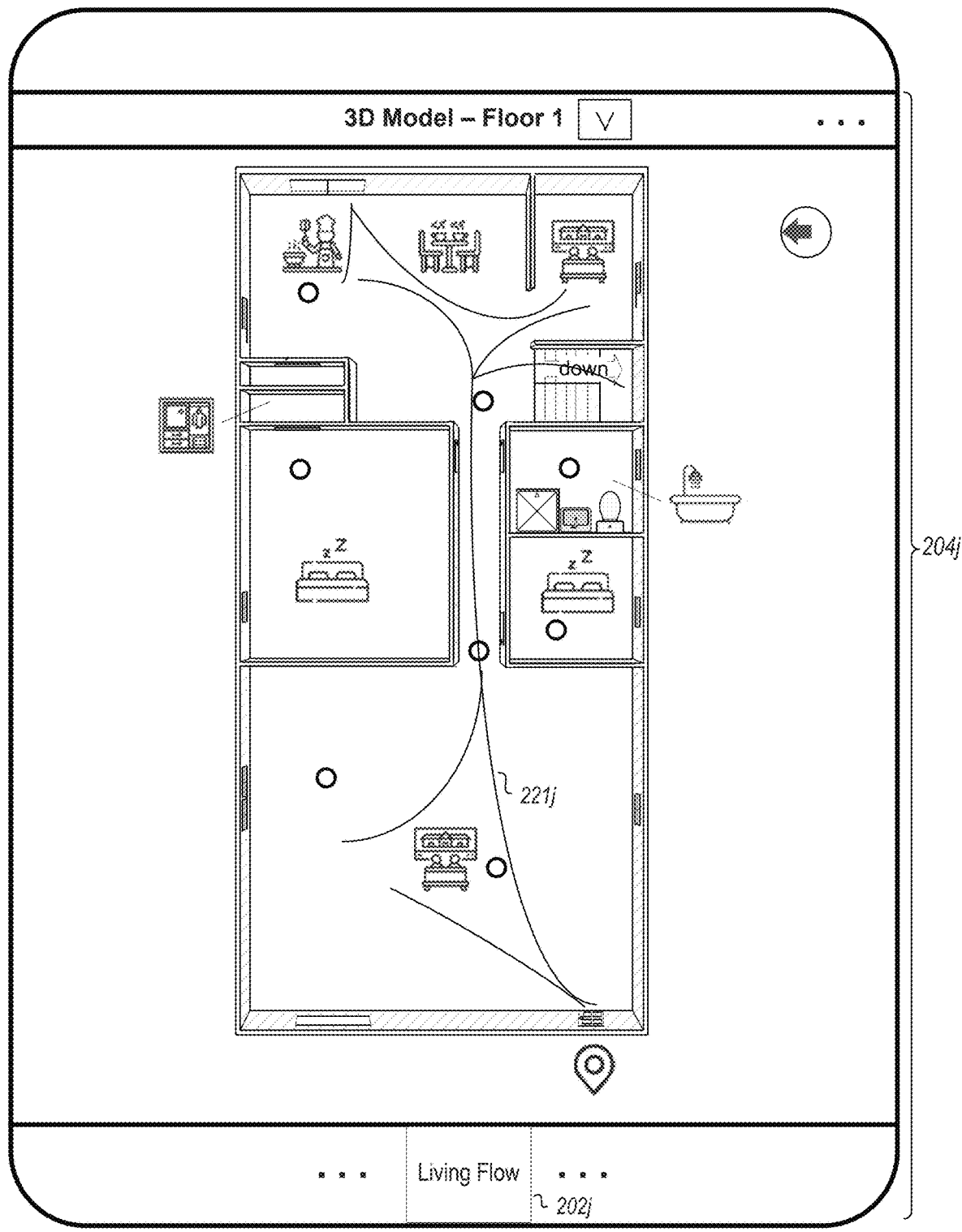

FIG. 2J continues the examples of FIGS. 2A-2I, and illustrates an example of the GUI similar to that of FIG. 2I, but being updated with information 204j corresponding to selection of control 202j by the end user. In this example, the control 202j corresponds to updating the displayed floor plan of the house to visually show examples of inhabitant flow pattern information 221j corresponding to typical or common movement patterns of people (e.g., in addition to room type icons, while in other embodiments may be shown without room type label or icon information). In this example, the flow pattern information may be displayed, for example, via a flow pattern visual layer that is overlaid on the floor plan, such as instead of or in addition to one or more other visual layers. Such flow pattern information may be determined in various manners in various embodiments, such as automatically (e.g., based on analysis of video taken over time within the house interior, based on other tracking of user movements within the house interior, based on analysis of images to determine open lanes or spaces for user movement, etc.) and/or based on user annotations or other input (e.g., from one or more system operator users of the BIIP and/or ICA systems, from end users, etc.).

Figure 2K:
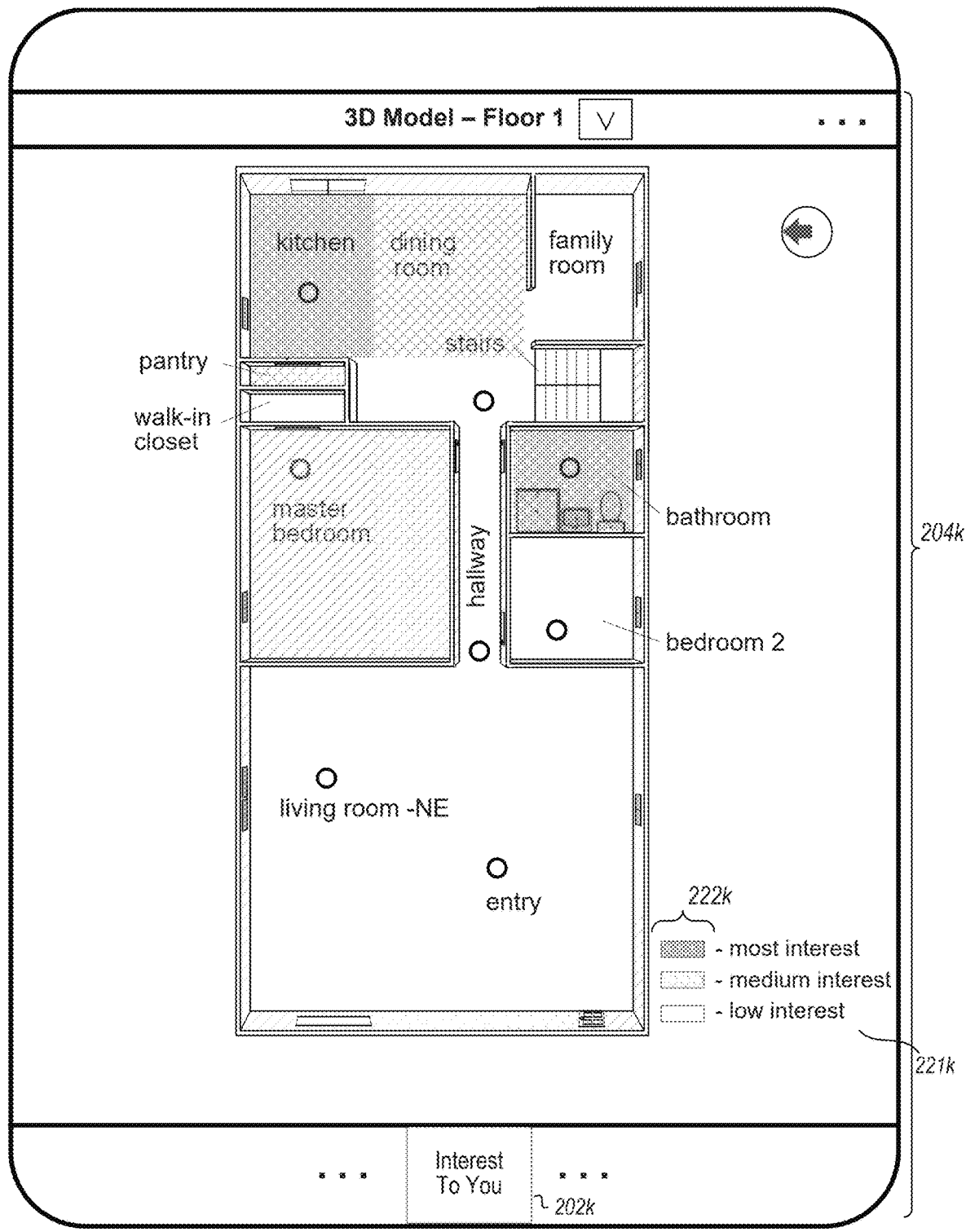

FIG. 2K continues the examples of FIGS. 2A-2J, and illustrates an example of the GUI similar to that of FIG. 2H, but updated with information 204k corresponding to selection of control 202k by the end user. In this example, the control 202k corresponds to updating the displayed floor plan of the house to visually show information about spaces of the house that are likely to be of most interest to the end user, such as displaying spaces corresponding to different levels of likely user interest with different specified colors and/or patterns. In this example, a legend 221k is displayed to show patterns 222k for patterns to use, with the displayed floor plan having corresponding displayed information (e.g., via a user-specific personalized visual layer that is overlaid on the floor plan). The areas of the house that are likely to be of interest to the end user may be determined in various manners in various embodiments, such as automatically (e.g., based on tracking a quantity of time and/or a length of time that the end user has previously spent viewing different parts of this house, based on an analysis of corresponding types of information for the end user from multiple other houses, etc.) and/or based on user annotations or other input (e.g., from previously specified preferences of the end user; from previous indications of the end user of particular parts of the house that are of interest, such as by flagging or pinning particular rooms and/or images; etc.).

Figure 2L:
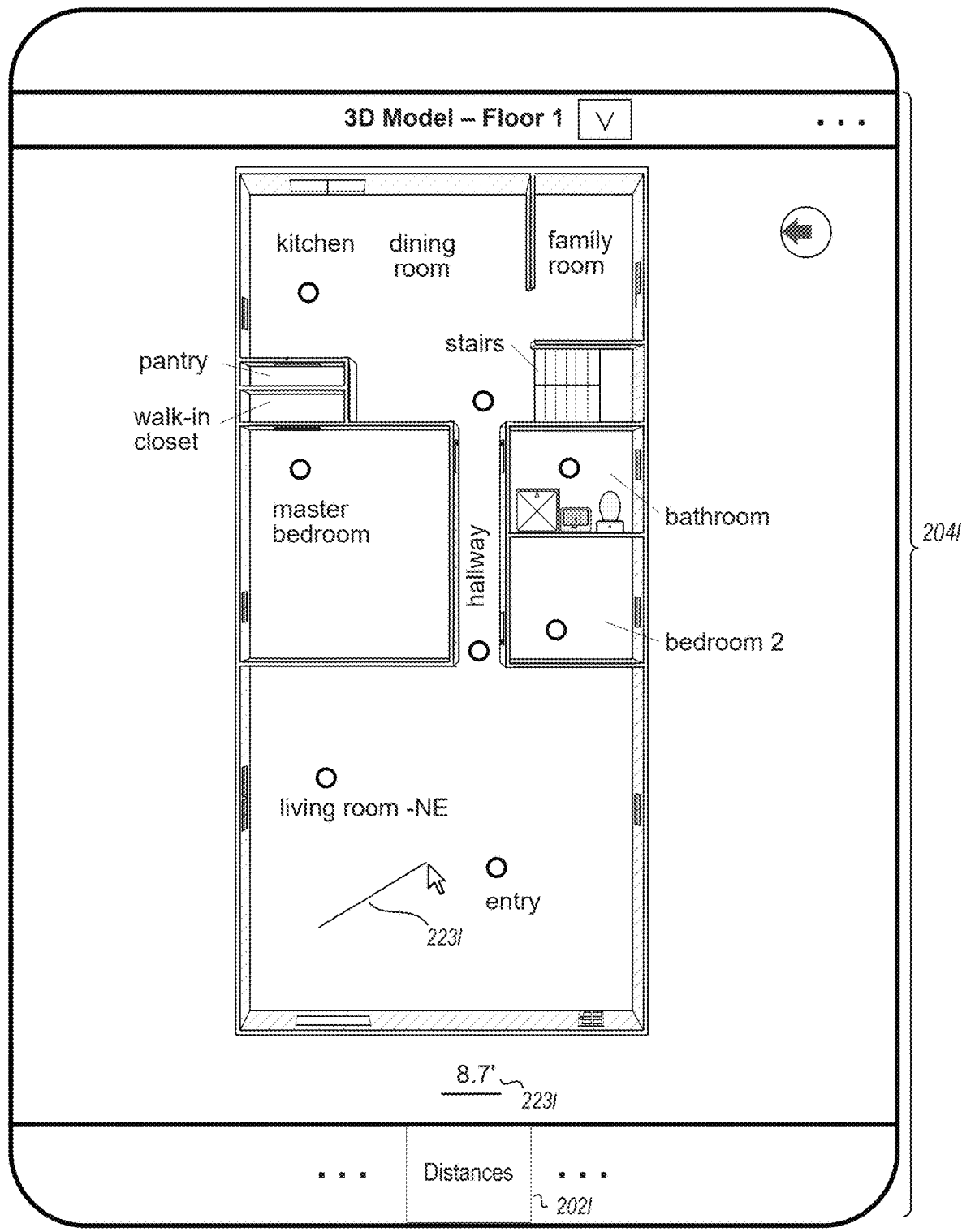

FIG. 2L continues the examples of FIGS. 2A-2K, and illustrates an example of the GUI similar to that of FIG. 2F, but updated with information 204l corresponding to selection of control 202l by the end user. In this example, the control 202l corresponds to providing interactive functionality for the end user to specify a length on the displayed floor plan of the house (e.g., by dragging a line 223l, by selecting two end points, etc.) and receive information about the distance of that length (e.g., displayed distance information 224l). The distance may be automatically determined in various manners in various embodiments, such as based on previous and/or concurrent analysis of images of the house interior to determine sizes of known or unknown objects, as discussed in greater detail elsewhere herein. In addition, while the distance functionality is provided using a 3D floor plan in this example, similar functionality may be provided on other media or types of information in other embodiments, such as on displayed panorama or perspective images, during interactive virtual tours of inter-linked viewing locations, etc.

Figure 2M:
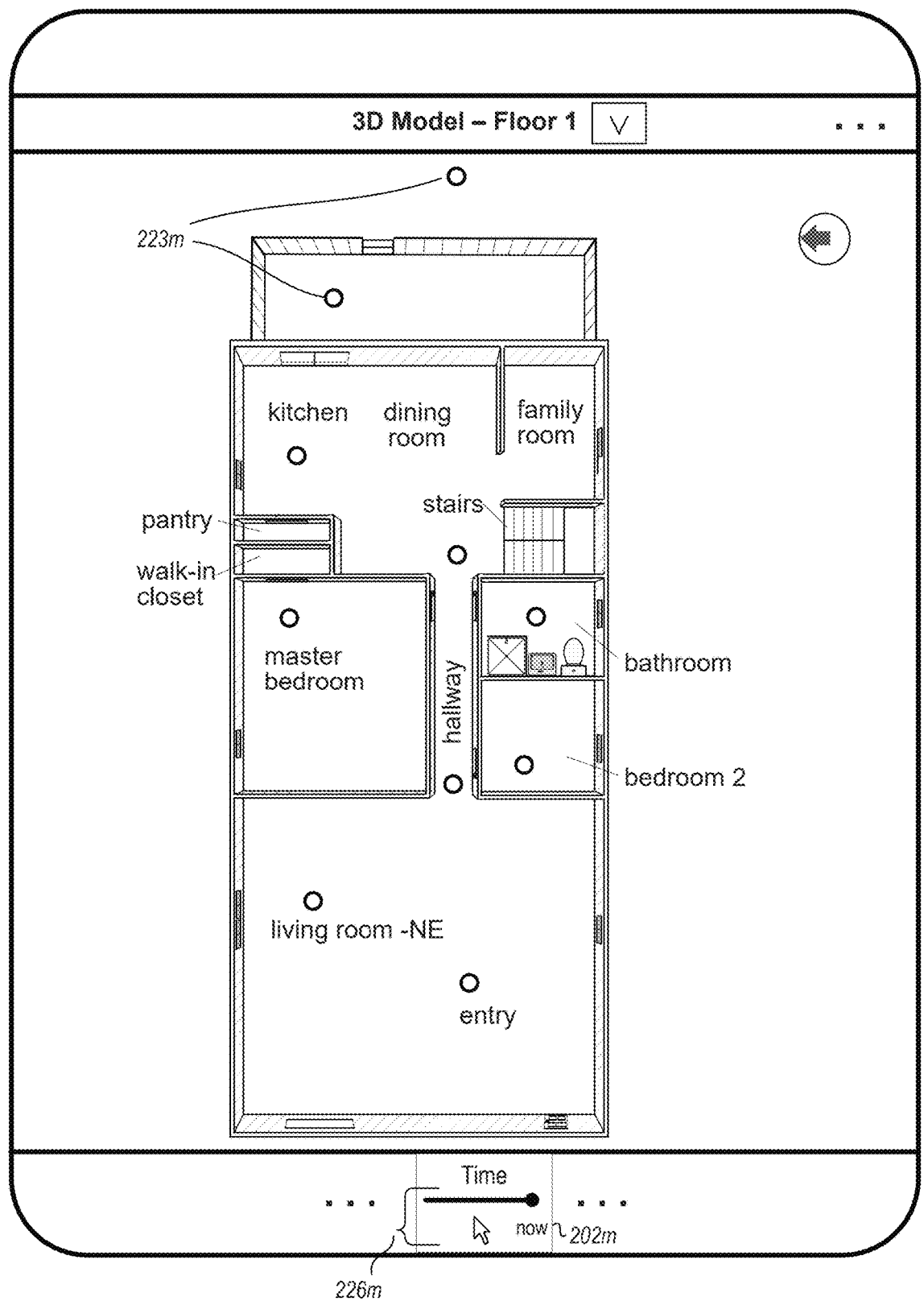

FIG. 2M continues the examples of FIGS. 2A-2L, and illustrates an example of the GUI updated with information corresponding to selection of control 202m by the end user. In this example, the control 202m includes a time-based slider (and associated information) 226m that controls what types of information are displayed in the one or more panes, which in this example includes user-selectable indicators 223m corresponding to viewing/capture locations at which images and/or other data is captured in the building, and such as based on the acquisition times for those images and/or other data. In comparison to the viewing/capture locations illustrated in FIG. 2L, the viewing/capture locations include two acquisition locations (in this example, to corresponding to viewing/capture locations outside of the house, which are captured at a later time after the images and/or other data captured at the viewing/capture locations inside the house), and the user-selected time corresponds to a current time (such as to shown all acquisition locations for the building).

Figure 2N:
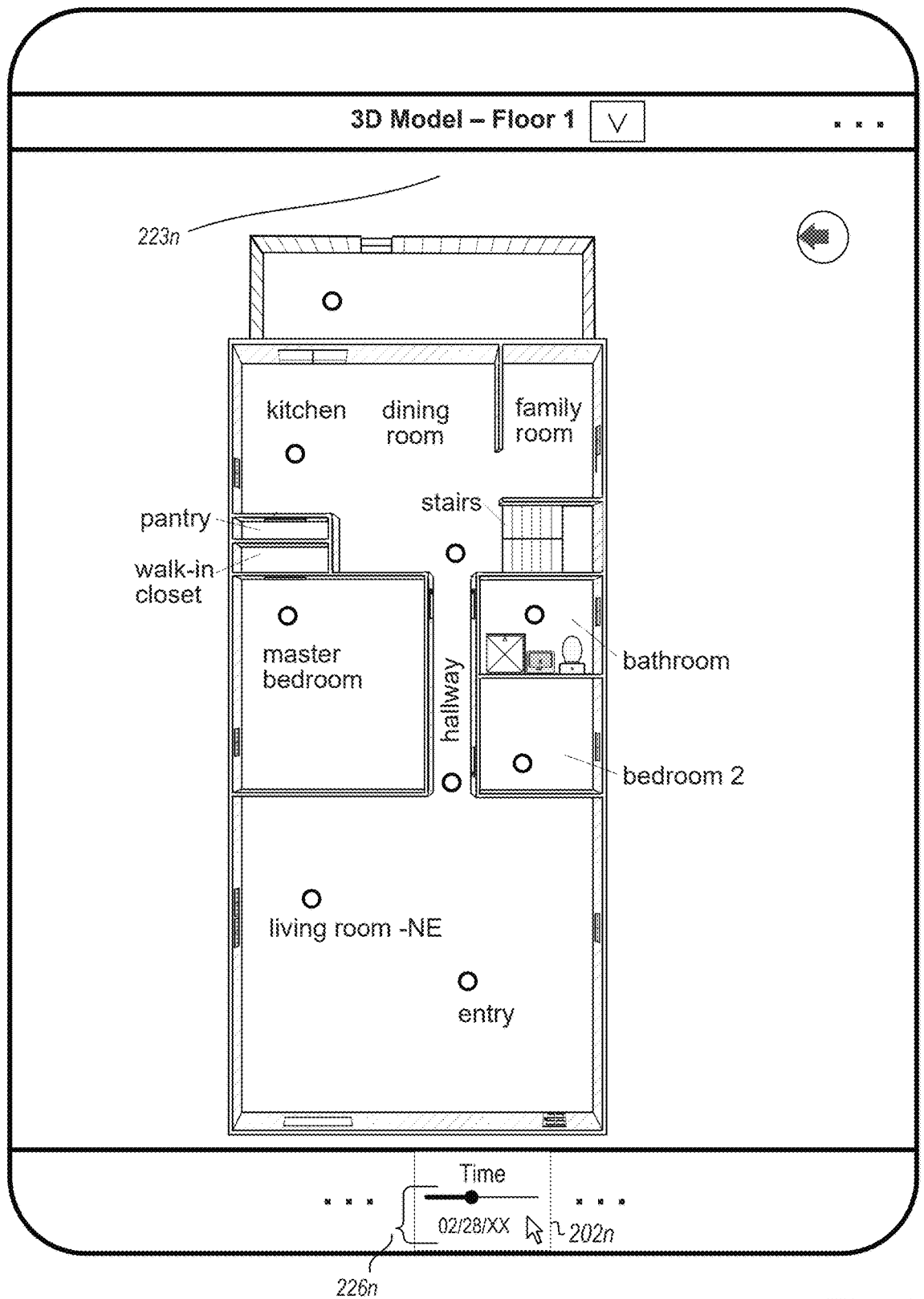
Figure 2P:
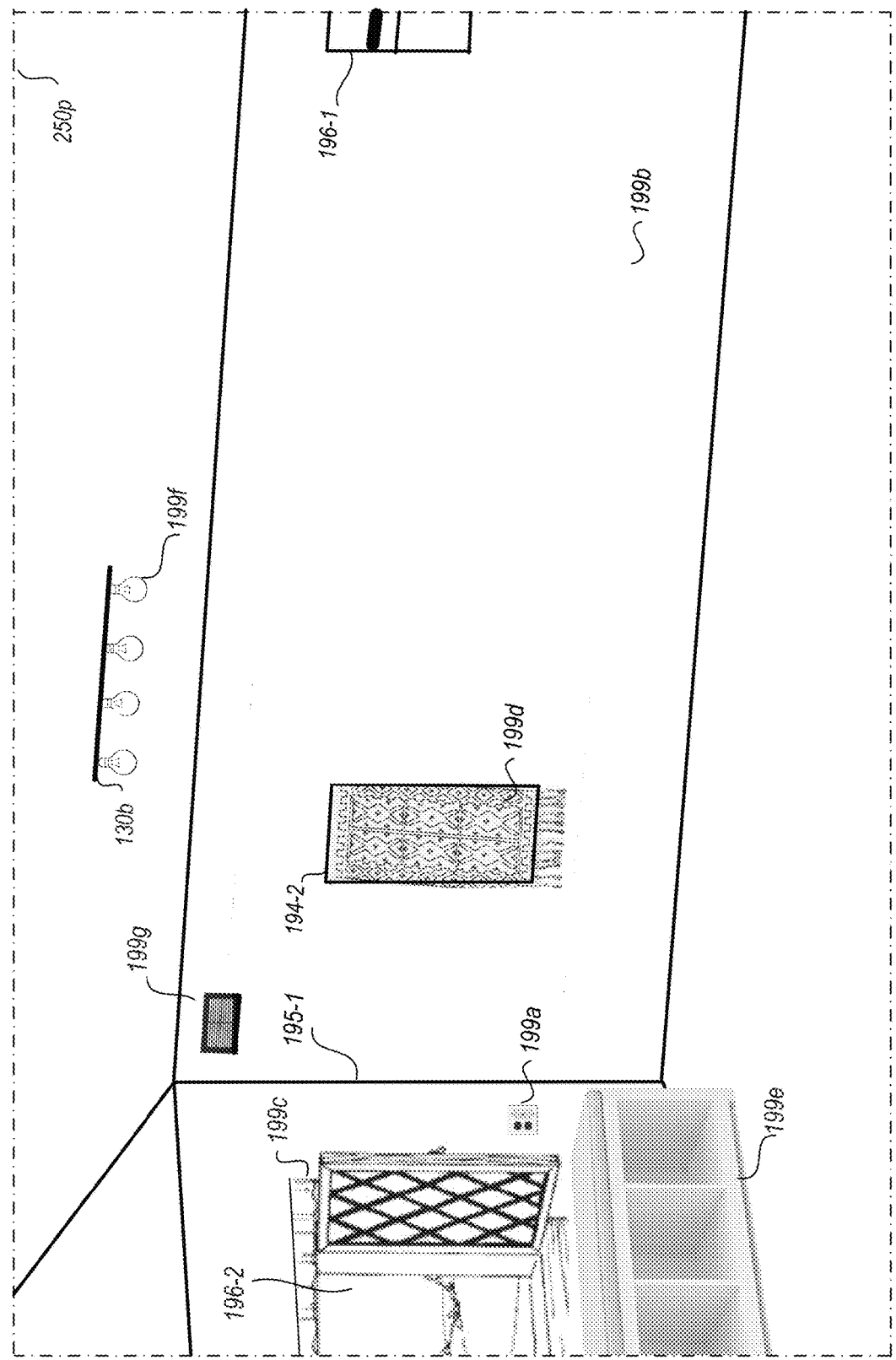

FIG. 2N continues the examples of FIGS. 2A-2M, and illustrates an example of the GUI that is further updated with information corresponding to modification of the time-based slider control and associated information change 226n by the user, as shown in updated information 202n. In this example, the time has been changed to an earlier date, and one of the viewing/capture locations 223m that was shown in FIG. 2M is no longer displayed (as shown with indicator 223n) due to being acquired after the currently selected time.

FIG. 2O (also referred to as "2-O" herein to differentiate from the number 20) continues the examples of FIGS. 2A-2N, and illustrates an example of the GUI in which the 3D computer model shown in FIG. 2N has been updated to a 2D floor map model of the same floor (the currently selected main floor, or "Floor 1"), and is further updated with information corresponding to further modification of the time-based slider control and associated information 226o by the user, as shown in updated information 202o. In this example, the time has been changed to an earlier date before such remodeling of the house had been completed and before some of the previously displayed viewing/capture locations were used to acquire images or other data. In this example, visual indicators 223o indicate the absence of viewing/capture locations that were shown at the later time corresponding to FIG. 2N, and additional structural areas 227o and 228o are shown that were removed by the later time corresponding to FIG. 2N. It will be appreciated that other times of information may similarly be determined for a house or other building at different times (e.g., with different corresponding computer models and associated additional information), with the display of such building information changing based on a currently selected time. As discussed elsewhere herein, various types of changes over time may be illustrated in other manners, including with animation or other changes played over a period of time, including with respect to the types of information discussed in FIG. 2-O and elsewhere herein.

FIG. 2P continues the examples of FIGS. 2A-2O, and illustrates an example of an image 250p that is acquired in the living room of the house, with various types of building information 199 that may be automatically determined via analysis of visual data of the image, such as for use in POIs displayed in the GUI (e.g., POIs similar to those discussed with respect to FIG. 2B). In this example, the types of building information may include an outlet 199a for one or more types of wiring (in this example, a combined electrical and cable outlet), wall surface 199b (e.g., type of material, such as wallpaper or paint; color; texture; etc.), window type and/or associated furnishings 199c for window 196-2 (e.g., a picture window, a window that opens by swinging inwards, window curtains or drapes, etc.), other furnishings 199d (e.g., a tapestry on a wall), furniture 199e (e.g., built-in furniture, such as a window seat; moveable furniture; etc.), lighting fixture type 199f, piping or other conduit information 199g (e.g., to correspond to an HVAC air vent), etc. It will be appreciated that various other types of building information may be determined in other situations, including for other types of rooms such as bathrooms (e.g., sinks/bathtubs/showers and associated types of plumbing fixtures, floor type, counter type, types of lighting fixtures, etc.), kitchens (e.g., sinks and associated types of plumbing fixtures, floor type, counter type, cabinet types, types of lighting fixtures, kitchen islands and/or other build-ins, appliances, etc.), utility rooms (e.g., sinks and associated types of plumbing fixtures, floor type, counter type, types of lighting fixtures, appliances, etc.), etc., as discussed in greater detail elsewhere herein.

Figure 2Q:
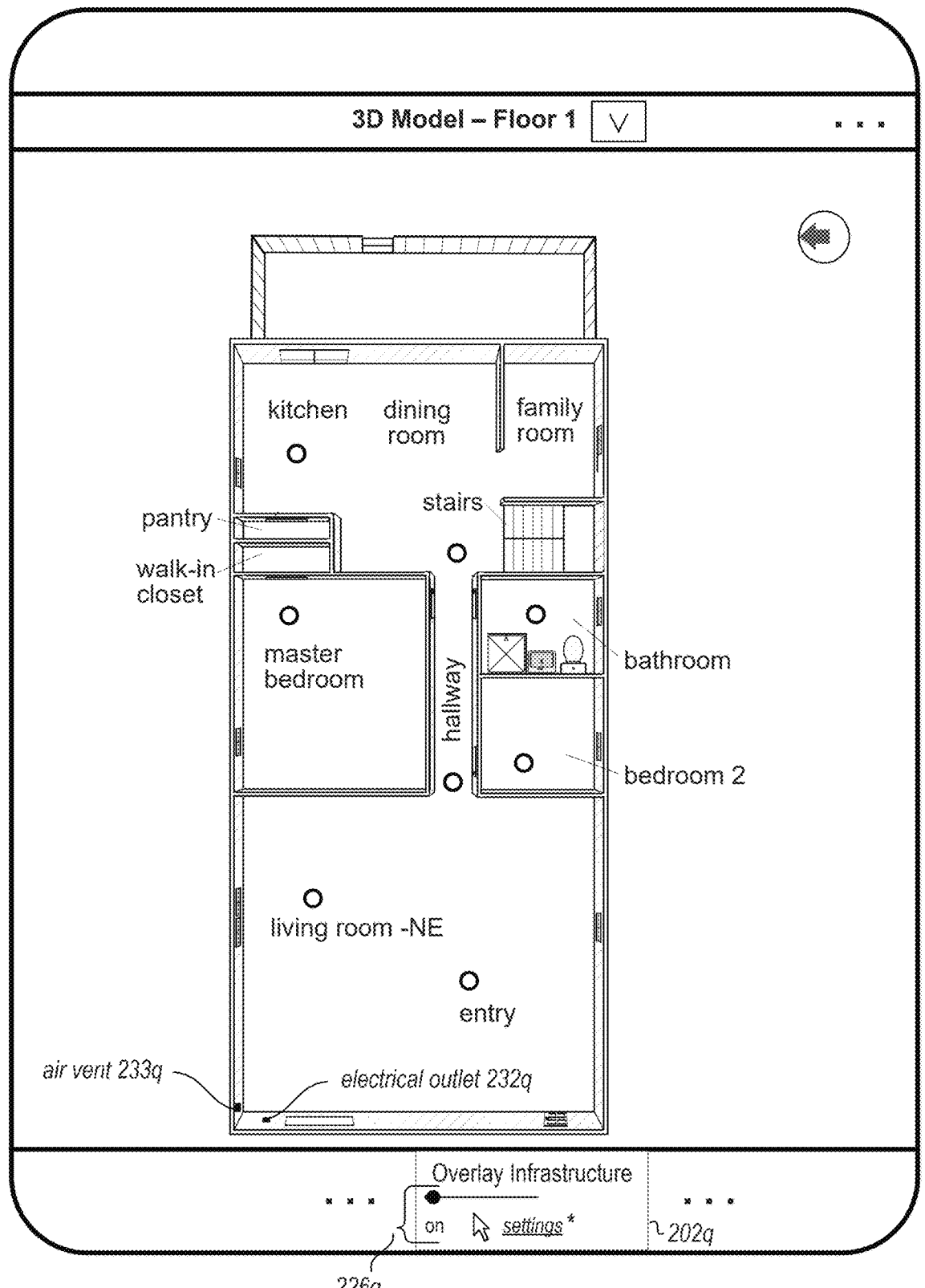

FIG. 2Q continues the examples of FIGS. 2A-2P, and illustrates an example of the GUI updated with information corresponding to selection of control 202q by the end user.

In this example, the control 202q is a slider that controls what types of information about infrastructure are overlaid on information displayed in the one or more panes, such as with respect to wiring on one or more types, piping or other conduits, etc., and such as may be further specified using a user-selectable 'settings' control 226q and/or based on previously selected or otherwise specified information (e.g., user preferences)—in other embodiments, one or more toggle controls may instead be used to turn on or off the display of information about one or more types of infrastructure (or other types of building information displayed as POIs). In this example, the use of the control causes types of building information discussed with respect to FIG. 2P to be displayed, including a visual indicator 233q corresponding to an air vent and a visual indicator 232q corresponding to an electrical outlet. It will be appreciated that the selected type(s) of infrastructure may be displayed throughout the portions of the house currently shown in the GUI based on analysis of visual data of corresponding images, including to be overlaid on other types of underlying information (e.g., on images, interactive tours, 3D computer models, 2D floor map models, etc.), and in some cases may be displayed with a user-selectable visual indicator to enable a particular POI to be selected to cause additional information to be displayed (e.g., one or more images from which the information for the POI was determined, additional types of information about the type of infrastructure corresponding to a selected POI, etc.).

Figure 2R:
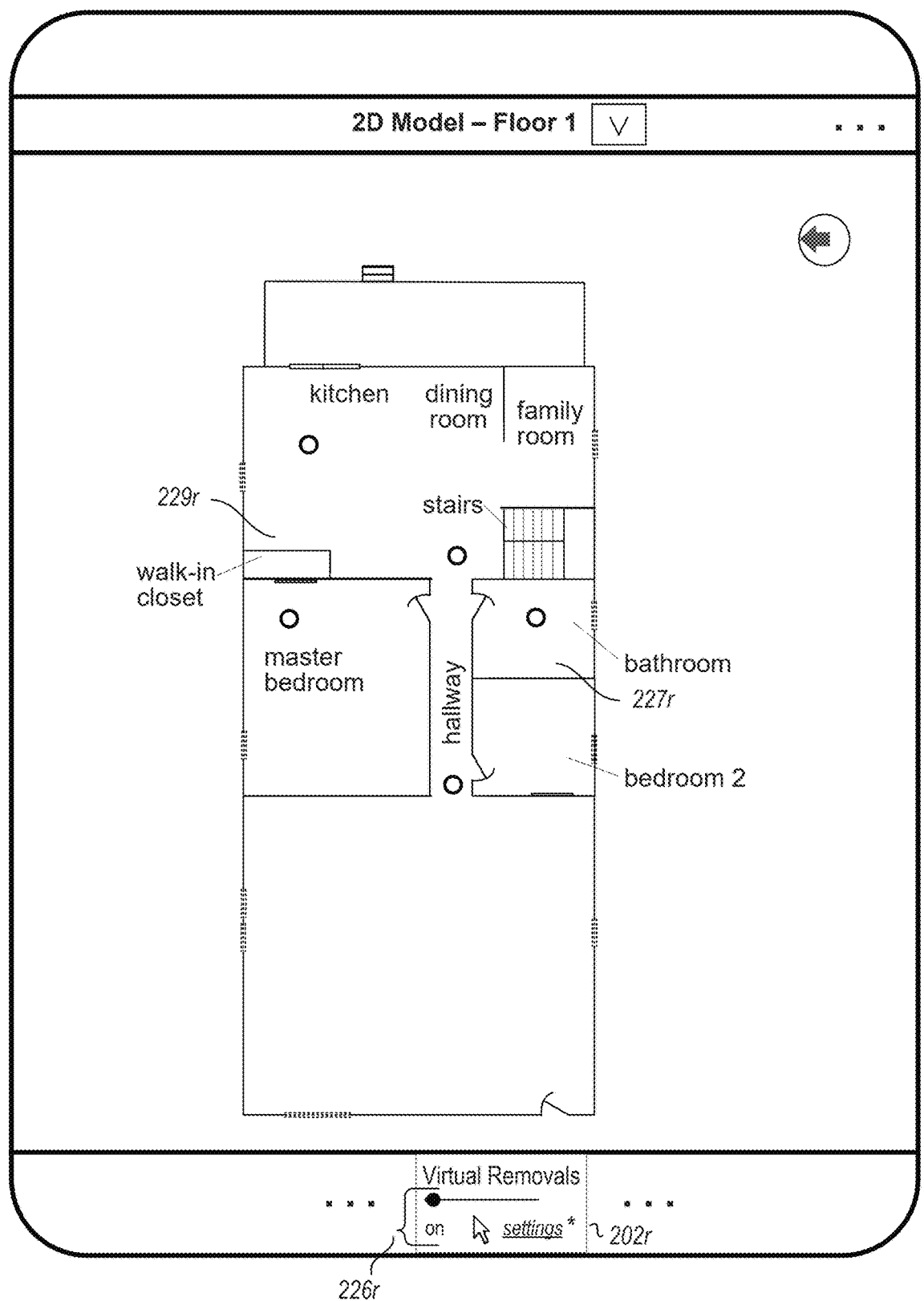

FIG. 2R continues the examples of FIGS. 2A-2Q, and illustrates an example of the GUI updated with information corresponding to selection of control 202r by the end user. In this example, the control 202r is a slider that controls virtual removal of information that would otherwise be present in the information for the building displayed in the one or more panes, such as with respect to one or more of walls or other structural elements, furnishings, furniture, fixtures, etc., and such as may be further specified using a user-selectable 'settings' control 226r and/or based on previously selected or otherwise specified information (e.g., user preferences)—in other embodiments, one or more toggle controls may instead be used to turn on or off the virtual removal of one or more types of information. In this example, the use of the control causes building information to be virtually removed that includes the pantry 229r (e.g., as part of a consideration to remodel the kitchen and to use that space for another purpose), bathroom fixtures 227r, etc. It will be appreciated that the virtual removal of building information may be performed throughout the portions of the house currently shown in the GUI, including for other types of underlying information (e.g., on images, interactive tours, 3D computer models, 2D floor map models, etc.), and that the selected type(s) of virtually removed information may in some cases be indicated with a user-selectable visual indicator to enable selection to cause additional information to be displayed (e.g., about the virtually removed information, etc.).

Figure 2S:
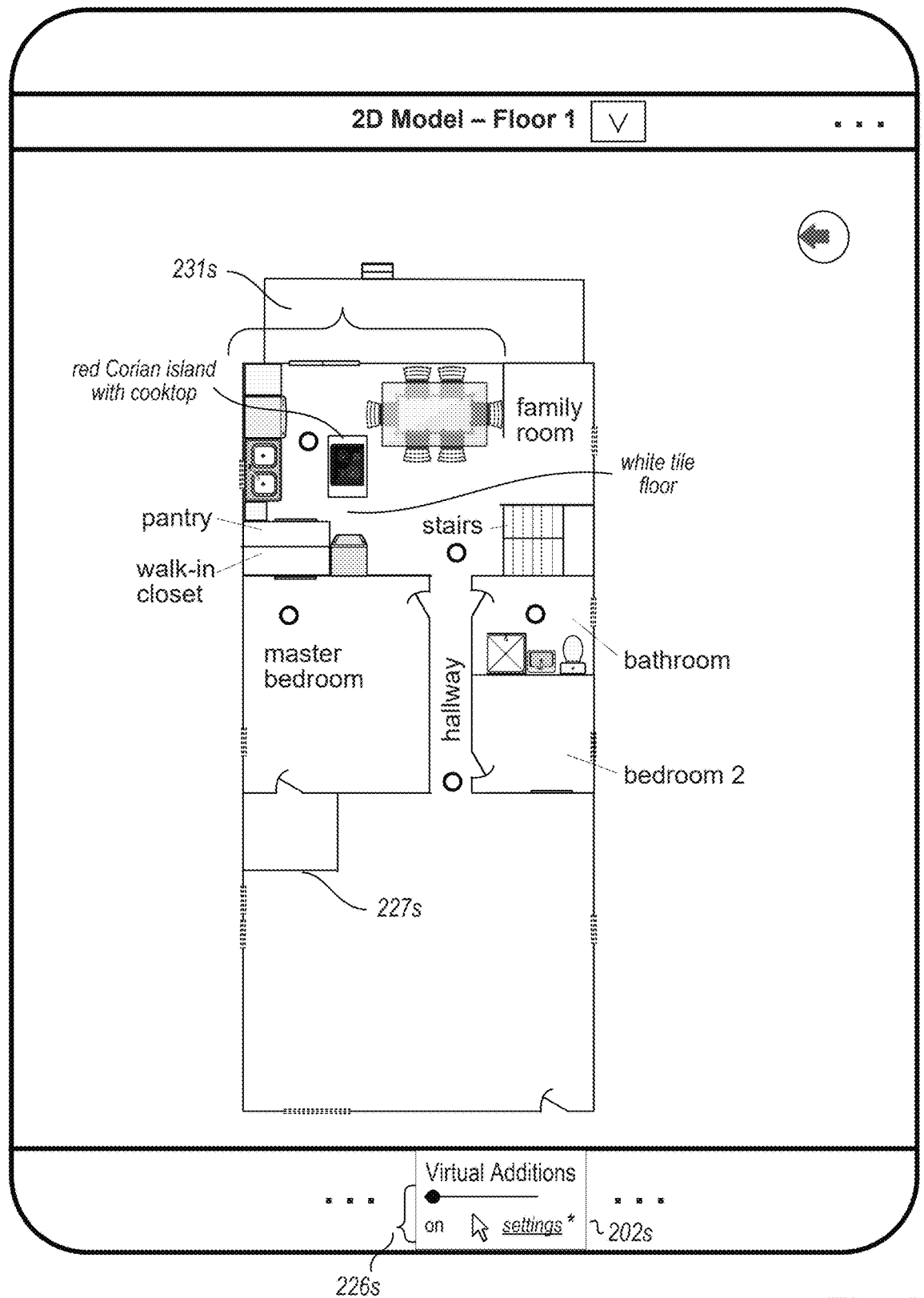

FIG. 2S continues the examples of FIGS. 2A-2R, and illustrates an example of the GUI updated with information corresponding to selection of control 202s by the end user. In this example, the control 202s is a slider that controls virtual addition of information that would otherwise not be present in the information for the building displayed in the one or more panes, such as with respect to one or more of walls or other structural elements, furnishings, furniture, fixtures, etc., and such as may be further specified using a user-selectable 'settings' control 226s and/or based on previously selected or otherwise specified information (e.g., user preferences)—in other embodiments, one or more toggle controls may instead be used to turn on or off the virtual addition of one or more types of information. In this example, the use of the control causes building information to be virtually added that includes various kitchen information 231s (e.g., as part of a consideration to remodel the kitchen), such as to add a kitchen island with a cooktop, to add a table and chairs, to add a new type of floor covering, etc., and further includes a structural addition 227s (e.g., to add a master bathroom to the master bedroom by taking space from the living room). It will be appreciated that the virtual addition of building information may be performed throughout the portions of the house currently shown in the GUI, including for other types of underlying information (e.g., on images, interactive tours, 3D computer models, 2D floor map models, etc.), and that the selected type(s) of virtually added information may in some cases be indicated with a user-selectable visual indicator to enable selection to cause additional information to be displayed (e.g., about the virtually added information, etc.).

Figure 2T:
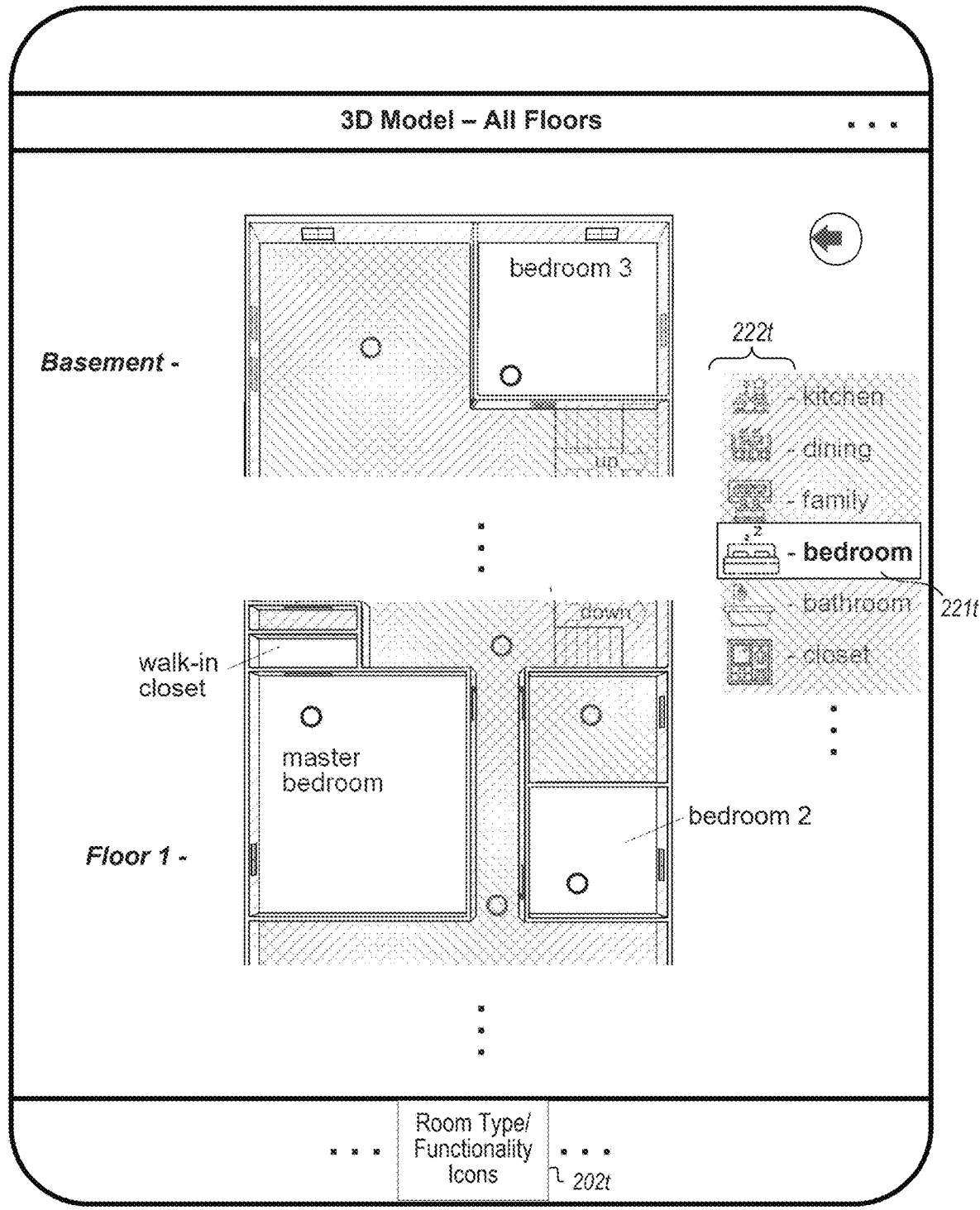

FIG. 2T continues the examples of FIGS. 2A-2S, and illustrates an example of the GUI updated with information corresponding to selection of control 202t by the end user, such as in a manner somewhat analogous to that previously illustrated in FIGS. 2H and 2I. In particular, in this example, a type of room and/or associated functionality 221t has been selected (e.g., from a list 222t of options), which in this example corresponds to a bedroom. A corresponding partial floor plan of the house is shown with those room types and/or functionality types highlighted, including in this example to show partial floor plans for each of the floors having a corresponding room/functionality type.

Figure 2U:
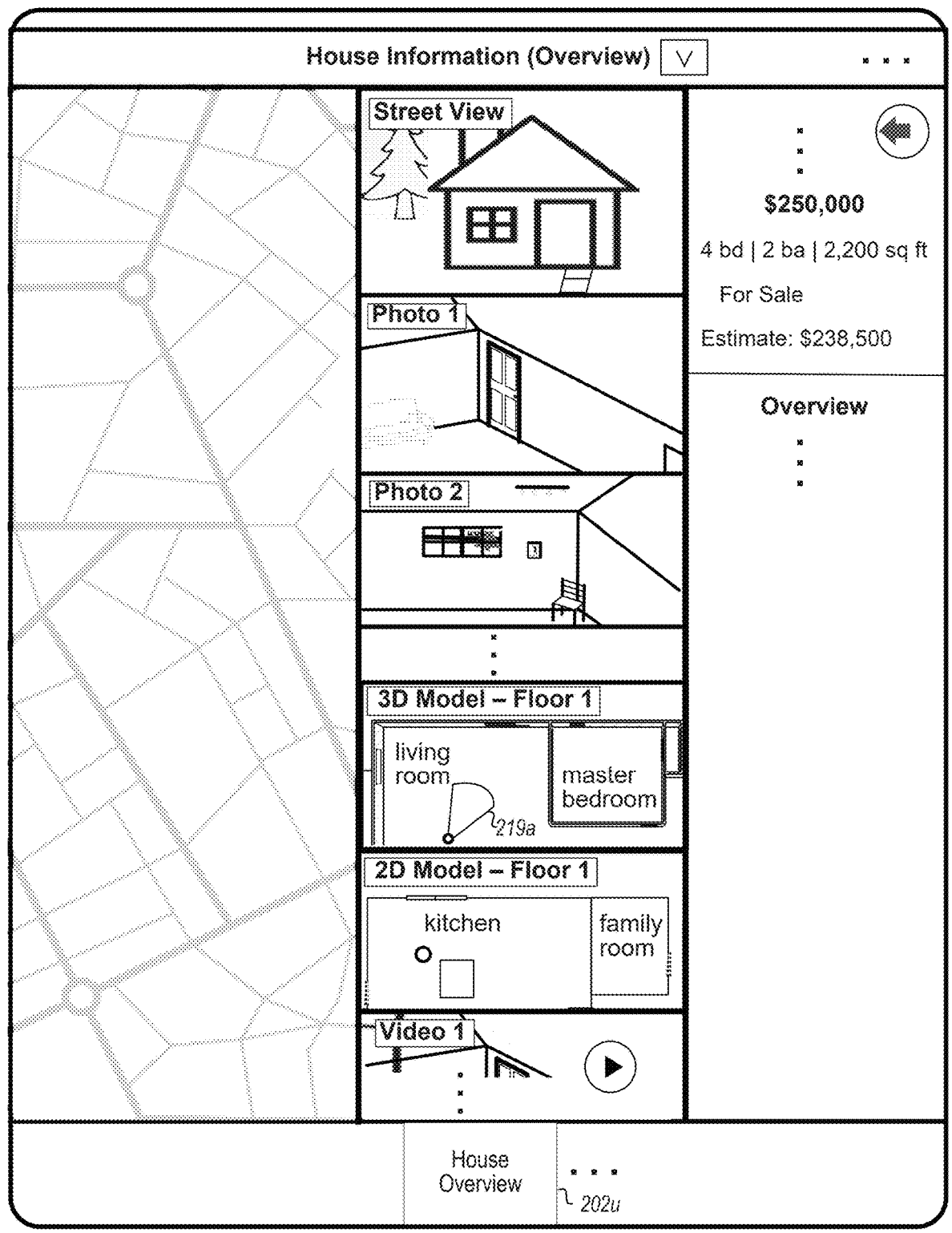

FIG. 2U continues the examples of FIGS. 2A-2T, and illustrates an example of the GUI in which a visual listing of multiple types of information about a selected house is shown, corresponding to selection of control 202u by the end user. In this example, the displayed information includes an array of images captured for the house (e.g., photo 1, photo 2, etc.) and other types of building information, that in this example include a street view of the house, a 3D computer model of the house, a 2D floor map model of the house, a video captured at the house, etc.—it will be appreciated that other types of building information may similarly be shown, such as an interactive tour, other videos, animations, non-visual data (e.g., audio recordings), etc. In this example, each image or other type of building information shown in the array may be selectable by the user, such as for that selected building information type to become the primary (or only) type of information shown in an updated GUI display. It will be appreciated that various other types of information may similarly be available via such an interface, such as textual information (e.g., facts about the building; a map of a surrounding area; an asking price for a building that is available for sell or other type of possible acquisition, such as rental; an estimated value for a building for a sale or other type of possible acquisition, such as based on an automated determination using a comparison to data about other similar buildings or in another manner; etc.).

Figure 2V:
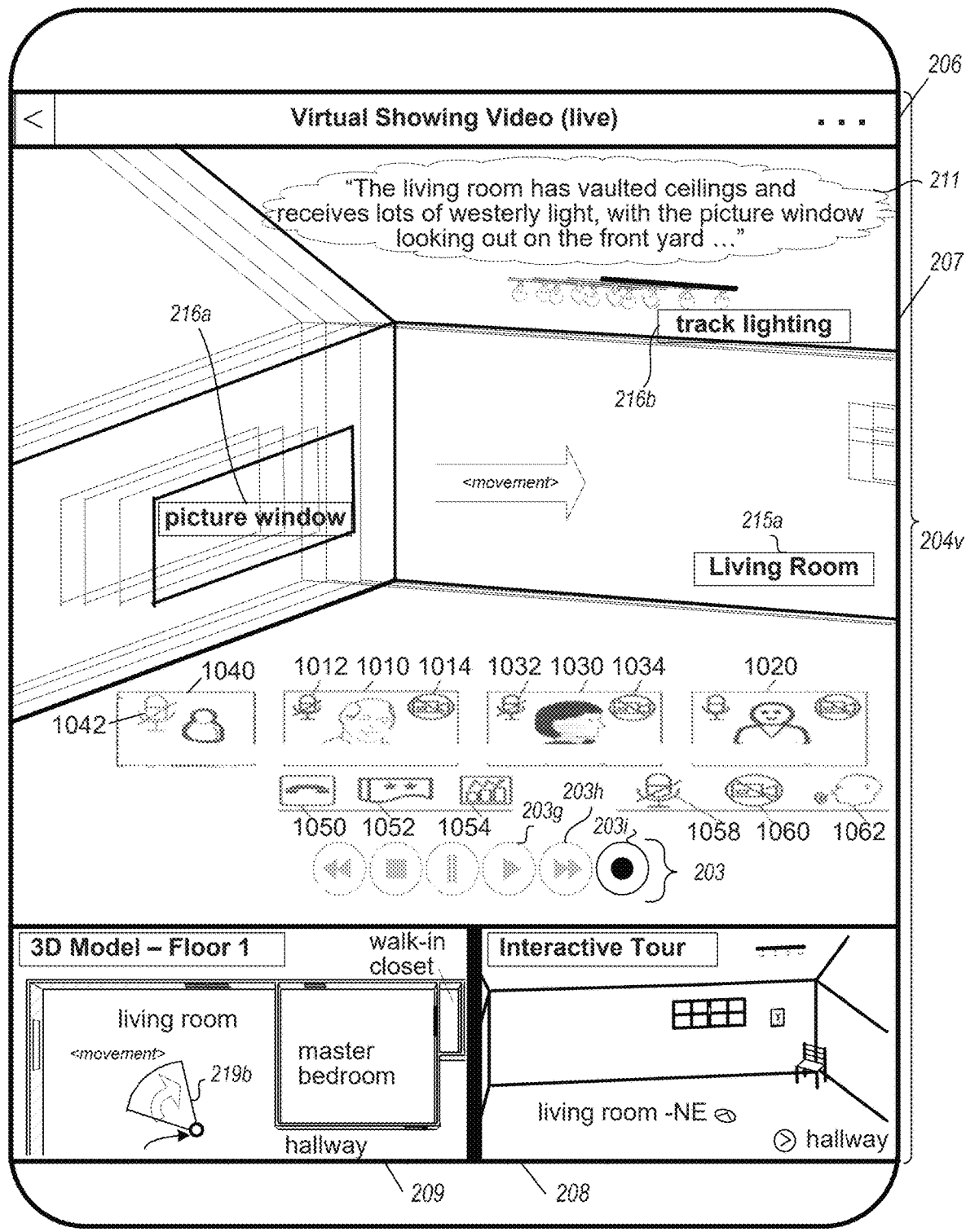

FIG. 2V continues the examples of FIGS. 2A-2U, and illustrates information similar to that of FIG. 2D, but in which video information such as that shown in the secondary pane 208 of FIG. 2D has been moved to the main pane 207 of FIG. 2V, and in which the secondary pane 208 of FIG. 2V shows information about an interactive tour in a manner similar to that of FIGS. 2A and 2B—various information 204v is displayed in the GUI of FIG. 2V, including a header area 206 that illustrates the type of content shown in the primary pane 207. In particular, in the example of FIG. 2V, the video information shown in the main pane 207 corresponds to a live virtual showing tour of the house 198 that occurs in a real-time or near-real-time manner with respect to the recording and/or transmitting of the video, with a presenter device (not shown) currently positioned in the living room and facing in a roughly northwest direction and rotating toward the north as well as laterally moving in a roughly eastward direction through a succession of multiple locations inside and/or around an outside of the building—in this example, motion artifacts are shown in FIG. 2V to denote changes in the displayed visual data corresponding to movement of the camera on the presenter device, but it will be appreciated that the video displayed to an actual recipient on a client device may not include such artifacts. In the illustrated example, audio data may be included as part of the video, with example information 211 corresponding to spoken information (e.g., by a user of the presenter device, such as captured by a microphone of the presenter device, or by another participant in an interactive communication session amongst multiple client devices that are receiving the video transmission) that is transmitted as part of the video to the various recipient participants and presented on the client devices of the participants, while in other embodiments and situations such audio may not be included as part of the video.

In this example, the FMGM system is performing automated operations that include analyzing visual data of the video to determine one or more types of information, such as a tag/label or other identifier 215a corresponding to the room or other area in which the video is currently being recorded, and/or one or more tags/labels or other identifiers 216 (e.g., 216a and 216b) corresponding to features identified in the current room or other area—as discussed in greater detail elsewhere herein, such automated determination of tags/labels or other identifiers may in some embodiments (such as the illustrated example) be performed in a real-time or near-real-time manner with respect to the capture and/or transmission of the visual data, such as within milliseconds, seconds, minutes, etc. In addition, the primary pane 207 also includes various user-selectable GUI controls, including controls 203 that correspond to the video playback and recording (e.g., a play control 203g, a fast-forward control 203h, etc.), with most of the playback controls being currently grayed out and not selectable due to the video being live rather than a playback of an earlier recorded video, although a recording control is currently selectable to enable one or more participants in the interactive communication session to record the video (e.g., just visual and audio data transmitted from the presenter device, to include some or all of the additional data communicated between participants as part of the interactive communication session, etc.). As discussed with respect to the GUI information elsewhere herein, the information shown in the illustrated panes of the GUI may be coordinated, such as to update the information overlaid on the computer model of the building in pane 209 to reflect a current position of the presenter device that is recording video shown in the primary pane 207, to update the portion of the building shown in the computer model and/or interactive tour of secondary panes 208 and 209 to correspond to that similar position of the presenter device, to display and/or highlight particular overlaid information (e.g., tags/labels and other identifiers) corresponding to a current room to which the video currently corresponds, etc.

As one non-exclusive embodiment, the video displayed is part of a virtual showing tour of a building by a presenter device at the building, such as to provide a shared virtual showing tour to other client devices remote from the building. Such a virtual showing tour may, for example, be conducted using video conference functionality of the FMGM system (or separate video conference software used in conjunction with the FMGM system). The presenter device (such as a smart phone, a tablet computer, a laptop computer, etc.) has a camera that is aimed at various features of the property, while the other participants of the virtual showing tour may concurrently view the features of the property on their own electronic client communication devices at their own locations respectively. The transmissions from the presenter device, and between the other client devices as part of an interactive communication session, may include audio, video and/or other types of data (e.g., feedback and instructions, and referred to generally herein as 'digital data')—in at least some embodiments and situations, some or all of the transmissions may be relayed via one or more intermediate server devices that implement at least some of the FMGM system, referred to at times herein as 'relay servers'.

The illustrated GUI controls in FIG. 2V also include various GUI controls 1010-1062, such as to provide functionality related to the interactive communication session for the virtual showing tour. In this example, a first user indicator is shown at 1010 (e.g., corresponding to a first user using a client device that is a recipient of the virtual showing tour video, such as a seller of the building and its property), and video images of the first user are captured by the first user device in this example and transmitted to the current device (either directly or through the media relay server), and displayed at 1010. In addition, the first user indicator 1010 in this example includes a first user audio control 1012 and a first user video control 1014, such as user-selectable buttons that a user of the current device can operate to turn on or off the audio and video of the first user respectively (e.g., audio of the first user as captured by a microphone of the first user' device and sent to the current device either directly or through the media relay server when the audio control 1012 is enabled)—audio of the first user that is enabled and received is played back via a speaker of the current device, but when the audio control 1012 is disabled (meaning turned off), the audio of the first user is not sent to the current device or not played back on the current device. A second indicator is shown at 1040 (e.g., corresponding to a second user using a client device that is a recipient of the virtual showing tour video, such as a potential buyer of the building and its property), but the second user is not shown in the indicator 1040 in this example, with an anonymous icon shown (e.g., to hide an identity of the second user, including information such as the second user's face, body, setting, etc.)—for example, video images of the second user captured by the second user's device are not sent to the current device or are not displayed on the current device. In this example, the current user of the current device and the second user cannot speak to or hear from each other either, with the muted audio status icon 1042 indicating that fact and not being an operable control. A fourth indicator of the current fourth user herself/himself is shown at 1020, with video images of the current fourth user herself/himself being captured by the camera of the current device and shown at 1020, such as to show what other participants of the virtual showing tour video and its interactive communication session, and audio of the fourth user is captured using a microphone of the current device. A third indicator is shown at 1030 (e.g., corresponding to a third user using a client device that is a recipient of the virtual showing tour video, such as a buyer's third user of the building and its property), with video images and audio of the third user being captured by a camera and microphone of the third user's device respectively, and transmitted to the current device either directly or through the media relay server, with the video images of the third user displayed at the third user indicator 1030 and audio of the third user being played back through a speaker of the current device. The third user indicator 1030 also includes a third user audio control 1032 and a third user video control 1034, which allow the current fourth user to enable or disable the corresponding media data (audio or video) from the third user's device. When the controls 1032-1034 are disabled, the corresponding media data is not transmitted to the current device or not presented on the current device, and when the controls 1032-1034 are enabled, the corresponding media data is transmitted to the current device and presented on the current device.

In this example, the FMGM system (e.g., a special remote computer software application of the FMGM system) further provides a termination control 1050, a real-time audio feedback control 1052, an engagement control 1054, an audio mute control 1058, a video mute control 1060 and a confidential audio control 1062. When the termination control 1050 is selected, the FMGM system terminates the current fourth user's participation in the virtual showing tour, so as to exit from the virtual showing tour. When the real-time audio feedback control 1052 is pressed and held, the current fourth user speaks out her/his request to the third user or another indicated user (e.g., another participant in the interactive communication session with which a confidential audio pair is established, such as based on a preexisting relationship between the current user and that other user and/or based on respective roles of the current user and that other user) for her/his feedback on a particular room or other feature (such as the dining room, the kitchen, etc.) being shown and indicated in the video (also referred to herein as the active feature). The FMGM system receives the audio data, representing the current fourth user's real-time feedback request and captured by the microphone of the current device—the audio is not transmitted to or presented on devices other than that of the third user or other indicated user, with the FMGM system optionally transcribing the audio into text and displaying it on the display screen of the current device, as well as sending that text and/or the audio to the device of the third user (or of the other indicated user) either directly or through a relay server. When the device of the third user (or of the other indicated user) receives the real-time feedback request, it is presented to the third user (or the other indicated user), such as to display text on that device's display screen or to play back audio via that device's speaker. In response, the third user (or the other indicated user) may orally provide a response, with a microphone of the device of the third user (or the other indicated user) capturing the audio of the real-time feedback response device—the audio is not transmitted to or presented on devices other than that of the current device that sent the real-time feedback request, with the FMGM system optionally transcribing the audio into text and displaying it on the display screen of the device of the third user (or the other indicated user), as well as sending that text and/or the audio to the current device either directly or through a relay server. The FMGM system may further store the real-time feedback request and response (referred to herein as virtual showing tour real-time feedback) and use it in one or more further manners, such as to update listing information associated with the building and its property. The real-time audio feedback mode may be ended in various manners, such as when the real-time audio feedback control 1052 is released, or alternatively when the real-time audio feedback control 1052 is pressed and released a second time (in which case the real-time audio feedback control 1052 is used as a toggle button). When the engagement control 1054 is selected, the FMGM system provides engagement data of the first user (or other indicated user), and displays the same on the display screen of the current device. When the recording control 203*i* is selected, the FMGM system starts recording of the virtual showing tour, and stops the recording when indicated (e.g., via toggling of the recording control, when the stop control is selected, etc.), with the recording of the virtual showing tour and its associated media being saved for later use. When the audio mute control 1058 is turned on, the FMGM system does not transmit any audio of the current fourth user to the other devices, and does transmit such audio as captured by the microphone of the current device to the other devices when turned off, although the audio of the current fourth user may not be transmitted or relayed to a device that has disabled the audio of the current fourth user via corresponding GUI controls on that device. Alternatively, pressing the audio mute control 1058 may bring up a selection list that allows the current fourth user to select which other users for which to mute or unmute the audio feed. When the video mute control 1060 is turned on, the FMGM system does not transmit any video images of the current fourth user to the other devices, and does transmit such video as captured by the camera of the current device to the other devices when turned off, although the video of the current fourth user may not be transmitted or relayed to a device that has disabled the video of the current fourth user via corresponding GUI controls on that device. Alternatively, pressing the video mute control 1060 may bring up a selection list that allows the current fourth user to select which other users for which to mute or unmute the video feed. When the confidential audio control 1062 is turned on, a confidential audio communication channel between the current fourth user and the first user (or other indicated user) is established. In the confidential audio mode, the audio of the current fourth user is only sent to the device of the first user (or other indicated user) either directly or through a media relay server—when the confidential audio control 1062 is turned off, the confidential audio mode is then turned off; and the audio of the current fourth user is no longer limited to the device of the first user (or other indicated user), and is transmitted to all of the other devices (other than to a device that has disabled the audio of the current fourth user via corresponding GUI controls on that device).

Figure 2W:
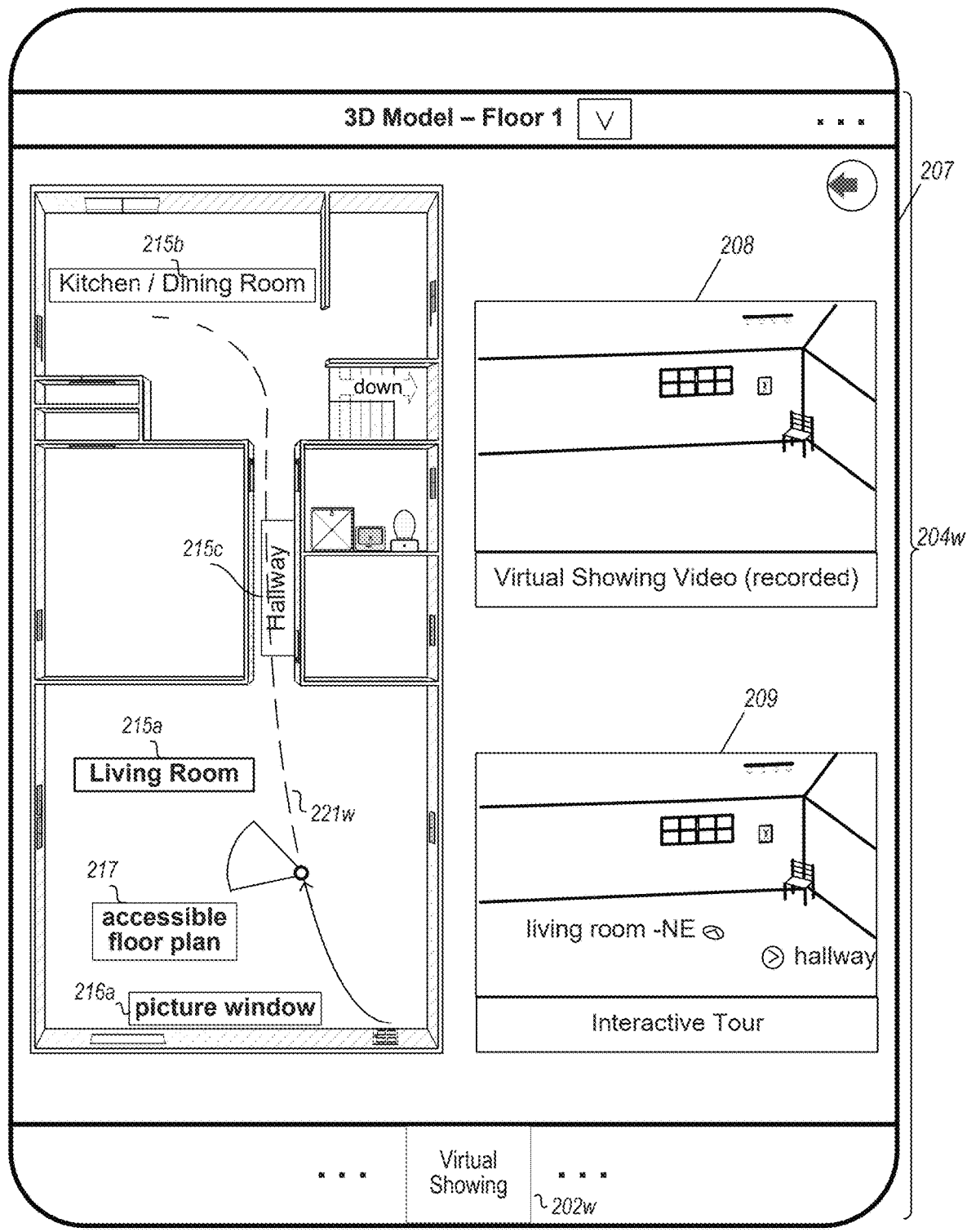
Figure 2X:
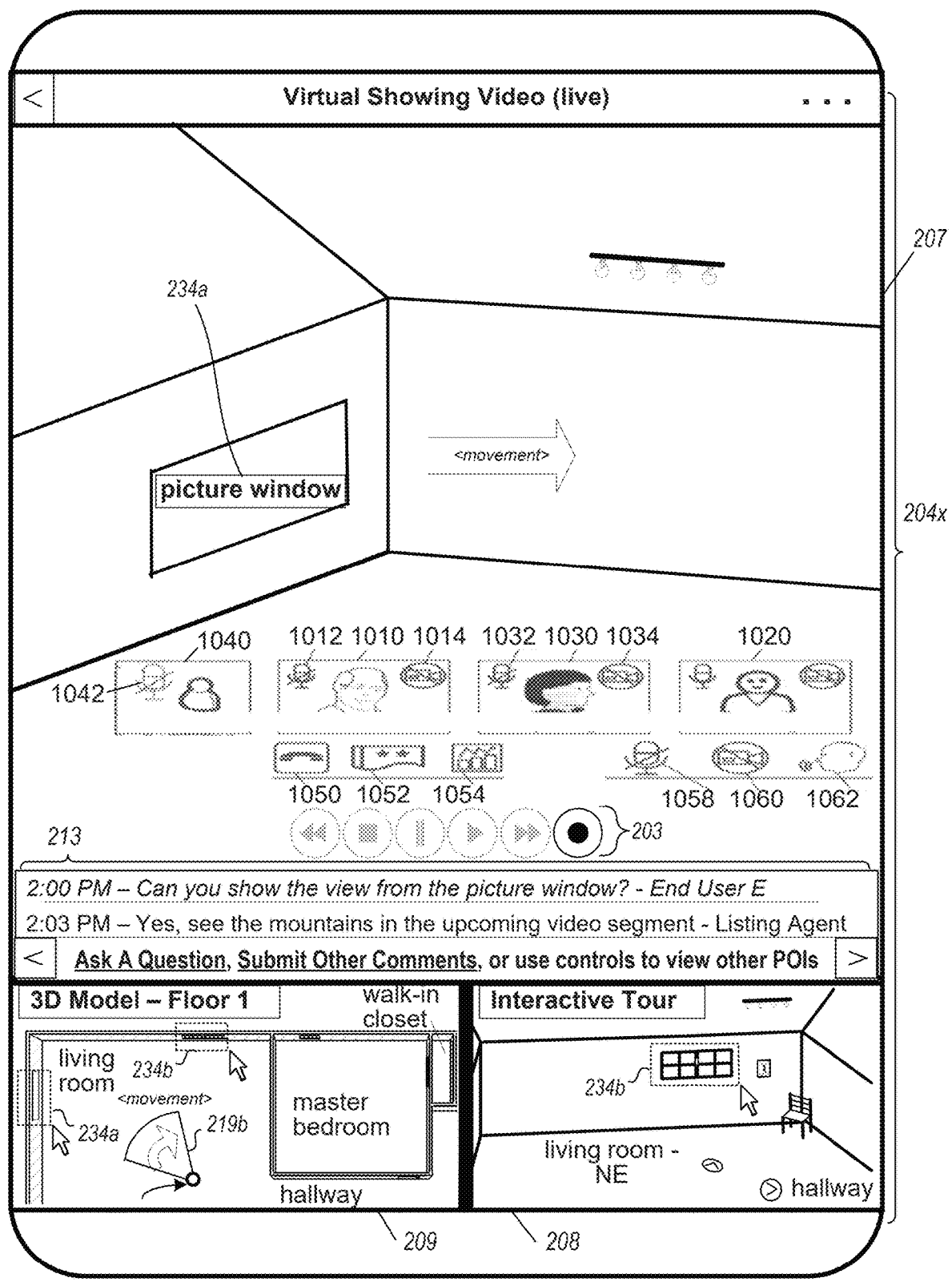

FIG. 2W continues the examples of FIGS. 2A-2V, and illustrates information similar to that of FIGS. 2F and 2H through 2-O, but in which video information (e.g., as part of a virtual showing tour, such as in a manner similar to that discussed for FIG. 2V and elsewhere herein) is illustrated in secondary pane 208, with a computer model of the first story of the building being shown in primary pane 207. An illustrated path 221*w* is overlayed on the computer model in the primary pane to reflect movement of a presenter device through a succession of multiple locations at the building while capturing the video for the virtual showing tour—as discussed with respect to FIG. 2V and elsewhere herein, the video may be live (e.g., transmitted to the current client device and optionally other devices in real-time or near-real-time as the presenter device moves through the building) or being played back from a previous recording, and in this example is a playback of recorded video that allows a prior analysis of the visual data of the video (and optionally additional data captured by the presenter device, such as movement data from IMU sensors) to determine the path 221w and to further show a portion of a future part of the path while the presenter device is still in the living room. In this example, various information 204w is displayed in the GUI, including various user-selectable GUI controls 202 that include the currently selected control 202w corresponding to displaying video for a virtual showing tour, and tags/labels or other identifiers 215-217 determined for rooms or other areas of the building, structural elements and other features of such rooms and other areas, attributes of rooms or other areas or the building as a whole, etc. and overlaid on the computer model—in this example, an identifier 217 is shown to indicate that a determined attribute of the building includes that it is an accessible floor plan (e.g., based on all of the first story being wheelchair accessible), as well as identifiers 215a-c corresponding to determined room types, and other identifiers 216 (e.g., 216a) corresponding to other such features. While GUI controls and tags/labels and other identifiers are not shown in the secondary pane 208 in this example, such information may be included in at least some embodiments. Also, as discussed with respect to the GUI information elsewhere herein, the information shown in the illustrated panes of the GUI may be coordinated, such as to update the position and orientation information overlaid on the computer model of the building to reflect a current position of the presenter device that recorded video shown in the secondary pane 208, to update the portion of the building shown in the interactive tour of secondary pane 209 to correspond to that similar position of the presenter device, to display and/or highlight particular overlaid information (e.g., room type tag 215a) corresponding to a current room to which the video currently corresponds, etc. It will be appreciated that various additional types of information may be displayed in a similar manner in other embodiments and situations.

FIG. 2X continues the examples of FIGS. 2A-2W, and illustrates information similar to that of FIG. 2V and FIG. 2B, but in which one or more participants in the virtual showing tour have submitted questions and/or requests related to points of interest (POIs) in or around the building (e.g., in one or more external areas on the property containing the building), such as by indicating locations in visual data from the building (e.g., images, a video, etc.) and/or on associated building information (e.g., a 3D computer model or other floorplan), or by otherwise describing one or more POIs, and optionally providing text and/or audio related to the questions or requests. Such POI indications from the one or more participants may occur, for example, during a virtual tour (e.g., by the participant selecting or otherwise indicating current visual data being shown in a video for a virtual tour), or in advance of a virtual tour (e.g., on images or other building information displayed in a GUI on a client device of the participant), with non-exclusive examples 234a and 234b shown in panes 208 and 209 corresponding to windows in the living room. Such POI indications may further be used to direct activities during the virtual tour, such as to direct a user of a presenter device at the building to obtain visual and/or audio data from or for a particular POI and/or to provide audio commentary related to the POI, and/or to cause another participant in the virtual tour to respond as part of an interactive communication session during the virtual tour, with one example including using such POI indications to direct all of the virtual tour (e.g., for the virtual tour to travel to locations of each of the POI indications and provide corresponding information about them)—in other embodiments, a user associated with the building (whether or not a participant in the virtual tour) may provide response information after the virtual tour to the participant who submitted the question or other request. In the illustrated example of FIG. 2X, one of the virtual tour participants (in this example referred to as 'End User E') has indicated the picture window in the living room as a POI 234a (whether before or during the virtual tour), and another participant in the virtual tour (whether the user of the presenter device at the building or another one of the video recipients) may provide a textual or audio response (e.g., as part of displayed information 213 displayed in the GUI), as well as to direct the user of the presenter device to capture additional visual data in the video of a particular type (in this example, to show the view out the picture window from the living room), such as by the presenter device moving to the picture window and directing a camera outwards. Other non-exclusive examples of questions and/or requests include requesting information about when an indicated wall was last painted, when a water heater was last replaced or serviced, etc. Non-exclusive examples of building locations at which additional visual data is requested include near an indicated window, around the kitchen, inside an indicated closet, at one or more indicated locations outside the building, etc. In addition, such POI indications may be determined in other manners in other embodiments, such as based on visual analysis of images and/or other captured building data (e.g., using one or more trained machine learning models), supplied by a property owner and/or associated property listing agent, etc., and whether in addition to or instead of by the 'End User E' virtual tour participant in the example of FIG. 2X. Furthermore, such POI indications may be further used in other manners in some embodiments and situations, such as to search for other buildings that have similar POIs, whether in addition to or instead of using the POI indications to direct activities during a virtual tour.

Various details have been provided with respect to FIGS. 2A-2X, but it will be appreciated that the provided details are non-exclusive examples included for illustrative purposes, and other embodiments may be performed in other manners without some or all such details. For example, while not illustrated in the examples of FIGS. 2A-2X, the GUI could have other forms in other embodiments, such as to have other user-selectable and/or user-modifiable controls (whether instead of or in addition to the illustrated controls), and/or to have particular controls be accessed and used in other manners, and/or to be displayed or otherwise presented on other types of devices (e.g., desktop or laptop computers, tablet computers, etc.), and/or to be displayed or otherwise presented in other types of formats and layouts (e.g., to have more or less GUI panes, to have different layouts and/or sizes of GUI panes, to display multiple types of information simultaneously without using GUI panes like those of the examples, etc.). In addition, additional types of functionality related to displaying or otherwise presenting building interior information may be provided in other embodiments. Various other changes to the GUI may be further made in other embodiments.

Figure 3:
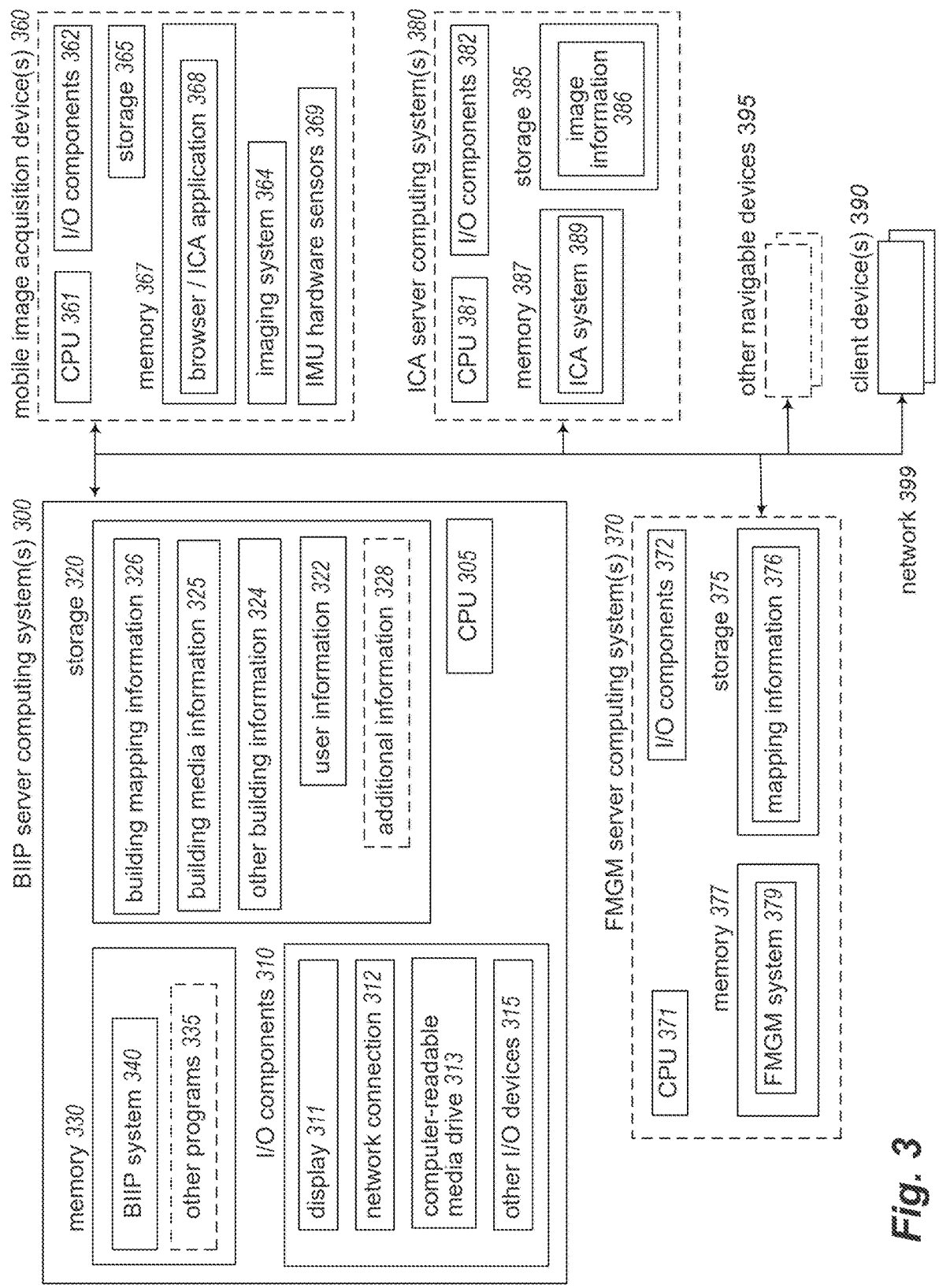
FIG. 3 is a block diagram illustrating computing systems suitable for executing embodiments of one or more systems that perform at least some of the techniques described in the present disclosure.

FIG. 3 is a block diagram illustrating an embodiment of one or more server computing systems 300 executing an implementation of a BIIP system 340, optionally one or more server computing systems 380 executing an implementation of an ICA system 389, and optionally one or more server computing systems 370 executing an implementation of an FMGM system 379—the server computing system(s) and BIIP and/or FMGM and/or ICA systems may be implemented using a plurality of hardware components that form electronic circuits suitable for and configured to, when in combined operation, perform at least some of the techniques described herein. In the illustrated embodiment, each server computing system 300 includes one or more hardware central processing units ("CPUs") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.). Each server computing system 380 and 370 may have similar components, although only one or more hardware processors 381 and 371, memory 387 and 377, storage 385 and 375, and I/O components 382 and 372, respectively, are illustrated for the sake of brevity.

The server computing system(s) 300 and executing BIIP system 340, and server computing system(s) 380 and executing ICA system 389 if present, and server computing system(s) 370 and executing FMGM system 379 if present, may communicate with each other and with other computing systems and devices in this illustrated embodiment via one or more networks 399 (e.g., the Internet, one or more cellular telephone networks, etc.), such as to interact with user client computing devices 390 (e.g., used to view a GUI that simultaneously displays multiple types of information about an interior of a building in an integrated and coordinated manner, or to otherwise present information about a building), and/or one or more mobile image acquisition devices 360 (e.g., used to acquire images and optionally other information for buildings or other environments to be modeled), and/or optionally other navigable devices 395 that receive and use computer models and/or other building information (e.g., 2D floor maps) for navigation purposes (e.g., for use by semi-autonomous or fully autonomous vehicles or other devices). In other embodiments, some of the described functionality may be combined in less computing systems, such as to combine the ICA system 389 and the image acquisition functionality of device(s) 360 in a single system or device (e.g., via the optional ICA application 368 executing in memory 367 of the mobile device 360), to combine the BIIP system 340 and/or the ICA system 389 and/or the FMGM system 379 in a single system or device, to combine the BIIP system 340 and the ICA system 389 and the FMGM system 379 and the image acquisition functionality of device(s) 360 in a single system or device, etc.

In the illustrated example of FIG. 3, an embodiment of the BIIP system 340 executes in memory 330 of the server computing system(s) 300 in order to perform at least some of the described techniques, such as by using the processor(s) 305 to execute software instructions of the system 340 in a manner that configures the processor(s) 305 and computing system 300 to perform automated operations that implement those described techniques. The illustrated embodiment of the BIIP system may include one or more components, not shown, to each perform portions of the functionality of the BIIP system, and the memory may further optionally execute one or more other programs 335—as one specific example, a copy of the ICA and/or FMGM systems may each execute as one of the other programs 335 in at least some embodiments, such as instead of or in addition to the ICA system 389 on the server computing system(s) 380 and the FMGM system 379 on the server computing system(s) 370. The BIIP system 340 may further, during its operation, store and/or retrieve various types of data on storage 320 (e.g., in one or more databases or other data structures), such as various types of user information 322, images and other media information 325 acquired from or about a building (e.g., received from ICA system 389, to provide to users of client computing devices 390 for display; etc.), generated computer models and optionally floor maps and other associated mapping information 326 (e.g., received from FMGM system 379, such as generated and saved 2.5D and/or 3D models, 2D floor maps, etc.), other types of building information 324 (e.g., annotations and other descriptions, information about points of interest, information about surrounding buildings and/or vegetation and/or other exterior information for the building, etc., such as to be determined in part or in whole from automated analysis of visual data of captured images; as well as information from end users, such as questions; information from BIIP system operator users or other authorized users, such as answers to questions; etc.), and/or various types of optional additional information 328 (e.g., various analytical information related to analysis of other building information and/or end user activities).

In addition, an embodiment of the ICA system 389 executes in memory 387 of the server computing system(s) 380 in the illustrated embodiment in order to perform automated operations related to acquiring images of building interiors (and optionally exteriors of buildings, including their surroundings), such as by using the processor(s) 381 to execute software instructions of the system 389 in a manner that configures the processor(s) 381 and computing system 380 to perform such automated operations. Similarly, an embodiment of the FMGM system 379 executes in memory 377 of the server computing system(s) 370 in the illustrated embodiment in order to perform automated operations related to generating computer models and optionally floor maps of building interiors, such as by using the processor(s) 371 to execute software instructions of the system 379 in a manner that configures the processor(s) 371 and computing system 370 to perform such automated operations. The illustrated embodiments of the ICA and/or FMGM systems may each include one or more components, not shown, to each perform portions of the functionality of their respective ICA or FMGM system, and the respective computer memories may further optionally execute one or more other programs (not shown). The ICA system 389 and/or FMGM system 379 may further, during their operation, store and/or retrieve various types of data on storage 385 or 375, respectively (e.g., in one or more databases or other data structures), such as acquired images 386, generated computer models 376 (e.g., generated and saved 2.5D and/or 3D models) and optionally floor maps and other associated information 376 (e.g., building and room dimensions for use with associated floor plans, additional images and/or annotation information, various analytical information related to presentation or other use of one or more building interiors or other environments, etc.)—while not illustrated in FIG. 3, the ICA and/or FMGM systems may further store and use additional types of information, such as about system operator users of the respective systems, metadata about acquisition of images to be analyzed, etc.

Some or all of the user client computing devices 390 (e.g., mobile devices), mobile image acquisition devices 360, optional other navigable devices 395 and other computing systems (not shown) may similarly include some or all of the same types of components illustrated for server computing system 300. As one non-limiting example, the mobile image acquisition device(s) 360 are each shown to include one or more hardware CPU(s) 361, I/O components 362, storage 365, and memory 367, with one or both of a browser and one or more client applications 368 (e.g., an application specific to the FMGM system and/or ICA system and/or BIIP system) executing within memory 367, such as to participate in communication with the BIIP system 340, ICA system 389, FMGM system 379 and/or other computing systems—the devices 360 each further include one or more imaging systems 364 and IMU hardware sensors 369, such as for use in acquisition of images and associated movement/travel data of the device 360. While particular components are not illustrated for the other navigable devices 395 or other computing systems 390, it will be appreciated that they may include similar and/or additional components.

It will also be appreciated that computing systems 300, 370 and 380 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated systems 340 and/or 379 and/or 389 may in some embodiments each be distributed in various components, some of the described functionality of the systems 340 and/or 379 and/or 389 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the BIIP system software 340 executing on server computing systems 300 and/or on devices 360, by the ICA system software 389 executing on server computing systems 380, by the FMGM system software 379 executing on server computing systems 370, etc.) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
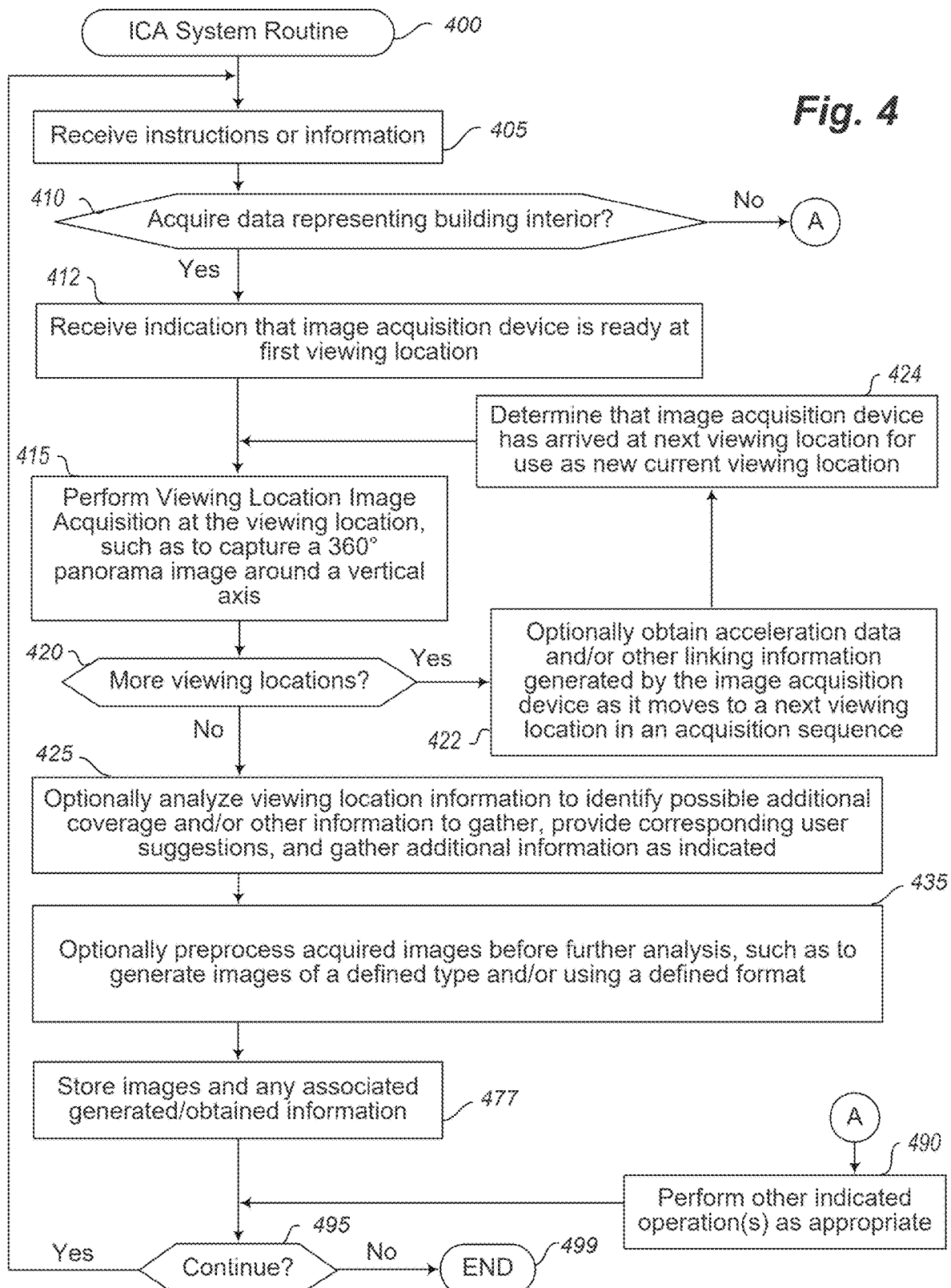
FIG. 4 illustrates an example embodiment of a flow diagram for an Image Capture and Analysis (ICA) system routine in accordance with an embodiment of the present disclosure.

FIG. 4 illustrates an example flow diagram of an embodiment of an ICA System routine 400. The routine may be performed by, for example, the ICA system 160 of FIG. 1, the ICA system 389 of FIG. 3, and/or the ICA system described with respect to FIGS. 1-2X and as otherwise described herein, such as to acquire images (e.g., 360° spherical panorama images) at viewing locations within buildings or other structures, such as for use in subsequent generation of related floor maps and/or other mapping information. While portions of the example routine 400 are discussed with respect to acquiring particular types of images at particular viewing locations, it will be appreciated that this or a similar routine may be used to acquire video or other data (e.g., audio), whether instead of or in addition to such images. In addition, while the illustrated embodiment acquires and uses information from the interior of a target building, it will be appreciated that other embodiments may perform similar techniques for other types of data, including for non-building structures and/or for information external to one or more target buildings of interest. Furthermore, some or all of the routine may be executed on a mobile device used by a user to acquire image information, and/or by a system remote from such a mobile device.

The illustrated embodiment of the routine begins at block 405, where instructions or information are received. At block 410, the routine determines whether the received instructions or information indicate to acquire data representing a building interior, and if not continues to block 490. Otherwise, the routine proceeds to block 412 to receive an indication from a user of a mobile image acquisition device to begin the image acquisition process at a first viewing location. After block 412, the routine proceeds to block 415 in order to perform viewing location image acquisition activities in order to acquire an image (e.g., a 360° panorama image) for the viewing location in the interior of the target building of interest, optionally via one or more fisheye lenses on the mobile device to provide horizontal coverage of at least 360° around a vertical axis. As one non-exclusive example, the mobile image acquisition device may be a rotating (scanning) panorama camera equipped with a fisheye lens, such as a 180° fisheye giving a full sphere at 360° rotation. The routine may also optionally obtain annotation and/or other information (e.g., information about points of interest, other descriptions, etc.) from the user regarding the viewing location and/or the surrounding environment, such as for later use in presentation of information regarding that viewing location and/or surrounding environment.

After block 415 is completed, the routine continues to block 420 to determine if there are more viewing locations at which to acquire images, such as based on corresponding information provided by the user of the mobile device, and/or based on automated tracking of viewing locations visited (e.g., based on a predefined group of viewing locations, based on acquiring at least one viewing location in each of a predefined group of rooms, etc.). If so, and when the user is ready to continue the process (if the device is carried by the user or its movement is otherwise controlled by the user), the routine continues to block 422 to optionally initiate the capture of linking information (e.g., acceleration data and/or other data that changes as the device moves) during movement of the mobile device along a travel path away from the current viewing location and towards a next viewing location within the building interior. As described elsewhere herein, the captured linking information may include additional sensor data (e.g., from one or more IMUs, or inertial measurement units, on the mobile device or otherwise carried by the user), as well as additional video information, recorded during such movement. Initiating the capture of such linking information may be performed in response to an explicit indication from a user of the mobile device or based on one or more automated analyses of information recorded from the mobile device. In addition, the routine may further optionally monitor the motion of the mobile device in some embodiments during movement to the next viewing location, and provide one or more guidance cues to the user regarding the motion of the mobile device, quality of the sensor data and/or video information being captured, associated lighting/environmental conditions, advisability of capturing a next viewing location, information about how to reach a defined next viewing location and/or about when the defined next viewing location is reached, and any other suitable aspects of capturing the linking information. Similarly, the routine may optionally obtain annotation and/or other information (e.g., information about points of interest, other descriptions, etc.) from the user regarding the travel path, such as for later use in presentation of information regarding that travel path or a resulting inter-panorama connection link. In block 424, the routine determines that the mobile device has arrived at the next viewing location (e.g., based on an indication from the user, based on the forward movement of the user stopping for at least a predefined amount of time, based on reaching a predefined spot for the next viewing location, etc.), for use as the new current viewing location, and returns to block 415 in order to perform the viewing location image acquisition activities for the new current viewing location.

Figure 5A:
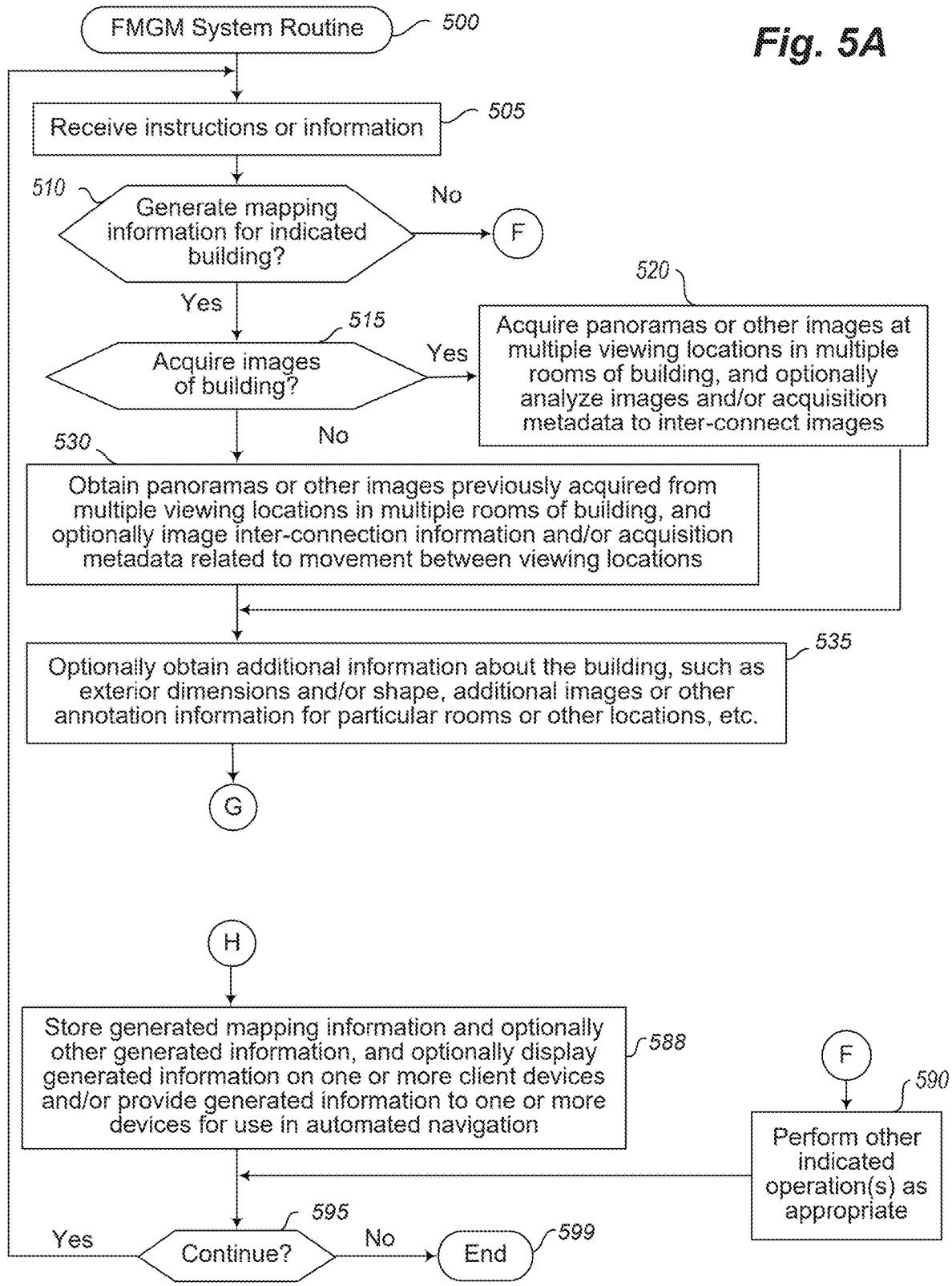

If it is instead determined in block 420 that there are not any more viewing locations at which to acquire image information for the current building or other structure, the routine proceeds to block 425 to optionally analyze the viewing location information for the building or other structure, such as to identify possible additional coverage (and/or other information) to acquire within the building interior. For example, the ICA system may provide one or more notifications to the user regarding the information acquired during capture of the multiple viewing locations and optionally corresponding linking information, such as if it determines that one or more segments of the recorded information are of insufficient or undesirable quality, or do not appear to provide complete coverage of the building. After block 425, the routine continues to block 435 to optionally preprocess the acquired images before their subsequent use for generating related mapping information, such as to perform an equirectangular projection for each such image so that straight vertical data (e.g., the sides of a typical rectangular door frame, a typical border between 2 adjacent walls, etc.) remains straight and in which straight horizontal data (e.g., the top of a typical rectangular door frame, border between a wall and a floor, etc.) at a horizontal midline of the image remains straight but is increasingly curved in the equirectangular projection image in a convex manner relative to the horizontal midline as the distance increases in the image from the horizontal midline. In at least some embodiments, an automated analysis of some or all of the images may further be performed to determine corresponding information about the building interior, such as types of rooms, points of interest in particular locations, etc. In block 477, the images and any associated generated or obtained information is stored for later use, and optionally provided to an FMGM routine for further analysis. FIGS. 5A-5B illustrate one example of a routine for generating a floor map representation of a building interior from the generated panorama information.

If it is instead determined in block 410 that the instructions or other information recited in block 405 are not to acquire images and other data representing a building interior, the routine continues instead to block 490 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the ICA system, etc.), to obtain and store other information about users of the system, to respond to requests for generated and stored information, etc.

Following blocks 477 or 490, the routine proceeds to block 495 to determine whether to continue, such as until an explicit indication to terminate is received, or instead only if an explicit indication to continue is received. If it is determined to continue, the routine returns to block 405 to await additional instructions or information, and if not proceeds to step 499 and ends.

FIGS. 5A-5B illustrate an example embodiment of a flow diagram for a Floor Map Generation Manager (FMGM) System routine 500. The routine may be performed by, for example, execution of the FMGM system 160 of FIG. 1, the FMGM system 379 of FIG. 3, and/or an FMGM system as discussed with respect to FIGS. 1-2X and elsewhere as described herein, such as to generate a computer model and optionally other mapping information for a defined area based at least in part on images of the area. In the example of FIGS. 5A-5B, the generated mapping information includes a 3D computer model and 2D floor map of a building, such as a house, but in other embodiments, other types of mapping information may be determined and generated for other types of buildings and used in other manners, as discussed elsewhere herein.

The illustrated embodiment of the routine begins at block 505, where information or instructions are received. The routine continues to block 510 to determine whether the instructions received in block 505 indicate to generate mapping information for an indicated building, optionally along with associated information about the building, and if so the routine continues to perform blocks 515-588 to do so, and otherwise continues to block 590.

In block 515, the routine determines whether image information is already available for the building, or if such information instead needs to be acquired. If it is determined in block 515 that the information needs to be acquired, the routine continues to block 520 to acquire such information, optionally waiting for one or more users or devices to move throughout the building and acquire panoramas or other images at multiple viewing locations in multiple rooms of the building, and to optionally further analyze the images and/or metadata information about their acquisition to interconnect the images, as discussed in greater detail elsewhere herein—FIG. 4 provides one example embodiment of an ICA system routine for performing such image acquisition. If it is instead determined in block 515 that it is not necessary to acquire the images, the routine continues instead to block 530 to obtain existing panoramas or other images from multiple viewing locations in multiple rooms of the building, optionally along with interconnection information for the images and acquisition of metadata information related to movement between the viewing locations, such as may in some situations have been supplied in block 505 along with the corresponding instructions.

After blocks 520 or 530, the routine continues to block 535 to optionally obtain additional information about the building, such as from activities performed during acquisition and optionally analysis of the images, and/or from one or more external sources (e.g., online databases, information provided by one or more end users, etc.)—such additional information may include, for example, exterior dimensions and/or shape of the building, additional images and/or annotation information acquired corresponding to particular locations within the building (optionally for locations different from viewing locations of the acquired panorama or other images), etc.

After block 535, the routine continues to block 550 to determine, for each room inside the building with one or more viewing locations and associated acquired images, a room shape of the room for data in the image(s) taken inside the room, and optionally a position within the room of its viewing location(s), such as in an automated manner. In block 555, the routine further uses visual data in the images and/or the acquisition metadata for them to determine, for each room in the building, any connecting passages in or out of the room, such as in an automated manner. It will be appreciated that, while blocks 550-555, are illustrated as separate operations in this example, in some embodiments a single analysis of the images may be performed to acquire or determine multiple types of information, such as those discussed with respect to blocks 550-555.

In block 570, the routine then determines estimated positions of the room shapes to create an initial 2D floor map, such as by connecting inter-room passages in their respective rooms, by optionally positioning room shapes around determined viewing location positions (e.g., if the viewing location positions are inter-connected), and by optionally applying one or more constraints or optimizations. Such a floor map may include, for example, relative position and shape information for the various rooms without providing any actual dimension information for the individual rooms or building as a whole, and may further include multiple linked or associated sub-maps (e.g., to reflect different stories, levels, sections, etc.) of the building.

After block 570, the routine optionally performs one or more steps 575-580 to determine and associate additional information with the floor map. In block 575, the routine optionally estimates the dimensions of some or all of the rooms, such as from analysis of images and/or their acquisition metadata or from overall dimension information obtained for the exterior of the building, and associates the estimated dimensions with the floor map—it will be appreciated that if sufficiently detailed dimension information were available, a floor plan (e.g., architectural drawings, blueprints, etc.) may be generated from the floor map. After block 575, the routine continues to block 580 to optionally associate further information with the floor map (e.g., with particular rooms or other locations within the building), such as additional images and/or annotation information. After block 580, the routine continues to block 583, where it analyzes, for each room in the building with one or more image viewing locations, the image(s) from the image viewing location(s) to determine information about aspects of the building interior that are visible in the image(s) (e.g., types of rooms and/or associated functionality; structural elements and other physical components of the building interior such as one or more of walls, windows, doors, stairs, fireplaces, kitchen islands, cabinets, counters, lighting fixtures, plumbing fixtures, built-in elements such as sinks and/or showers/baths and/or ovens and/or stoves and/or trash compactors and/or water heaters and/or HVAC (heating, ventilation and/or cooling) equipment and/or dish washers, moveable appliances such as refrigerators and/or clothes washers and/or dryers and/or microwaves, types of infrastructure such as using wiring and/or piping, including electrical outlets and/or cable outlets and/or telephone outlets and/or air vents and/or plumbing fixtures and/or sprinklers and/or lighting fixtures and/or speakers and/or speaker outlet/wiring locations and/or security cameras, curtains and/or other furnishings, floor coverings, materials used for surfaces such as kitchen countertops and/or wallpaper and/or paint and/or floors, furniture, fire extinguishers, etc. and optionally their locations and/or brands and/or types; other types of points of interest in particular locations; etc.), before continuing to block 585. In block 585, the routine further estimates heights of walls in some or all rooms, such as from analysis of images and optionally sizes of known objects in the images, as well as height information about a camera when the images were acquired, and further uses such information to generate a 3D computer model of the building, with the 3D model and the floor map being associated with each other.

After block 585, the routine continues to block 588 to store the generated mapping information and optionally other generated information, and to optionally further use the generated mapping information, such as to provide the generated 3D computer model and/or 2D floor map for display on one or more client devices, provide that generated information to one or more other devices for use in automating navigation of those devices and/or associated vehicles or other entities, etc.

If it is instead determined in block 510 that the information or instructions received in block 505 are not to generate mapping information for an indicated building, the routine continues instead to block 590 to perform one or more other indicated operations as appropriate. Such other operations may include, for example, receiving and responding to requests for previously generated computer models and/or floor maps and/or other generated information (e.g., requests for such information for use by a BIIP system in generating and presenting a GUI that simultaneously displays multiple types of information about a building in an integrated and coordinated manner, requests for such information for display on one or more client devices, requests for such information to provide it to one or more other devices for use in automated navigation, etc.), obtaining and storing information about buildings for use in later operations (e.g., information about dimensions, numbers or types of rooms, total square footage, adjacent or nearby other buildings, adjacent or nearby vegetation, exterior images, etc.), etc.

After blocks 588 or 590, the routine continues to block 595 to determine whether to continue, such as until an explicit indication to terminate is received. If it is determined to continue, the routine returns to block 505 to wait for and receive additional instructions or information, and otherwise continues to block 599 and ends.

FIG. 6 illustrates an example embodiment of a flow diagram for a Building Information Integrated Presentation (BIIP) system routine 600. The routine may be performed by, for example, execution of the BIIP system 140 of FIG. 1, the BIIP system 340 of FIG. 3, and/or a BIIP system as discussed with respect to FIGS. 1-2X and/or as described elsewhere herein, such as to generate and present a GUI that displays multiple types of information about a building, such as simultaneously in an integrated and coordinated manner. In the example of FIG. 6, the GUI uses multiple panes to simultaneously present multiple types of information in an integrated and coordinated manner, but in other embodiments, other types of GUIs with other types of structures and layouts may be used to present the same or similar types of information, as discussed elsewhere herein, including with respect to the examples of FIGS. 2A-2X.

The illustrated embodiment of the routine begins in block 605, where information or instructions are received. The routine continues to block 610 to determine whether the instructions in block 605 are to present integrated information for an indicated building, such as in a corresponding GUI. If so, the routine continues to perform blocks 615-650, and otherwise continues to block 690. In particular, if it is determined in block 610 that the instructions received in block 605 are to present integrated information for an indicated building, the routine continues to block 615 to obtain building information of multiple types for the indicated building, such as a 3D model of the building, images of the interior (and optionally, exterior) of the building, videos of the interior (and optionally, exterior) of the building, information about an interactive tour of a plurality of viewing/capture locations within the building interior (and optionally, exterior) at which image and/or other information was captured, a 2-D floor map or other floor plan, audio and/or textual descriptions of particular locations or areas (e.g., rooms, points of interest, etc.), simulated and/or actual lighting information, information about surrounding buildings and/or vegetation and/or other exterior aspects (vehicle traffic, foot traffic, noises, etc.), surfaces and/or areas available for virtual staging or otherwise for adding virtual objects, information about types of building information to use as POIs (e.g., information from automated analysis of visual data of images captured for the building), etc.

After block 615, the routine continues to block 620 to determine an initial GUI display for the building (e.g., to retrieve a preexisting initial GUI to be used; to retrieve predefined information to add to the GUI; to generate the initial GUI, such as from one or more selections made in the instructions received in block 605; etc.), such as a GUI with three or more separate panes that simultaneously show at least three types of information about the building in a coordinated manner. In at least some embodiments, the at least three types of information may include one or more images and/or videos, at least some of the 3D computer model and/or 2D floor map model, at least some of an interactive tour, etc., such as with all of the information focused on a common location or other area of the building or other common feature or aspect. The GUI may further include various user-selectable controls (e.g., user-modifiable controls in which the user may modify a value or select from multiple options; other user-selectable controls in which functionality is toggled on and off or otherwise invoked upon selection with respect to one or more types of overlaid information, such as corresponding to POIs for one or more types of building information, including for types of building information determined from automated analysis of visual data of images; other user-selectable controls in which functionality is toggled on and off or otherwise invoked upon selection with respect to time-based controls to determine what types of corresponding building information is displayed, such as based on time of acquisition of that information; etc.) for display to an end user, such as within one or more of the separate panes or instead in separate areas of the GUI (e.g., at the top, at the bottom, on the left and/or right edges, etc.)—in at least some embodiments and situations, some or all of the user-selectable controls may be selected contextually based on other information that is displayed in the GUI, such as to have a primary pane (e.g., that is larger than other secondary page) and to overlay the content shown in the primary pane with one or more user-selectable controls that are specific to that type of content. If the GUI is to be displayed on the same computer that is executing the routine 600, the routine further generates a visual representation to supply to one or more display devices or other output devices of that computer, and otherwise generates a visual representation for transmission to another client device on which the visual representation of the GUI will be displayed. After block 620, the routine continues to block 625 to provide the generated GUI visual representation to the computer device on which it will be displayed, and then waits for an event to trigger a change in the GUI (e.g., a user selection to modify the displayed information, a change in the underlying displayed information, an amount of time having elapsed since a last user input and/or a last display activity by the routine, etc.).

After block 625, the routine continues to block 630 to determine whether the event that has occurred with respect to block 625 indicates a change in the information to be displayed for the current building, and if so continues to block 635 to determine an updated visual representation of the GUI to use as a new current GUI visual representation with the changed information, and then returns to block 625 to initiate display of the updated visual representation. The change may occur, for example, based on a user selection (e.g., of a user-selectable control in the displayed GUI) and/or a change in the underlying displayed information. In at least some embodiments and situations, the updated visual representation again shows multiple types of information in multiple GUI panes that all focus on a common area, location or other aspect of the building (whether the same common area, location or other aspect, or instead a different one) and that further include user-selectable controls corresponding to one or more panes of the GUI—in other embodiments and situations, information displayed in the GUI at a given time may include all or substantially all of the displayed area of the GUI, such as in a single pane and optionally being of a single type. If it is instead determined in block 630 that the event that occurred with respect to block 625 did not cause a change in displayed information for the current building, the routine continues to block 650 to determine whether the event instead indicates to display information for a new building, and if so the routine returns to block 615 to initiate a display of information for the new building in an updated version of the GUI.

If it is instead determined in block 610 that the instructions or information received in block 605 are not to present integrated information for an indicated building, the routine continues instead to block 690 to perform one or more other indicated operations as appropriate. Such other operations may include, for example, receiving and responding to requests for previously generated GUI information and/or for underlying information that may be used in a GUI (e.g., information for an indicated building for display in a stand-alone manner or otherwise in a manner that is not part of an integrated display showing multiple types of related information simultaneously or otherwise concurrently; information for an indicated building that includes an array of images, such as thumbnail images, along with visual indications of additional types of media or other building information, such as a 3D model floor plan and/or a 2D floor map and/or an interactive tour; etc.), obtaining and storing information about buildings for use in later GUI presentation operations (e.g., information from external sources, such as one or more databases; information from end users, such as questions about an indicated building and/or an answer to an existing question and/or images or other media captured in or around a building; etc.), performing automated analysis of available building information and/or activities of one or more end users to determine patterns or otherwise identify additional information for subsequent use, etc.

After block 690, or if it is instead determined in block 650 that the event is not to display information for a new building, the routine continues to block 695 to determine whether to continue, such as until an explicit indication to terminate is received. If it is determined to continue, the routine returns to block 605 to wait for and receive additional instructions or information, and otherwise continues to block 699 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:

selecting, by one or more computing systems, multiple types of information about an indicated building to simultaneously include in a displayed graphical user interface (GUI), the multiple types of information including a video having at least visual data from a succession of multiple locations at the indicated building, and further including one or more additional types of information that include a visual representation of a floor map of the indicated building; and presenting, by the one or more computing systems and in the displayed GUI, the video and the one or more additional types of information, including presenting the video in a first pane of the GUI in a substantially real-time manner relative to capturing of the video by a presenter device at the indicated building that is moving through the indicated building and transmitting the video as it is captured, and including presenting the visual representation of the floor map in a second pane of the GUI simultaneously with the video and in a coordinated manner in which the visual representation of the floor map is repeatedly updated to reflect current visual data of the video including to visually indicate the succession of multiple locations, the presenting including:

(a) receiving, by the one or more computing systems, one or more current frames of the video from the presenter device for a current one of the multiple locations;

(b) analyzing, by the one or more computing systems, visual data of the one or more current frames to identify at least one of a room type of a room of the indicated building that is visible in the visual data of the one or more current frames, or a feature type for a structural element of the indicated building that is visible in the visual data of the one or more current frames;

(c) displaying, by the one or more computing systems, the visual data of the one or more current frames in the first pane, and a current version of the visual representation of the floor map in the second pane concurrently with the video, wherein the current version of the visual representation of the floor map includes at least a portion of the floor map of the indicated building showing a position of the current one location on the at least portion of the floor map and showing at least two-dimensional structural information for at least some of the indicated building;

(d) overlaying, by the one or more computing systems and on at least one of the first or second panes, a determined textual identifier for the identified at least one of the room type or the feature type; and (e) repeating elements (a)-(d) until presentation of the video is ended.

2. The computer-implemented method of claim 1 wherein the presenting of the video and the one or more additional types of information includes transmitting the video and the one or more additional types of information to each of multiple client devices to cause concurrent display of the video and the one or more additional types of information on each of the multiple client devices as part of a shared virtual showing tour of the building.

3. The computer-implemented method of claim 2 further comprising maintaining, during the presenting of the video, an interactive communication session between the multiple client devices, wherein the interactive communication session includes transmitting at least one of first audio data or first textual data between all of the multiple client devices, and further includes transmitting at least one of second audio data or second textual data between only a selected pair of the multiple client devices.

4. The computer-implemented method of claim 1 wherein each analyzing of the visual data of the one or more current frames includes using machine learning to identify a room type of a room of the indicated building that is visible in the visual data of those one or more current frames, and each overlaying of the determined textual identifier includes displaying a determined textual identifier for that identified room type in the first pane.

5. The computer-implemented method of claim 1 wherein the one or more additional types of information further includes additional visual data and user-selectable controls for an interactive tour of a plurality of viewing locations at the indicated building using images captured at each of the plurality of viewing locations, and wherein the presenting of the video and the one or more additional types of information includes presenting the additional visual data and the user-selectable controls in a third pane of the displayed GUI concurrently with the video, and modifying information shown in the third pane for the interactive tour in response to one or more selections of one or more of the user-selectable controls.

6. The computer-implemented method of claim 1 wherein the presenting of the video and the one or more additional types of information includes displaying user-selectable controls related to overlaying one or more further types of information on at least one of the video or the one or more additional types of information, and modifying information displayed in at least one of the first or second panes in response to one or more selections of one or more of the user-selectable controls, the modifying including adding and/or removing the overlaying of the one or more further types of information.

7. A system comprising:
one or more hardware processors of one or more computing systems; and
one or more memories with stored instructions that, when executed by at least one of the one or more hardware processors, cause the one or more computing systems to perform automated operations including at least:
selecting multiple pieces of information about an indicated building to include concurrently in a displayed graphical user interface (GUI), wherein the multiple pieces of information include a video having at least visual data from one or more locations at the indicated building, and further include one or more additional pieces of information about the indicated building, the one or more additional pieces of information including at least one of a visual representation of a floor map of the indicated building, or one or more images captured at the indicated building, or visual data and user-selectable controls for an interactive virtual tour of the indicated building; and
providing, via the displayed GUI, the video concurrently with the one or more additional pieces of information in a coordinated manner in which the one or more additional pieces of information are updated to reflect current visual data of the video, including repeatedly providing a portion of the video for a current one of the one or more locations and providing a portion of the one or more additional pieces of information that reflects the current one location.

8. The system of claim 7 wherein the video includes visual data for multiple locations at the indicated building as a presenter device at the indicated building moves through the indicated building and transmits the video as it is captured, and wherein the providing of the video via the displayed GUI is performed in a substantially real-time manner relative to transmitting of the video by the presenter device.

9. The system of claim 7 wherein the providing of the video and the one or more additional pieces of information includes using multiple panes in the displayed GUI, including to display the video in a first pane and to simultaneously display the one or more additional pieces of information in one or more second panes.

10. The system of claim 7 wherein the one or more additional pieces of information include at least a portion of a floor map of the indicated building that shows structural information for at least some of the indicated building and is repeatedly updated to reflect the current one location for the video.

11. The system of claim 7 wherein the one or more computing systems include a client device on which the GUI is displayed, and wherein the providing of the video and the one or more additional pieces of information includes presenting the video and the one or more additional pieces of information in the displayed GUI on the client device.

12. The system of claim 7 wherein the one or more computing systems include at least one server computing system, and wherein the providing of the video and the one or more additional pieces of information includes transmitting the video and the one or more additional pieces of information over one or more computer networks to at least one client device for display in a GUI on the at least one client device.

13. The system of claim 7 wherein the one or more additional pieces of information includes visual data and user-selectable controls for an interactive tour of a plurality of viewing locations at the indicated building, and wherein providing of the one or more additional pieces of information includes modifying information shown for the interactive tour in response to one or more selections of one or more of the user-selectable controls.

14. The system of claim 7 wherein the providing of the video and the one or more additional pieces of information includes providing user-selectable controls related to overlaying one or more further pieces of information on at least one of the video or the one or more additional pieces of information, and modifying displayed information in response to one or more selections of one or more of the user-selectable controls to add and/or remove the overlaying of the one or more further pieces of information.

15. The system of claim 7 wherein the automated operations further include analyzing the visual data of the video to identify at least one of a room type of a room of the indicated building that is visible in the visual data, or a feature type for a structural element of the indicated building that is visible in the visual data, and wherein the providing of the video and the one or more additional pieces of information includes displaying a determined textual identifier for the identified at least one of the room type or the feature type with at least one of the video or the one or more additional pieces of information.

16. The system of claim 7 wherein the video includes visual data for multiple locations at the indicated building captured by a presenter device at the indicated building as the presenter device moves through the indicated building to provide a tour of the indicated building, and wherein the providing of the video and the one or more additional pieces of information is performed for each of multiple client devices to cause concurrent display of the video and the one or more additional pieces of information on each of the multiple client devices.

17. The system of claim 16 wherein the automated operations further include maintaining, during the providing of the video, an interactive communication session between the multiple client devices, wherein the interactive communication session includes transmitting at least one of first audio data or first textual data between the multiple client devices.

18. The system of claim 7 wherein the providing of the video concurrently with the one or more additional pieces of information includes causing presentation of the video and the one or more additional pieces of information on one or more client devices as part of a virtual tour of the indicated building, and wherein the automated operations further include:
  recording, in response to a request sent from at least one of the one or more client devices, at least the video for the virtual tour; and
  providing, at a time after completion of the video, the recorded at least video to a recipient device to cause presentation of the recorded at least video on the recipient device.

19. The system of claim 7 wherein the providing of the video concurrently with the one or more additional pieces of information includes causing presentation of the video and the one or more additional pieces of information on one or more client devices as part of a virtual tour of the indicated building, and wherein the automated operations further include, during the providing of the video concurrently with the one or more additional pieces of information:
  receiving a communication sent from one of the one or more client devices that identifies a point of interest at the indicated building, the point of interest being indicated on the one client device via a selection in a GUI on the one client device in which the video and the one or more additional pieces of information are being presented; and
  providing a response to the one client device with information about the point of the interest that is received from at least one user associated with the indicated building.

20. The system of claim 19 wherein the presentation of the video and the one or more additional pieces of information further occurs on multiple client devices, wherein the response is received during the virtual tour from an additional one of the multiple client devices separate from the one client device, and wherein the providing of the response further occurs during the virtual tour via at least one of a communication that occurs as part of the video, or a communication between the additional one client device and the one client device.

21. The system of claim 7 wherein the automated operations further include, before the providing of the video concurrently with the one or more additional pieces of information, receiving one or more indications from one or more users of one or more points of interest at the indicated building, wherein the automated operations further include identifying the one or more points of interest to a user associated with a presenter device, wherein the video is transmitted from the presenter device at the indicated building and includes at least visual data about the one or more points of interest in response to the identifying, and wherein the providing of the video concurrently with the one or more additional pieces of information includes causing presentation of the video and the one or more additional pieces of information to the one or more users of one or more client devices.

22. The system of claim 7 wherein the automated operations further include receiving a communication sent from a first client device that identifies multiple points of interest at the indicated building, the multiple points of interest being indicated on the first client device via a selection in a GUI on the first client device in information about the indicated building is being presented, and wherein the providing of the video concurrently with the one or more additional pieces of information includes causing presentation of the video and the one or more additional pieces of information on one or more client devices that include the first client device as part of a virtual tour of the indicated building, the virtual tour including a presenter device at the indicated building moving to positions of each of the multiple points of interest and providing at least visual data for the video related to that point of interest.

23. The system of claim 7 wherein the automated operations further include:
  receiving a communication sent from a client device that identifies one or more points of interest at the indicated building, the one or more points of interest being indicated on the client device via a selection in a GUI on the client device in which information for the indicated building is being presented;
  performing a search of other buildings based at least in part on the identified one or more points of interest to generate search results that include at least one other building matching the identified one or more points of interest; and
  transmitting, to the client device, information about the at least one other building in response to the received communication.

24. A non-transitory computer-readable medium having stored contents that cause one or more computing systems to perform automated operations including at least:
  selecting, by the one or more computing systems, multiple pieces of information about an indicated building to include concurrently in a displayed graphical user interface (GUI), wherein the multiple pieces of information include a video having at least visual data from one or more locations at the indicated building, and further include one or more additional pieces of information about the indicated building, the one or more additional pieces of information including at least one or more tag identifiers for one or more rooms visible in the visual data; and
  providing, by the one or more computing systems and via the displayed GUI, the video concurrently with the one or more additional pieces of information in a coordinated manner in which the one or more additional pieces of information is updated to reflect current visual data of the video, including repeatedly providing a portion of the video for a current one of the one or more locations and concurrently providing at least one of the one or more tag identifiers that is determined for a room of the indicated building visible in the visual data of the portion of the video and automatically identified from analysis of the visual data of the portion of the video.

25. The non-transitory computer-readable medium of claim 24 wherein the one or more additional pieces of information further include one or more additional tag identifiers for one or more features included in at least one of the one or more rooms, and wherein the providing of the video concurrently with the one or more additional pieces of information further includes, while providing at least one portion of the video, concurrently providing at least one of the one or more additional tag identifiers that is determined for at least one of the one or more features visible in the visual data of the at least one portion of the video and automatically identified from analysis of the visual data of the at least one portion of the video.

26. The non-transitory computer-readable medium of claim 24 wherein the one or more tag identifiers are in at least one of textual form or audio form, and wherein providing of each of the one or more tag identifiers includes visually displaying that tag identifier if it is in textual form and includes audibly playing that tag identifier if it is in audio form.

27. The non-transitory computer-readable medium of claim 24 wherein the video includes visual data for multiple locations at the indicated building as a presenter device at the indicated building moves through the indicated building and transmits the video as it is captured, and wherein the providing of the video via the displayed GUI is performed in a substantially real-time manner relative to transmitting of the video by the presenter device.

28. The non-transitory computer-readable medium of claim 24 wherein the providing of the video and the one or more additional pieces of information includes using multiple panes in the displayed GUI, including to display the video in a first pane and to simultaneously display the one or more additional pieces of information in one or more second panes, and wherein the one or more additional pieces of information include at least a portion of a floor map of the indicated building that shows structural information for at least some of the indicated building and is updated to reflect the current one location for the video.

29. The non-transitory computer-readable medium of claim 24 wherein the one or more computing systems include at least one server computing system, and wherein the providing of the video and the one or more additional pieces of information includes transmitting the video and the one or more additional pieces of information over one or more computer networks to a client device for display in the GUI on the client device.

30. The non-transitory computer-readable medium of claim 24 wherein the providing of the video and the one or more additional pieces of information includes providing user-selectable controls related to one or more further pieces of information, and modifying displayed information in response to one or more selections of one or more of the user-selectable controls to add and/or remove at least one of the one or more further pieces of information.

31. The non-transitory computer-readable medium of claim 24 wherein the video includes visual data for multiple locations at the indicated building captured by a presenter device at the indicated building as the presenter device moves through the indicated building to provide a tour of the indicated building, and wherein the providing of the video and the one or more additional pieces of information is performed for each of multiple client devices to cause concurrent display of the video and the one or more additional pieces of information on each of the multiple client devices.

32. The non-transitory computer-readable medium of claim 31 wherein the automated operations further include maintaining, during the providing of the video, an interactive communication session between the multiple client devices, wherein the interactive communication session includes transmitting at least one of first audio data or first textual data between the multiple client devices.

* * * * *